(12) United States Patent
Shimizu

(10) Patent No.: US 10,817,982 B2
(45) Date of Patent: Oct. 27, 2020

(54) DEVICE AND METHOD FOR CREATING ULTRA-LOW RESOLUTION IMAGE

(71) Applicant: Yoshimichi Shimizu, Gifu (JP)

(72) Inventor: Yoshimichi Shimizu, Gifu (JP)

( * ) Notice: Subject to any disclaimer, the term of this patent is extended or adjusted under 35 U.S.C. 154(b) by 22 days.

(21) Appl. No.: 15/992,185

(22) Filed: May 30, 2018

(65) Prior Publication Data
US 2019/0102862 A1    Apr. 4, 2019

Related U.S. Application Data

(63) Continuation of application No. PCT/JP2016/085108, filed on Nov. 28, 2016.

(30) Foreign Application Priority Data

Nov. 30, 2015 (JP) ................. 2015-234008

(51) Int. Cl.
| | |
|---|---|
| G06T 3/40 | (2006.01) |
| H04N 1/387 | (2006.01) |
| H04N 1/393 | (2006.01) |
| G06T 7/73 | (2017.01) |
| G06T 7/60 | (2017.01) |

(52) U.S. Cl.
CPC ............ G06T 3/4038 (2013.01); G06T 7/60 (2013.01); G06T 7/73 (2017.01); H04N 1/387 (2013.01); H04N 1/3935 (2013.01)

(58) Field of Classification Search
CPC .......... G06T 3/4038; G06T 7/60; G06T 7/73; H04N 1/387; H04N 1/3935
See application file for complete search history.

(56) References Cited

U.S. PATENT DOCUMENTS

| 6,047,090 A * | 4/2000 | Makram-Ebeid ......... G06T 7/11 382/128 |
| 6,048,314 A * | 4/2000 | Nikom ............... A61B 5/02007 600/443 |
| 8,767,233 B2 | 7/2014 | Munechika |
| 2003/0174891 A1* | 9/2003 | Wenzel ................ G06K 9/6857 382/209 |
| 2006/0285755 A1* | 12/2006 | Hager ................ G06K 9/00208 382/224 |
| 2008/0247622 A1* | 10/2008 | Aylward ................ A61B 90/36 382/131 |
| 2011/0103657 A1* | 5/2011 | Kang .................... G06K 9/4609 382/128 |
| 2016/0239956 A1* | 8/2016 | Kang .................... G06T 17/005 |

FOREIGN PATENT DOCUMENTS

JP    2001-96996    10/2001

OTHER PUBLICATIONS

Search report in PCT/JP2016/085108.

* cited by examiner

*Primary Examiner* — Jingge Wu
(74) *Attorney, Agent, or Firm* — Muskin and Farmer LLC

(57) ABSTRACT

One pixel unit is composed of plural kinds of basic pieces having plural kinds or three or more kinds of gradations. Basic pieces of predetermined gradations corresponding to an outline or shade of the drawing image is placed at each pixel on the drawing surface to fill the pixels on the drawing surface with the basic pieces, thereby making a desired drawing image. A predetermined background pattern is formed in the drawing image by using the geometric pattern of the basic piece.

3 Claims, 49 Drawing Sheets

[FIG. 1]
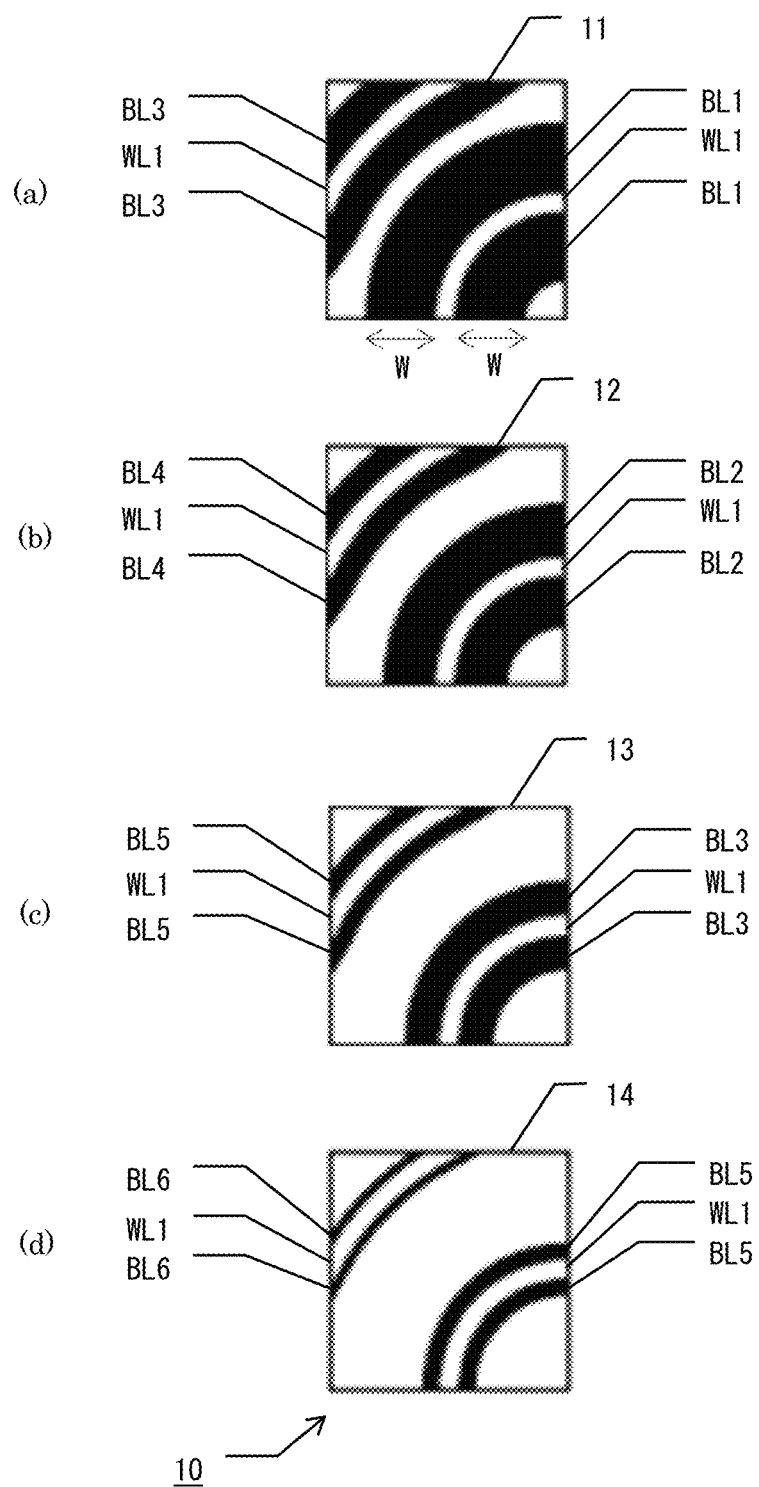

[FIG. 2]
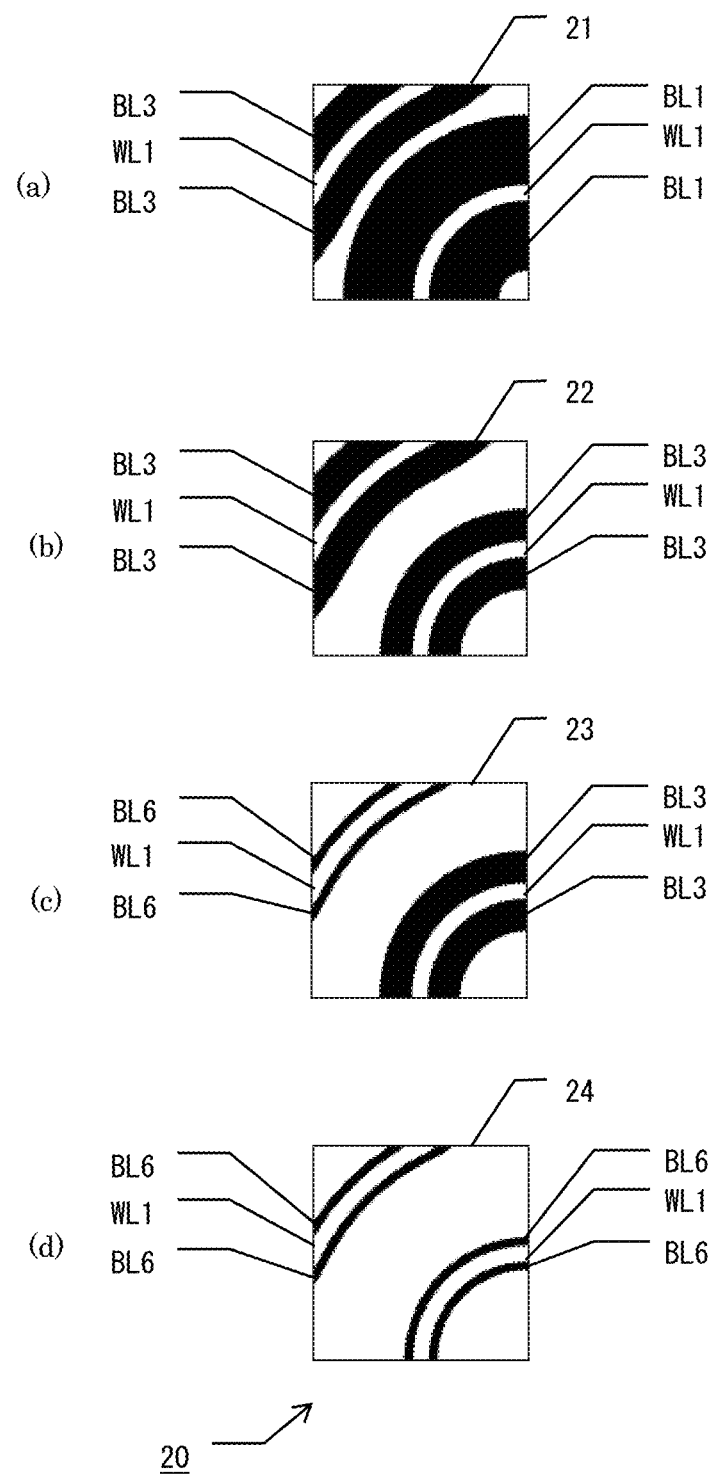

[FIG. 3]
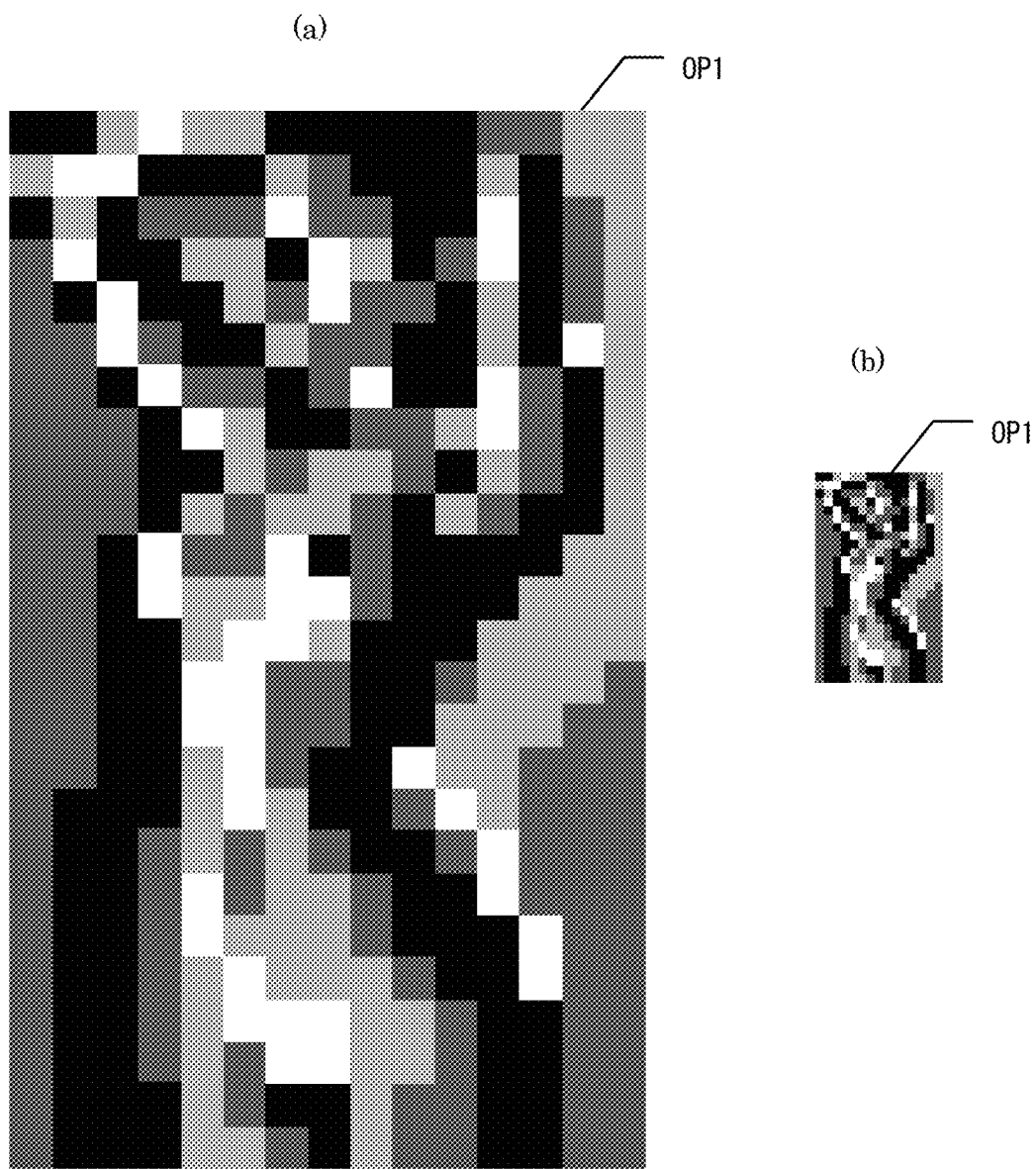

[FIG. 4]
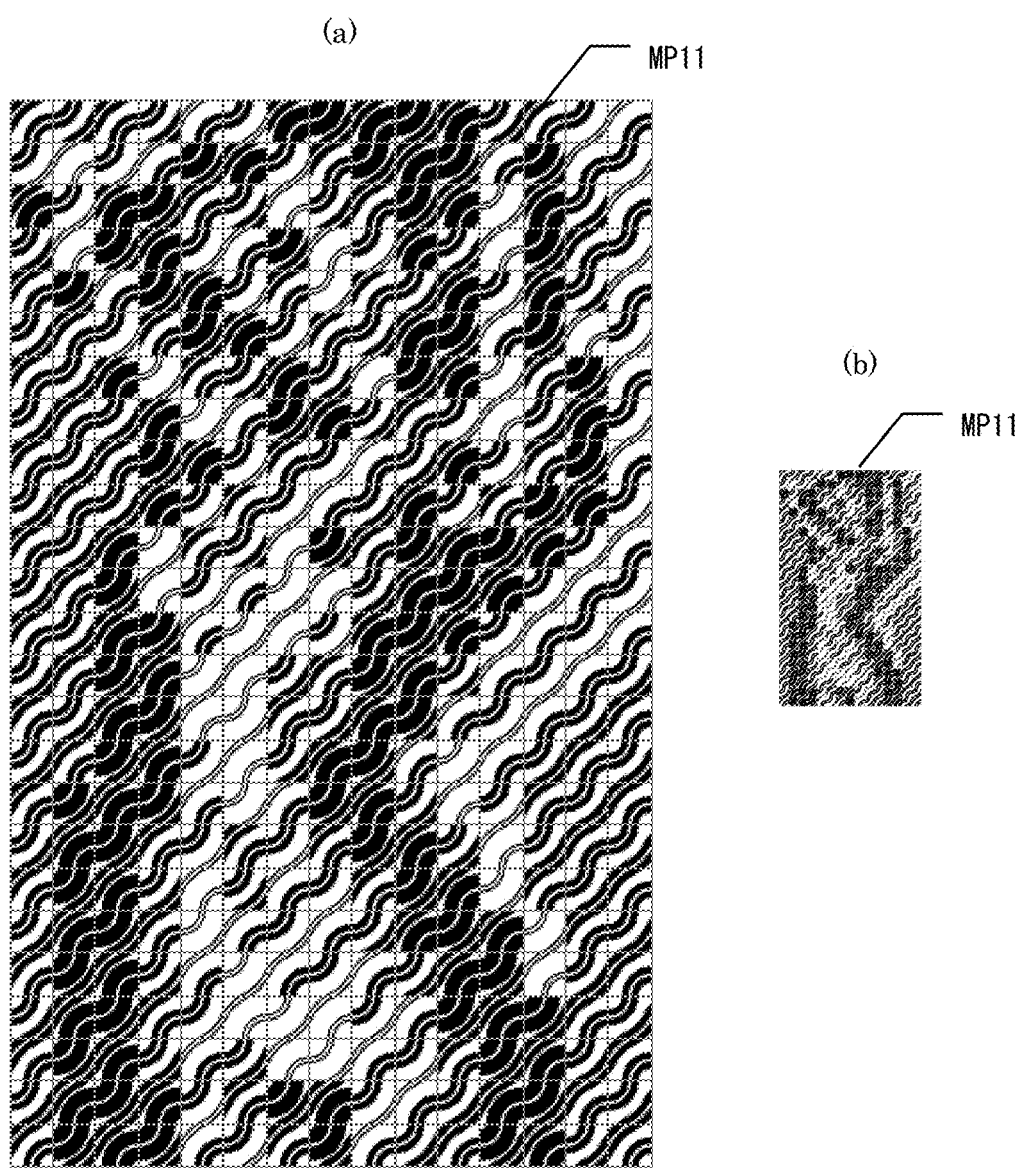

[FIG. 5]
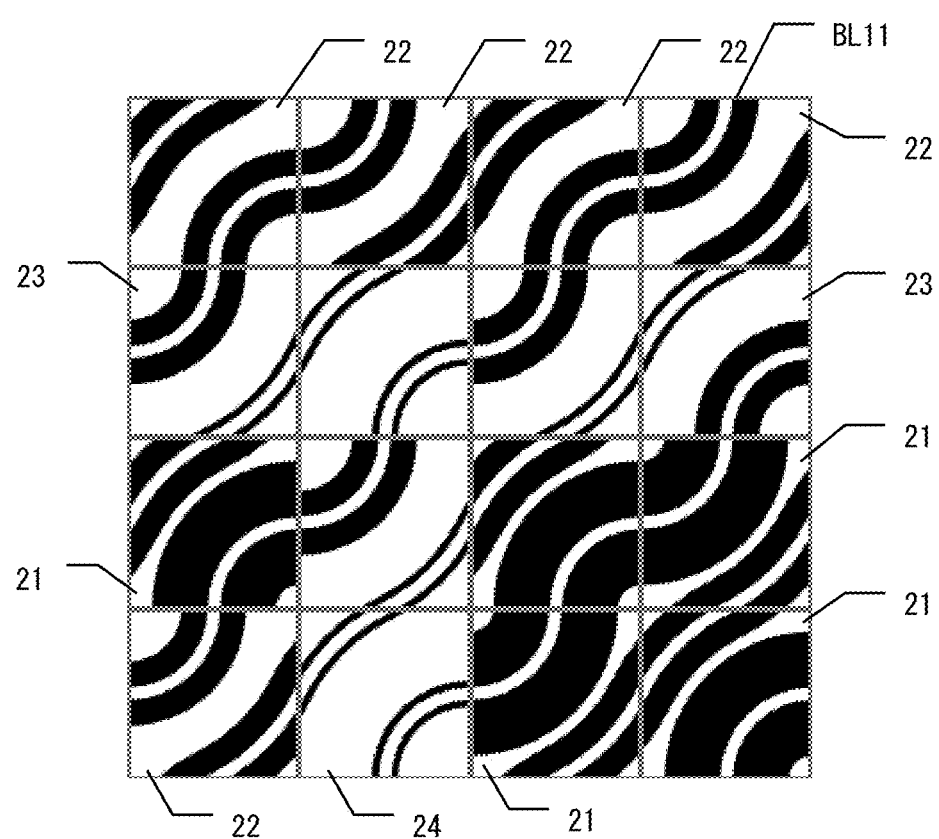

[FIG. 6]
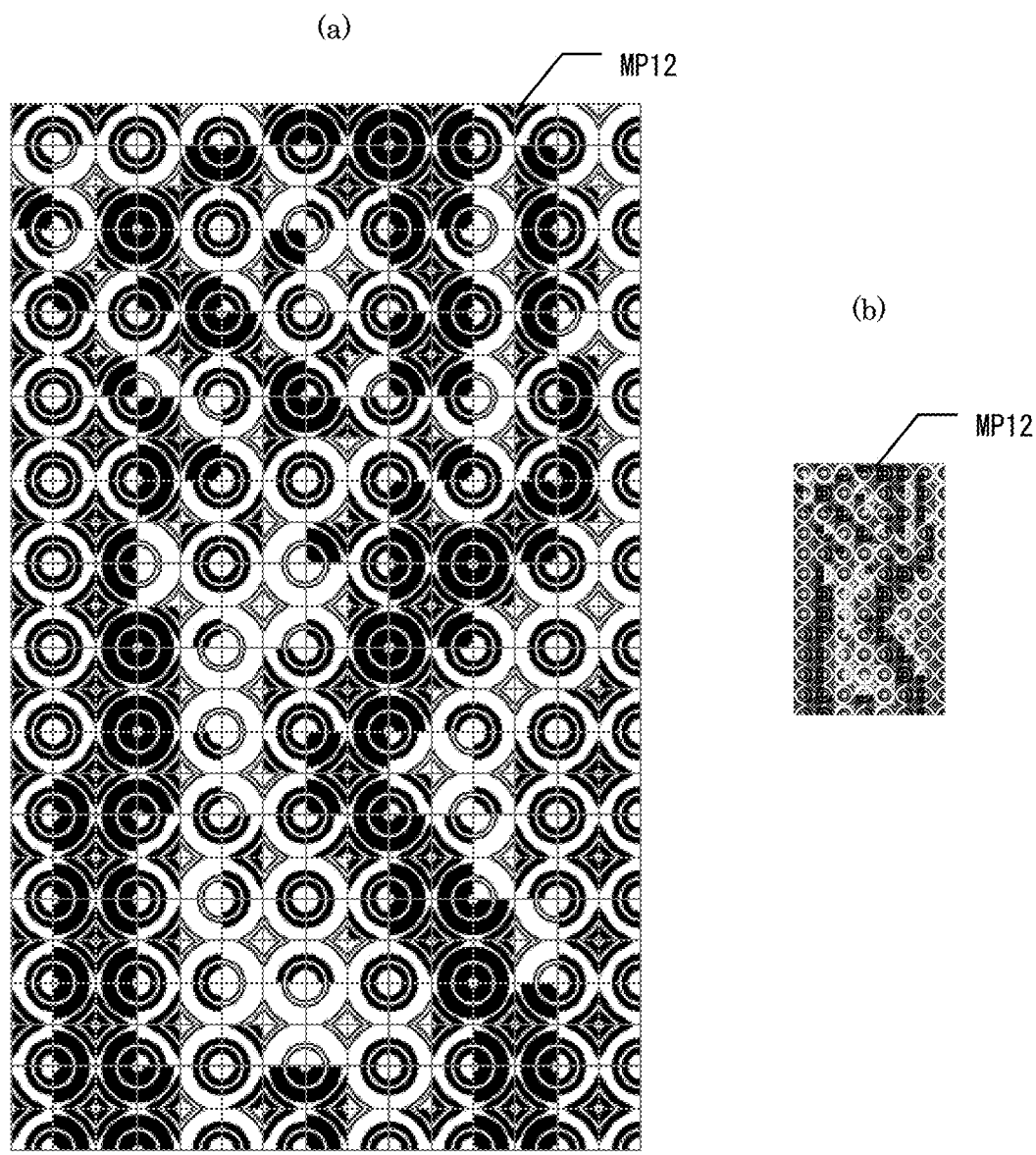

[FIG. 7]
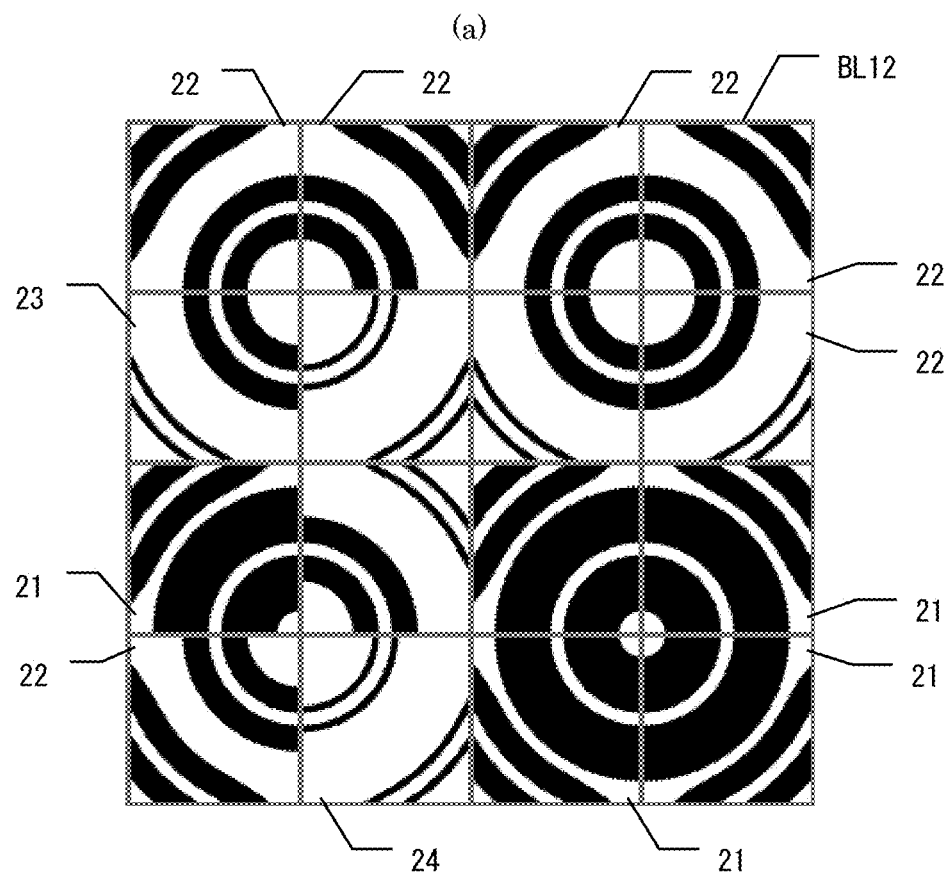
(a)
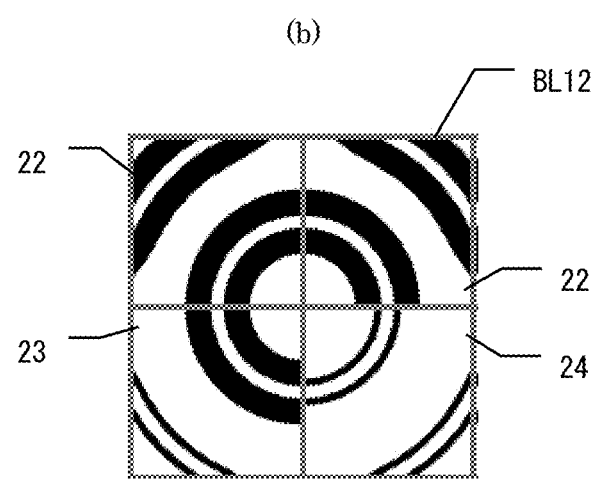
(b)

[FIG. 8]
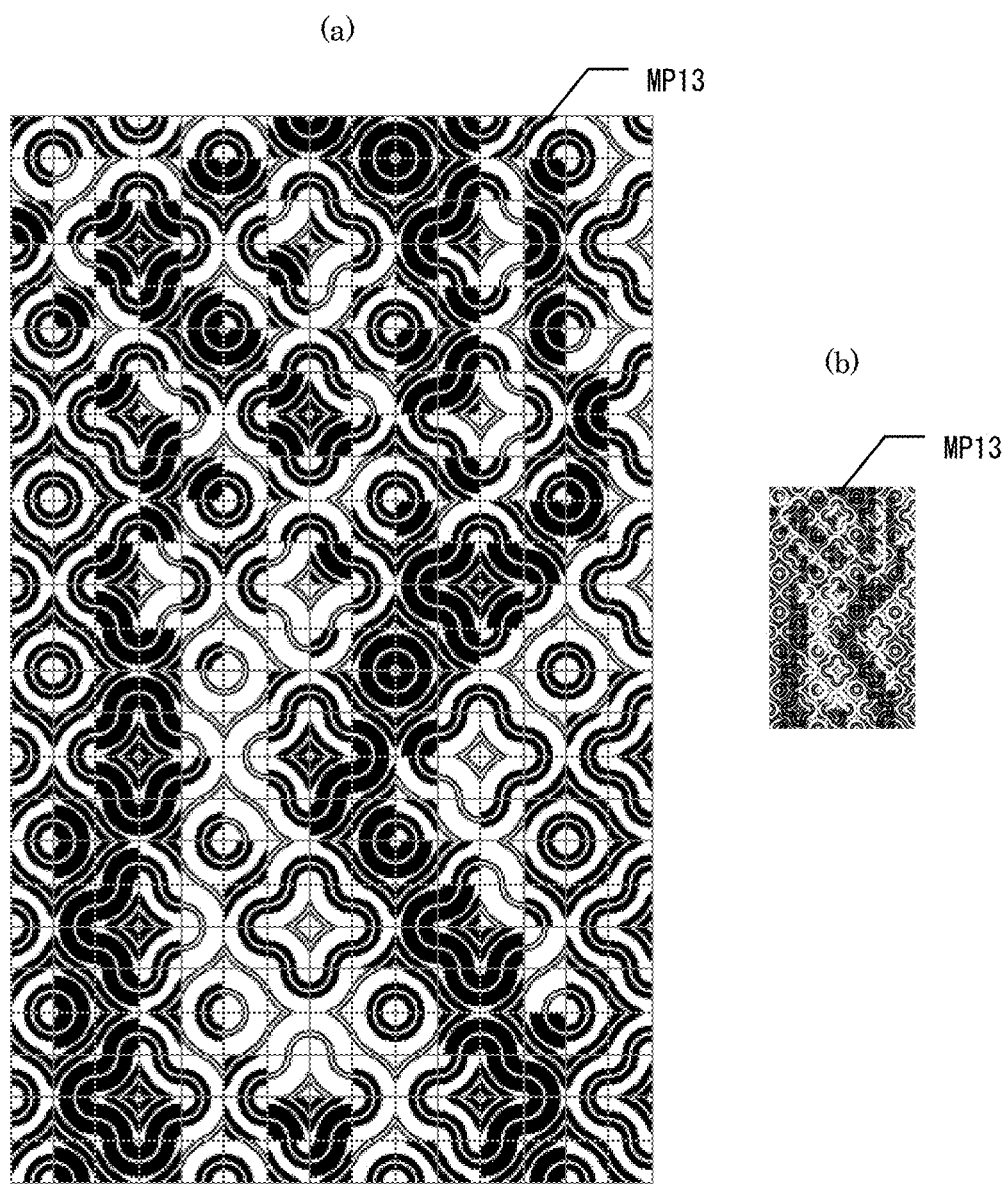

[FIG. 9]
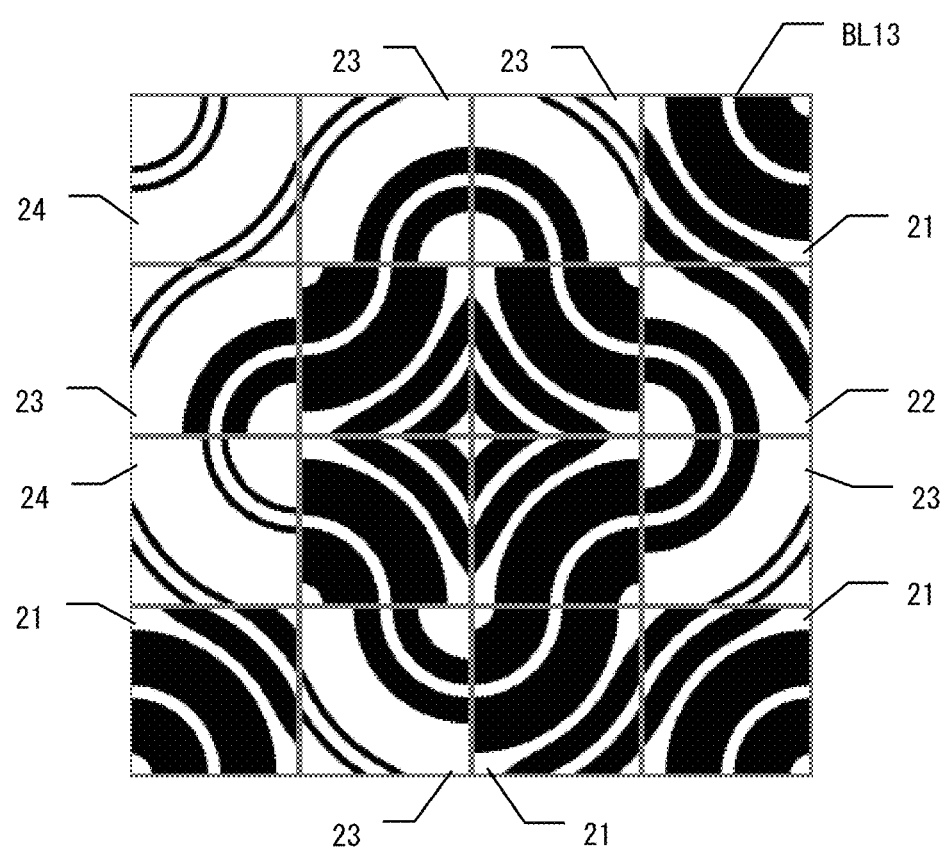

[FIG. 10]
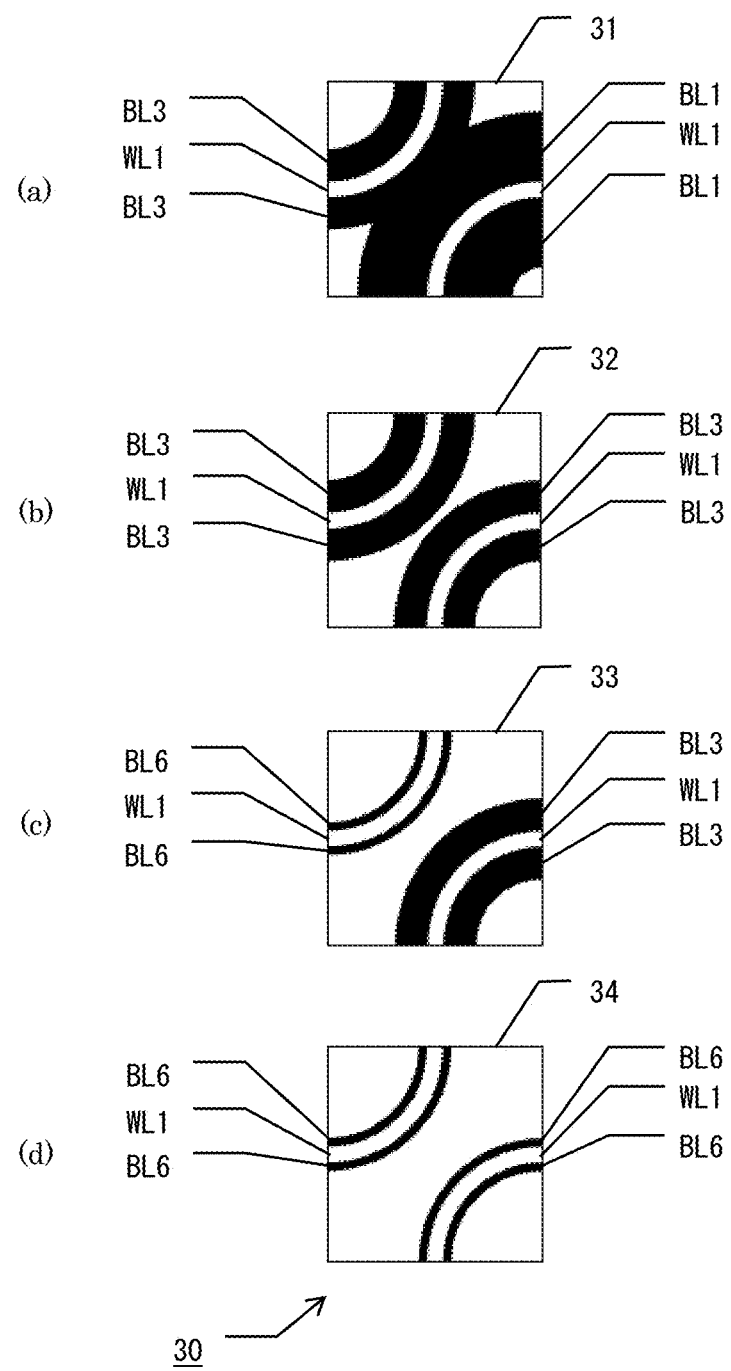

[FIG. 11]
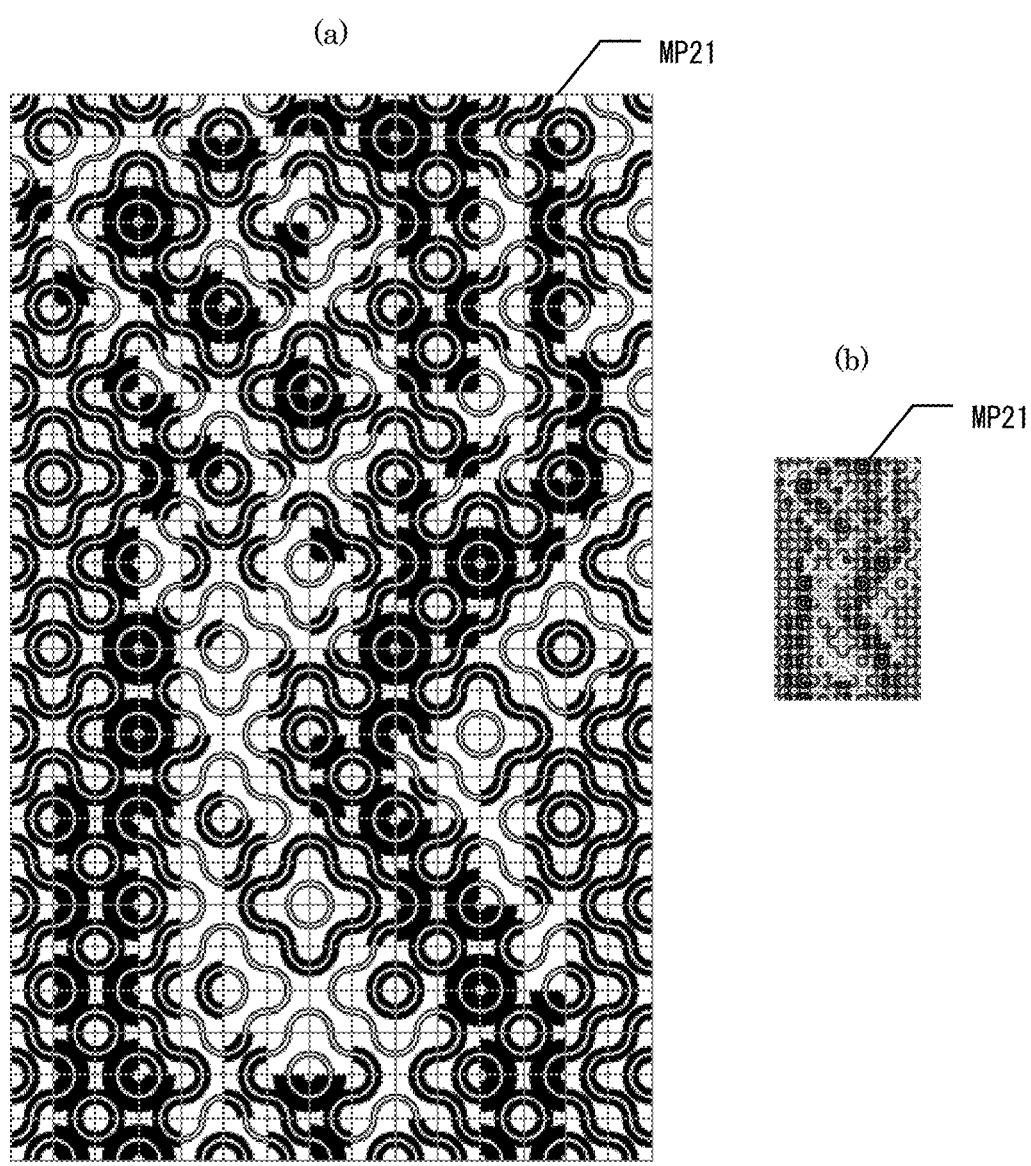

[FIG. 12]
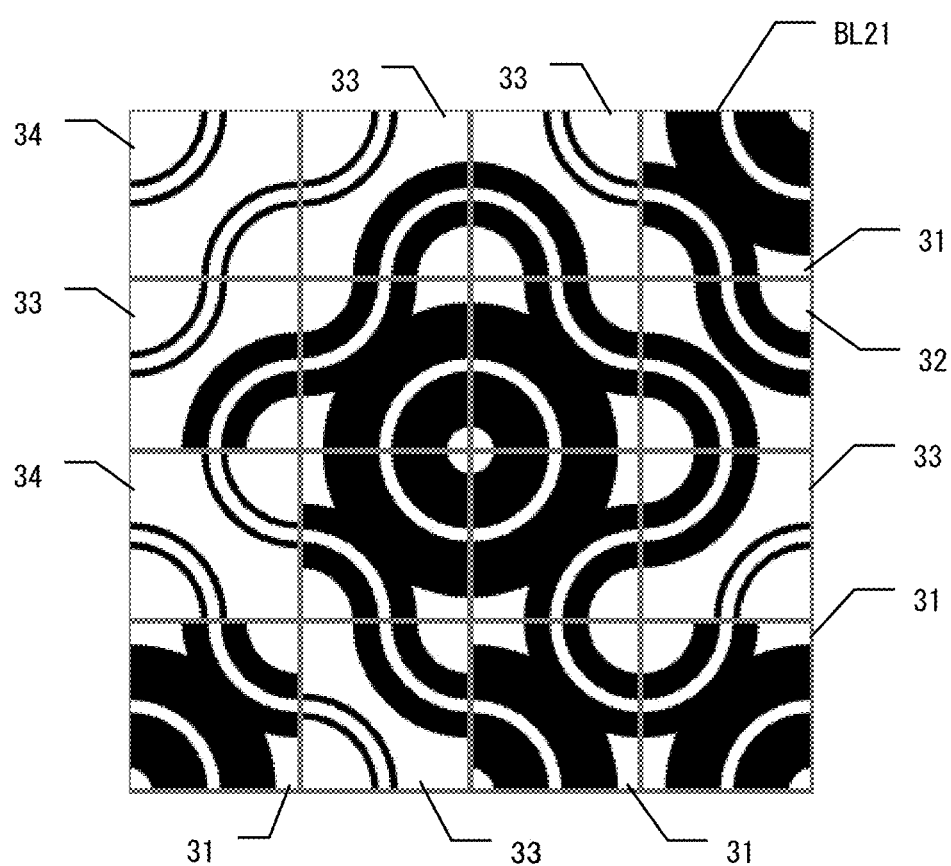

[FIG. 13]
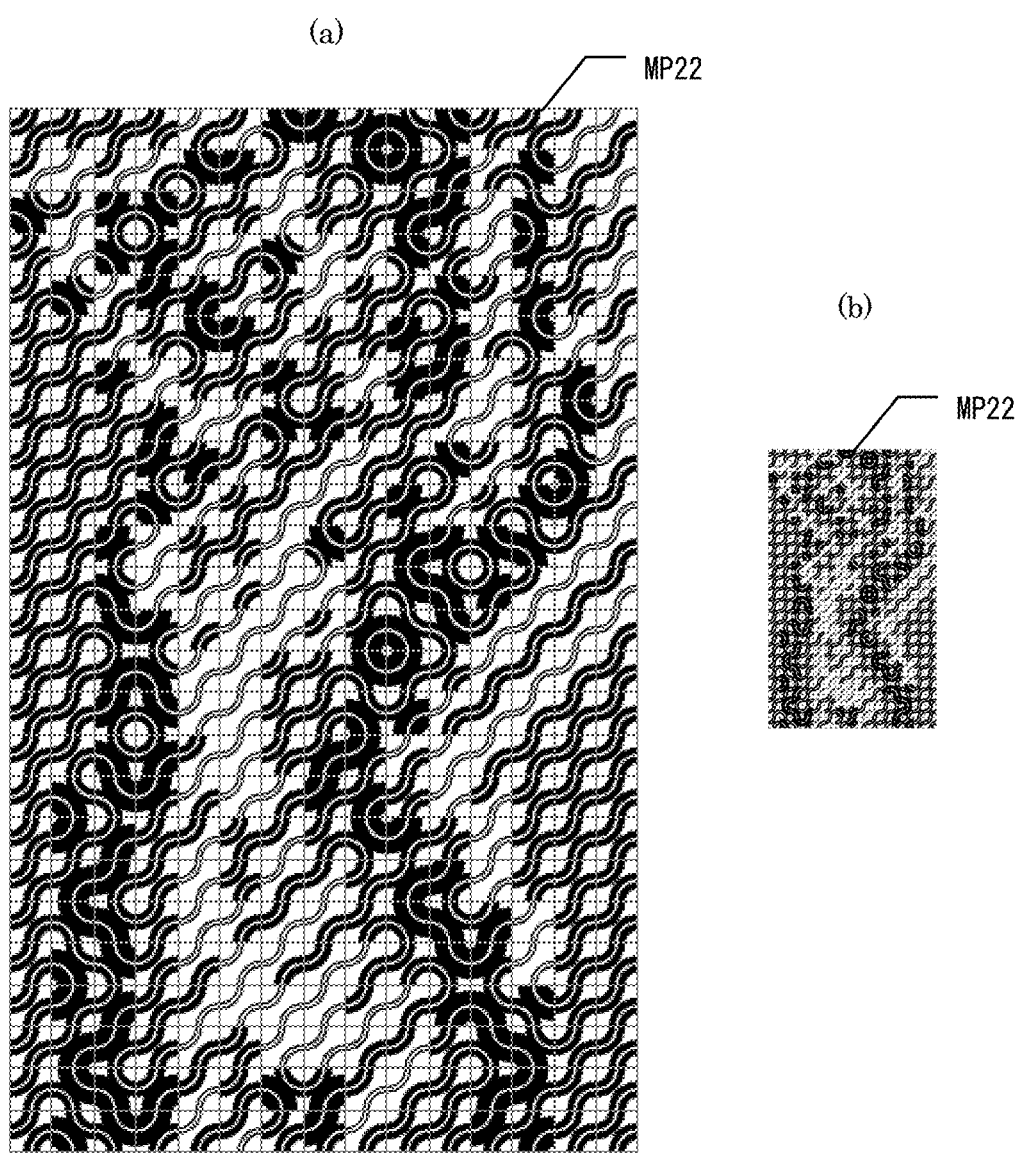

[FIG. 14]
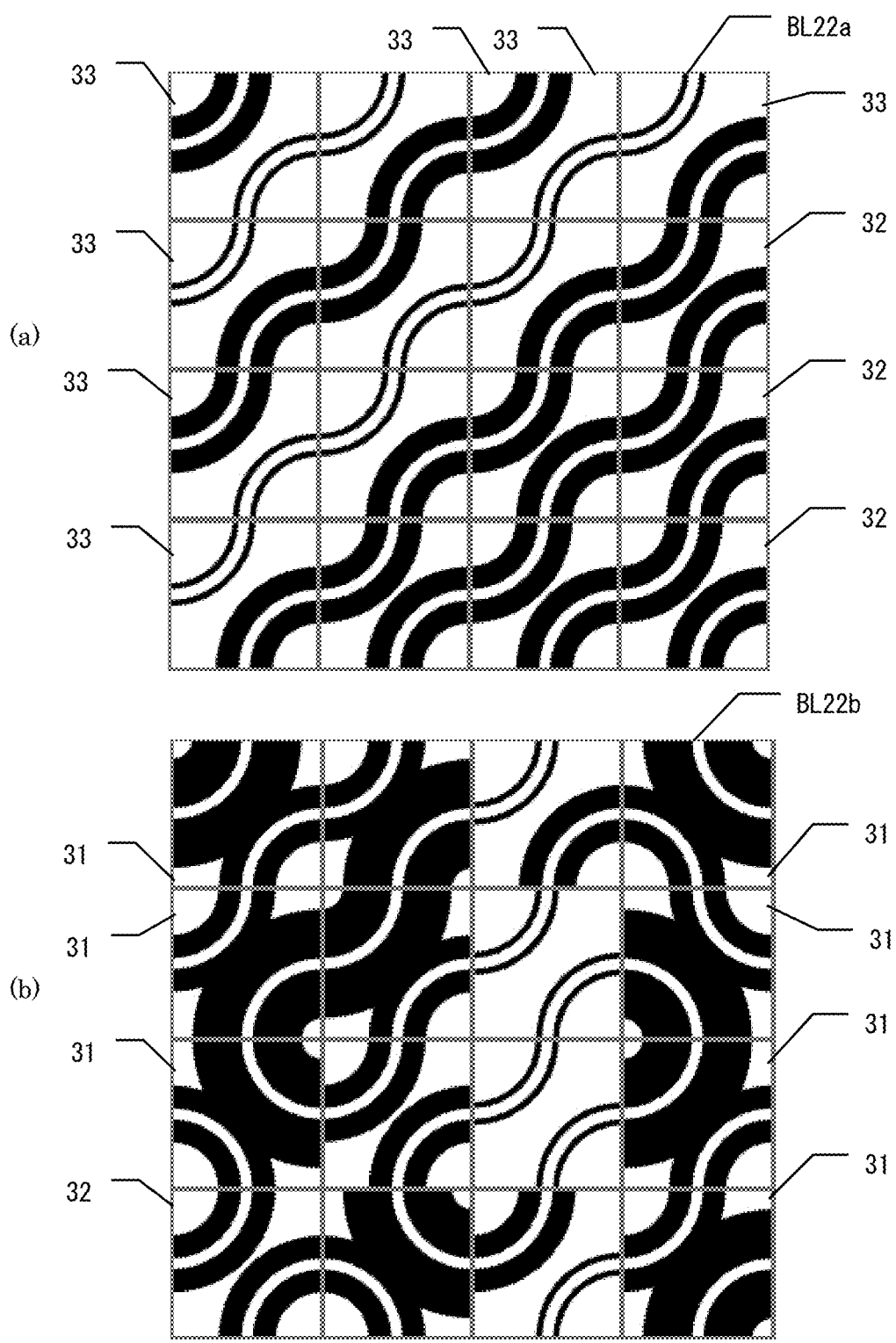

[FIG. 15]
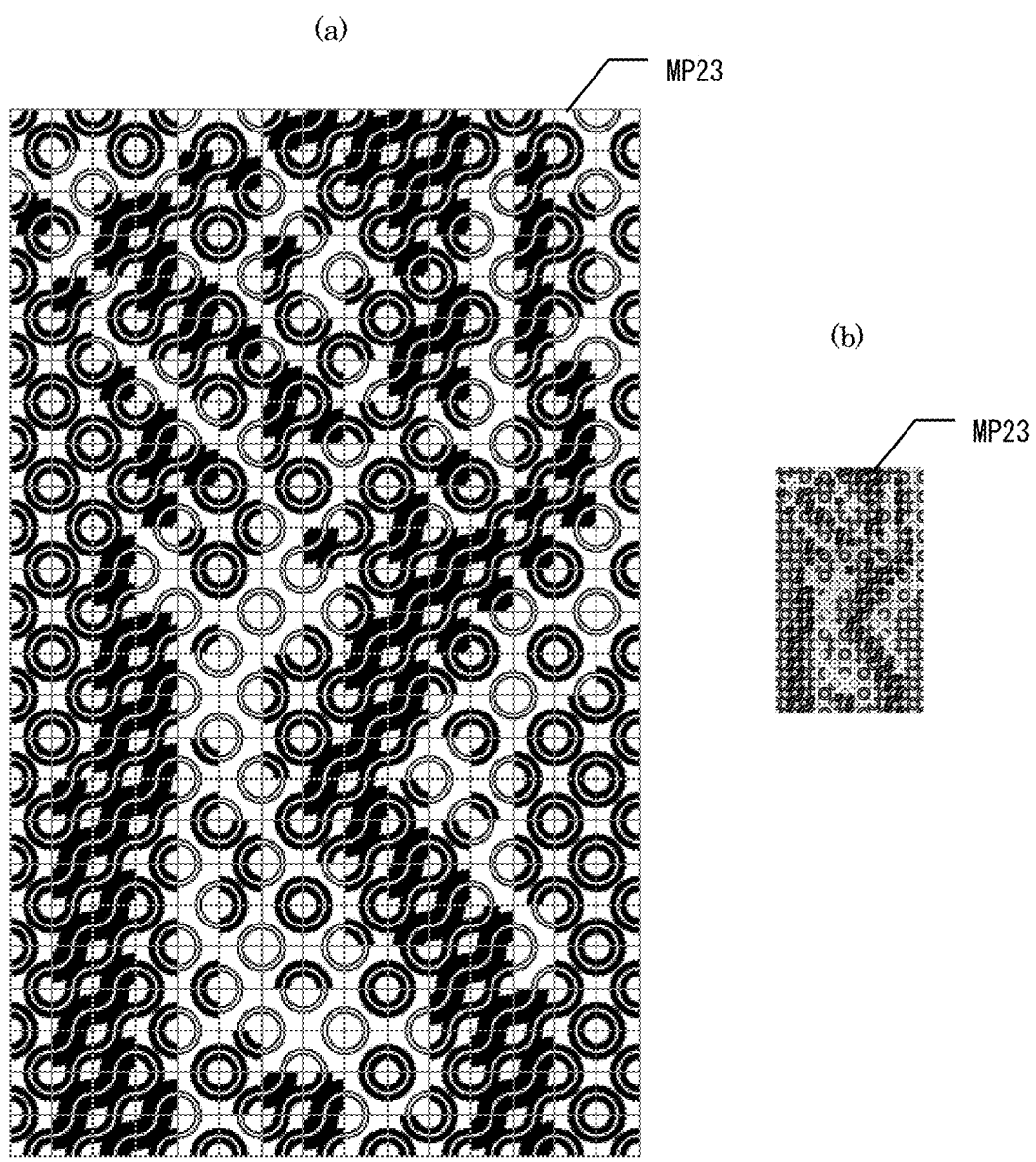

[FIG. 16]
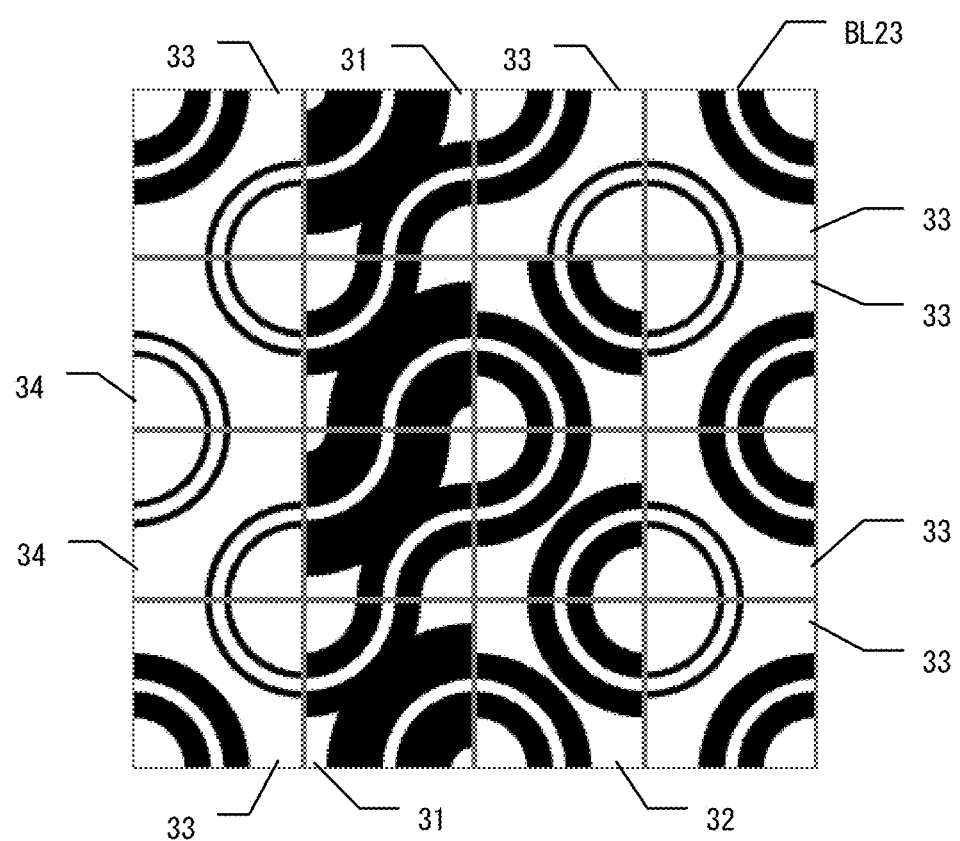

[FIG. 17]
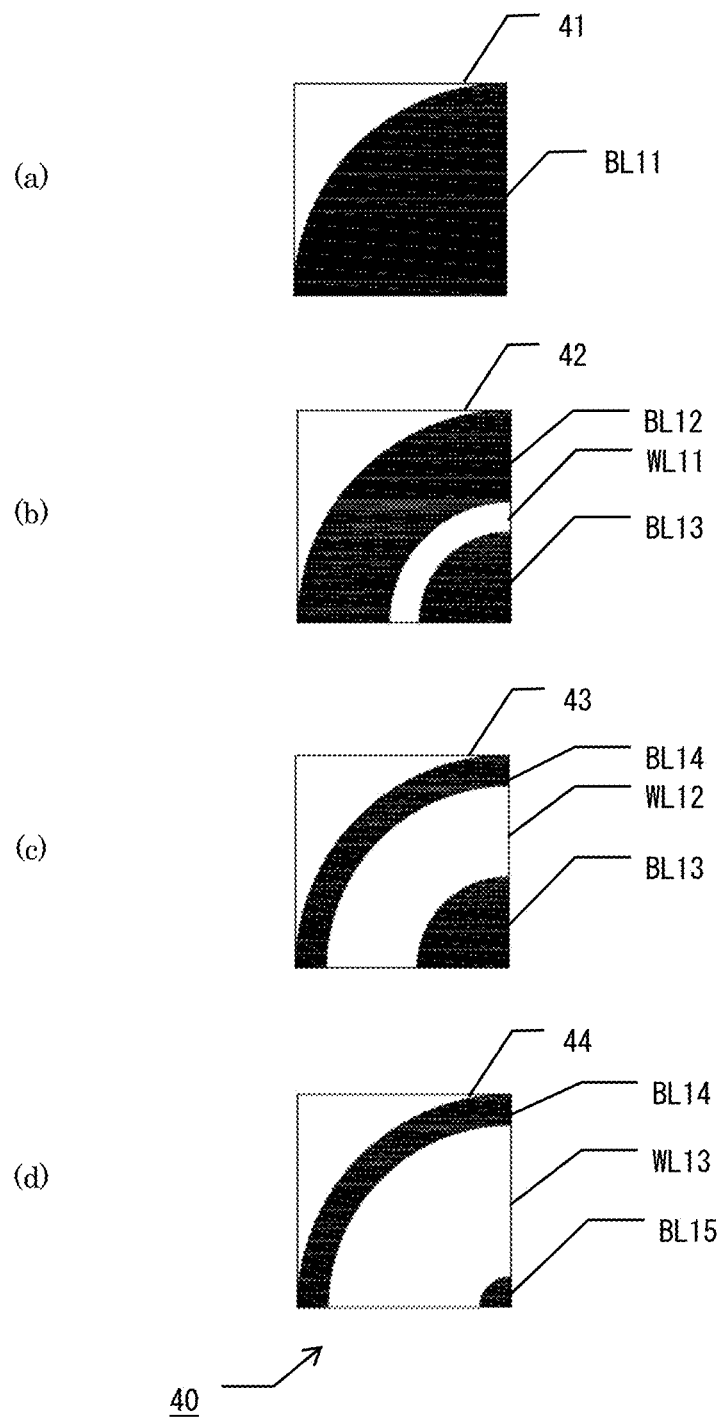

[FIG. 18]
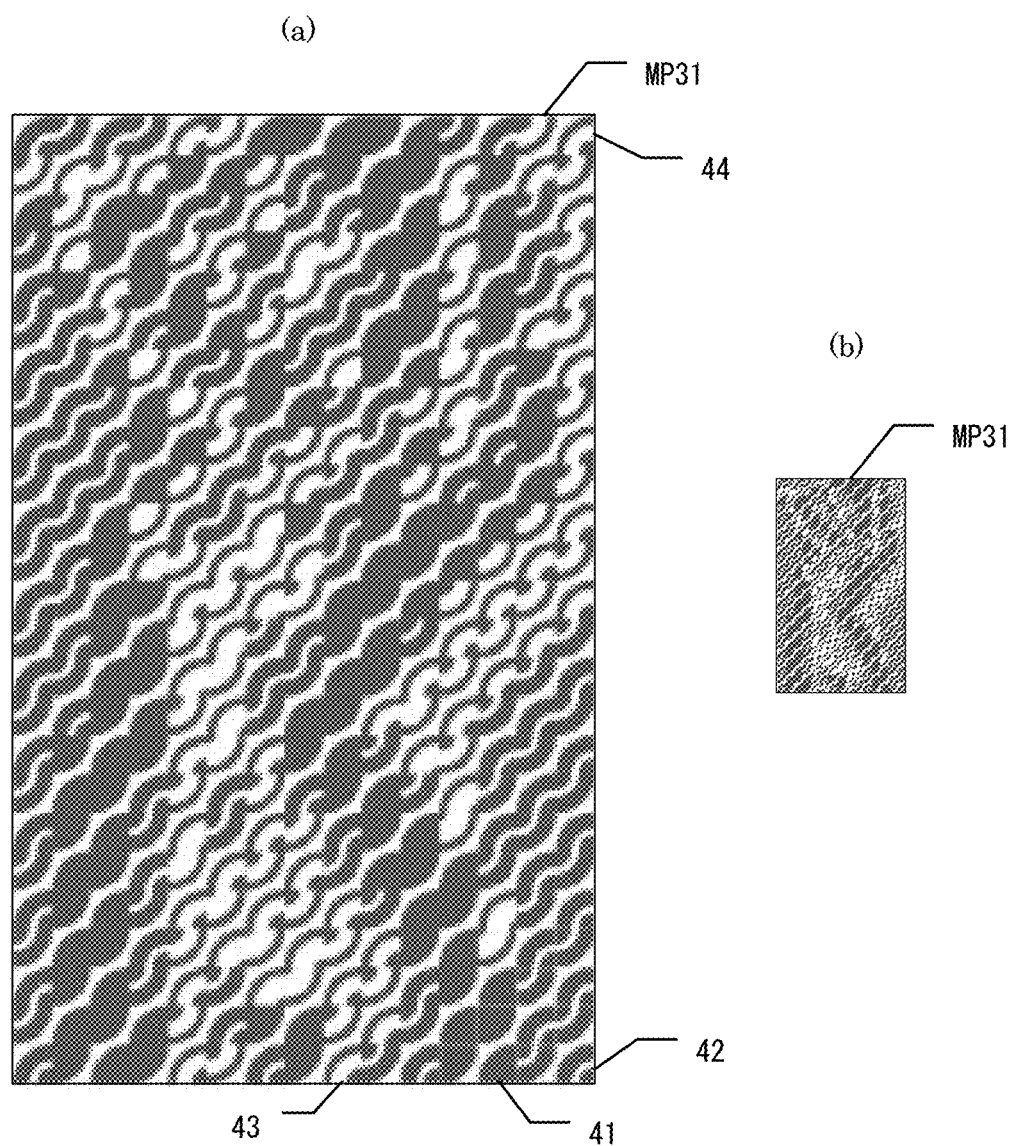

[FIG. 19]
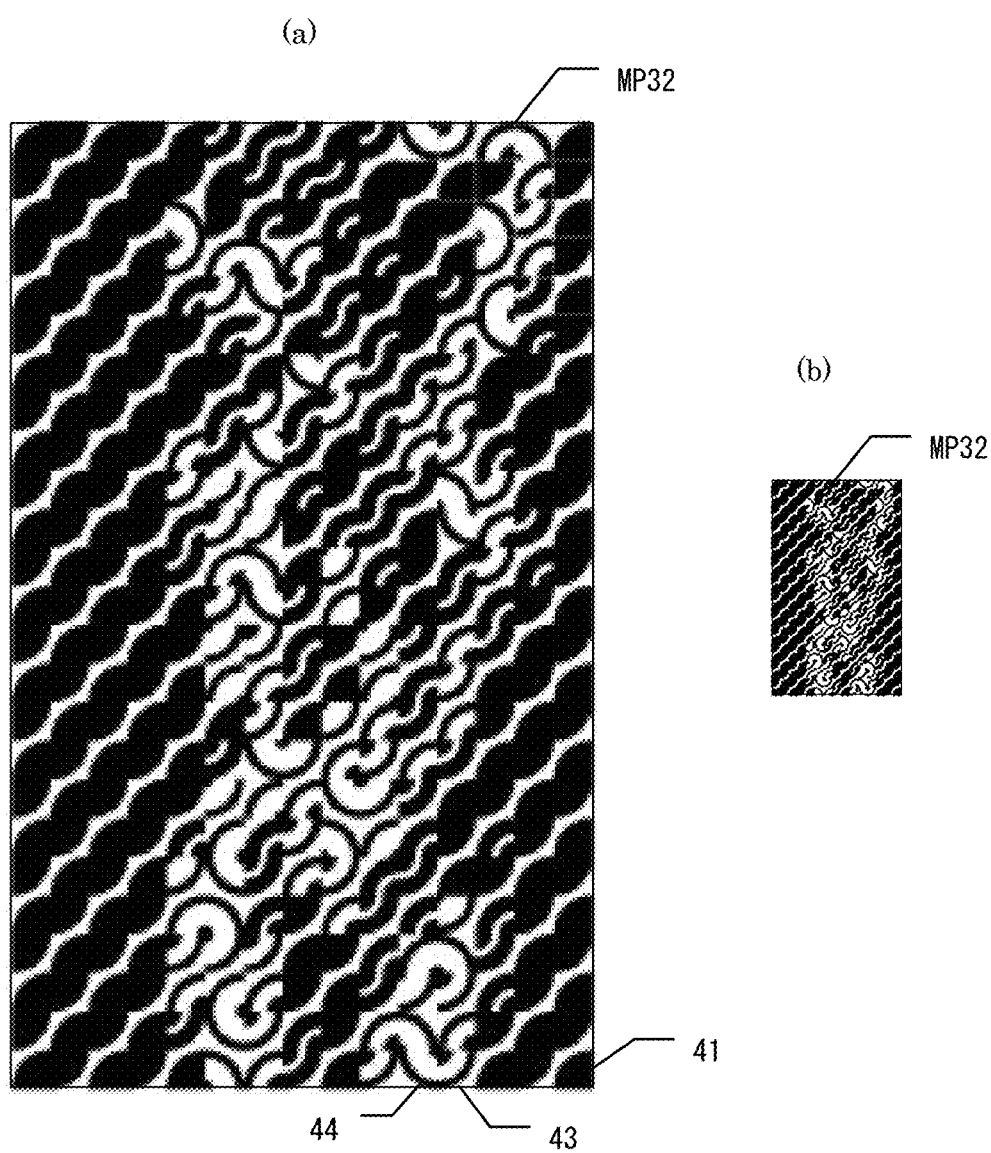

[FIG. 20]
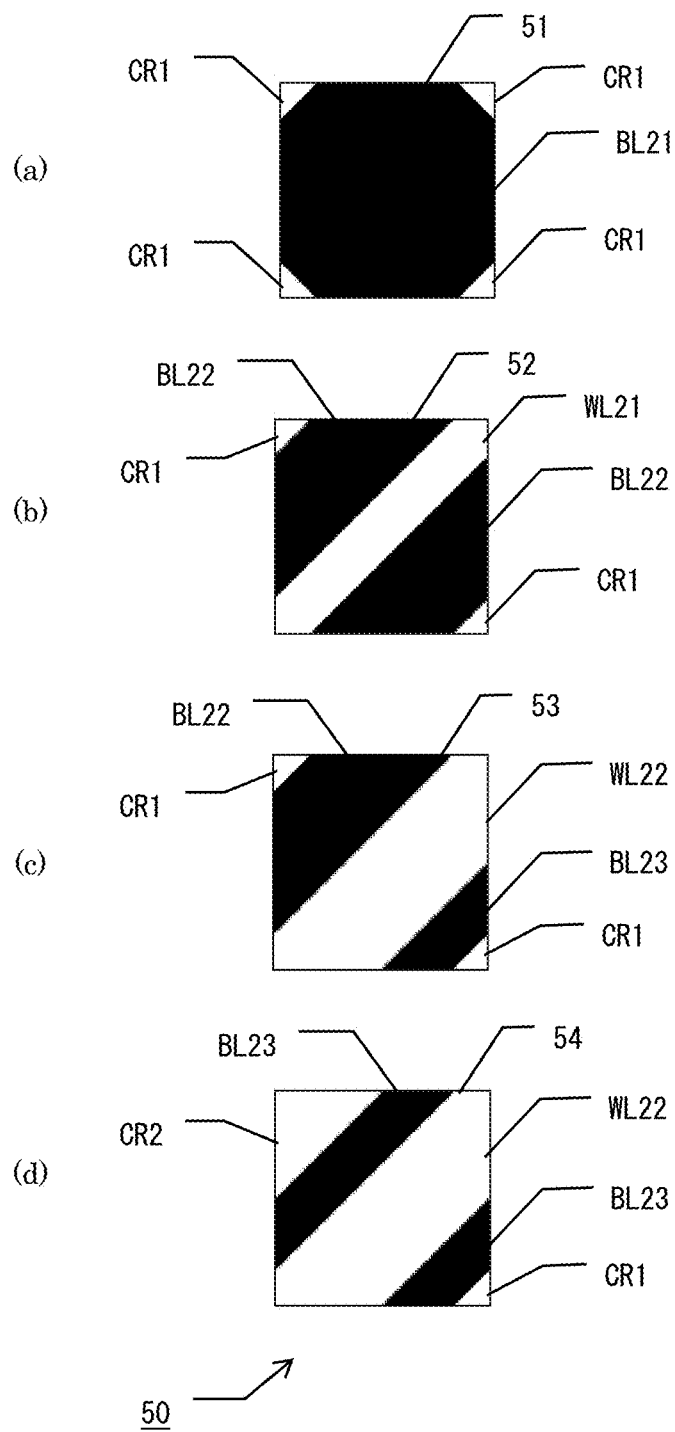

[FIG. 21]
(a)
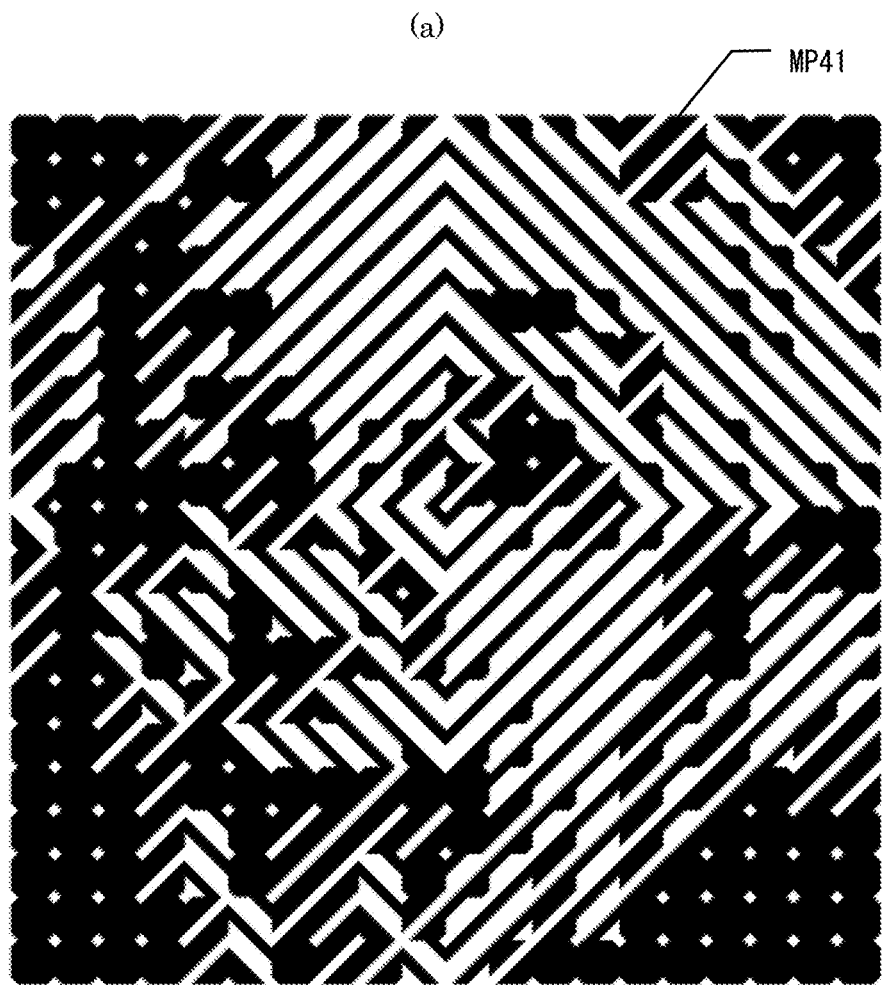
(b)
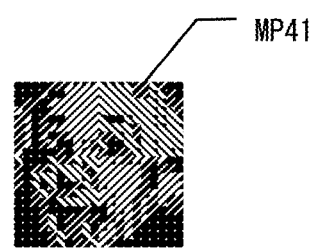

[FIG. 22]
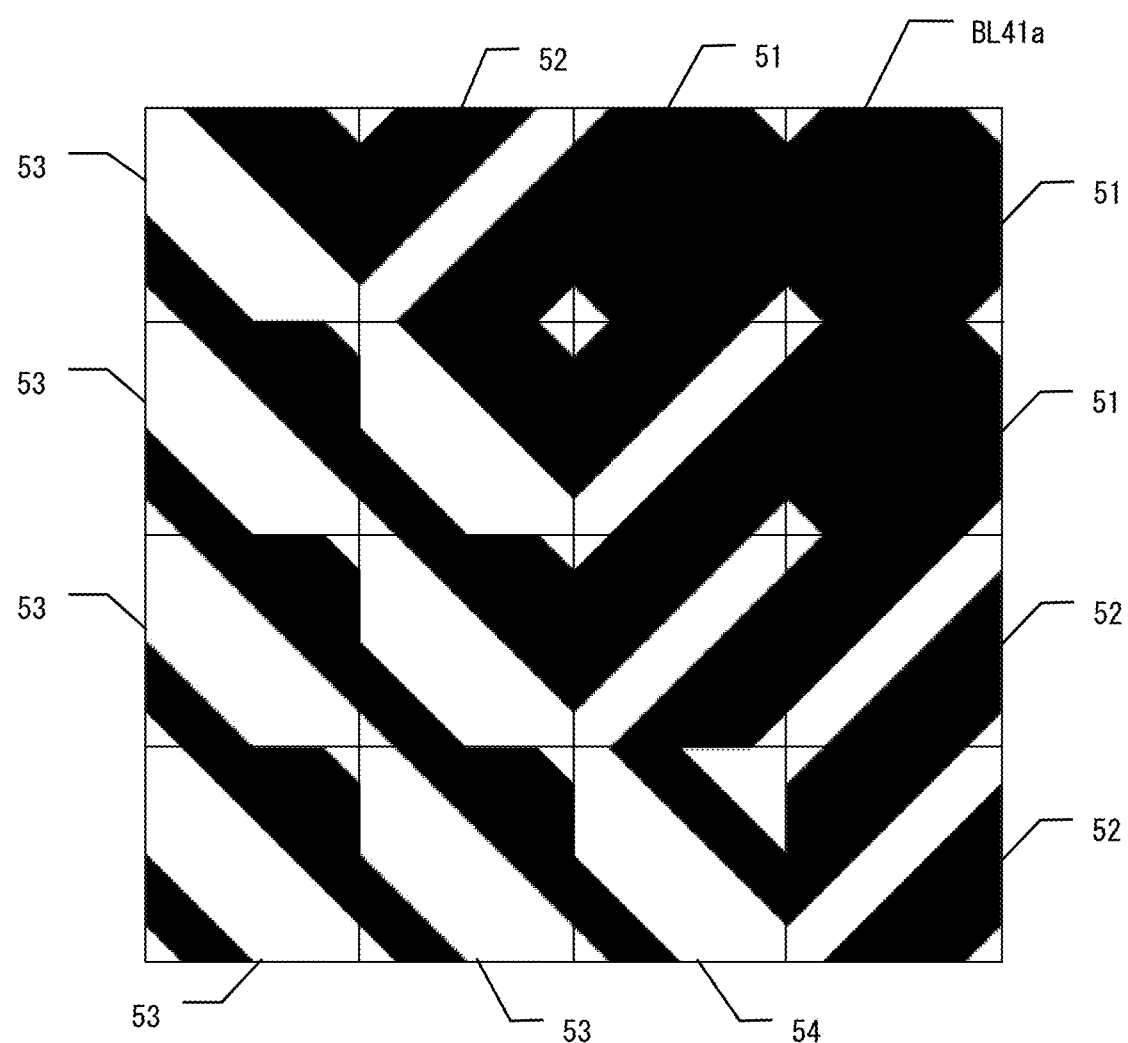

[FIG. 23]
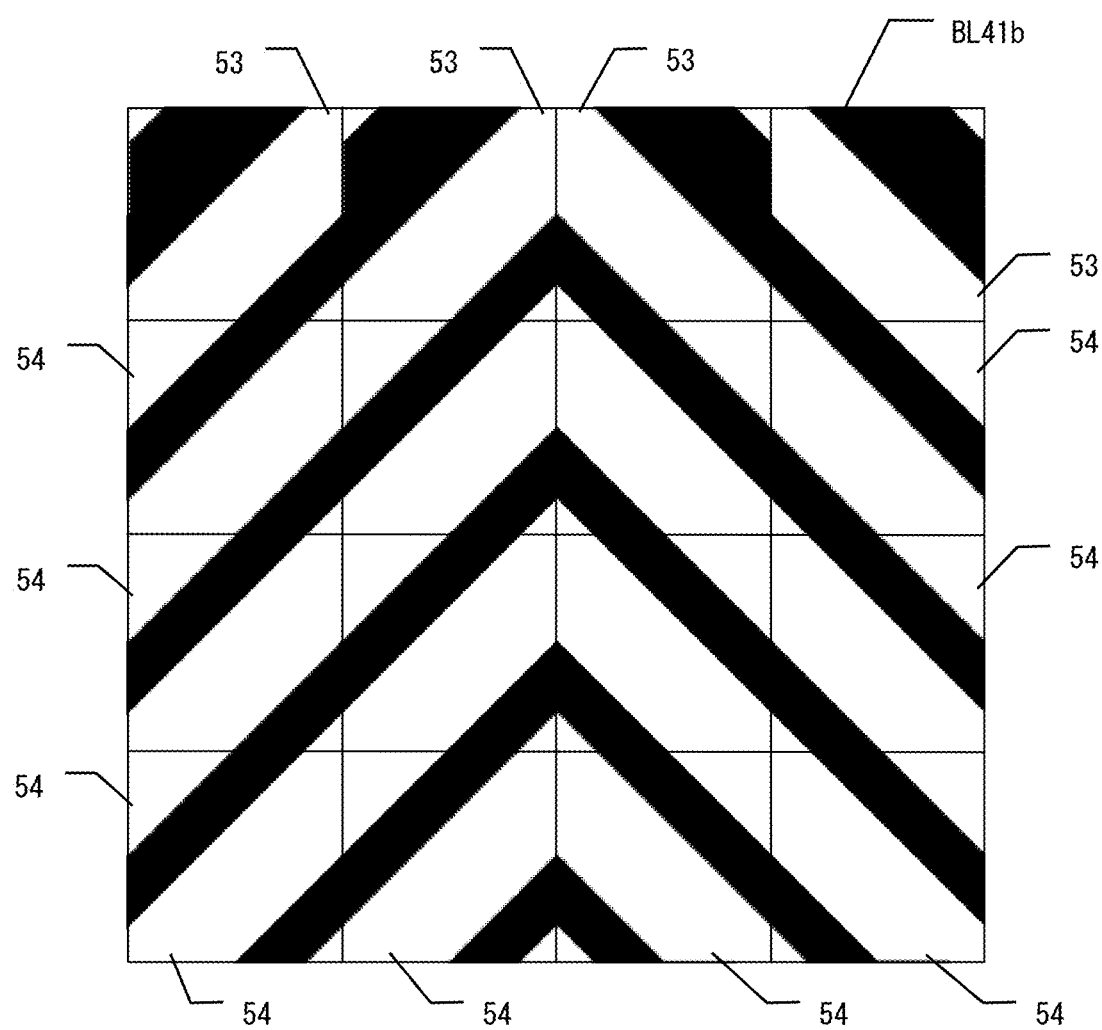

[FIG. 24]
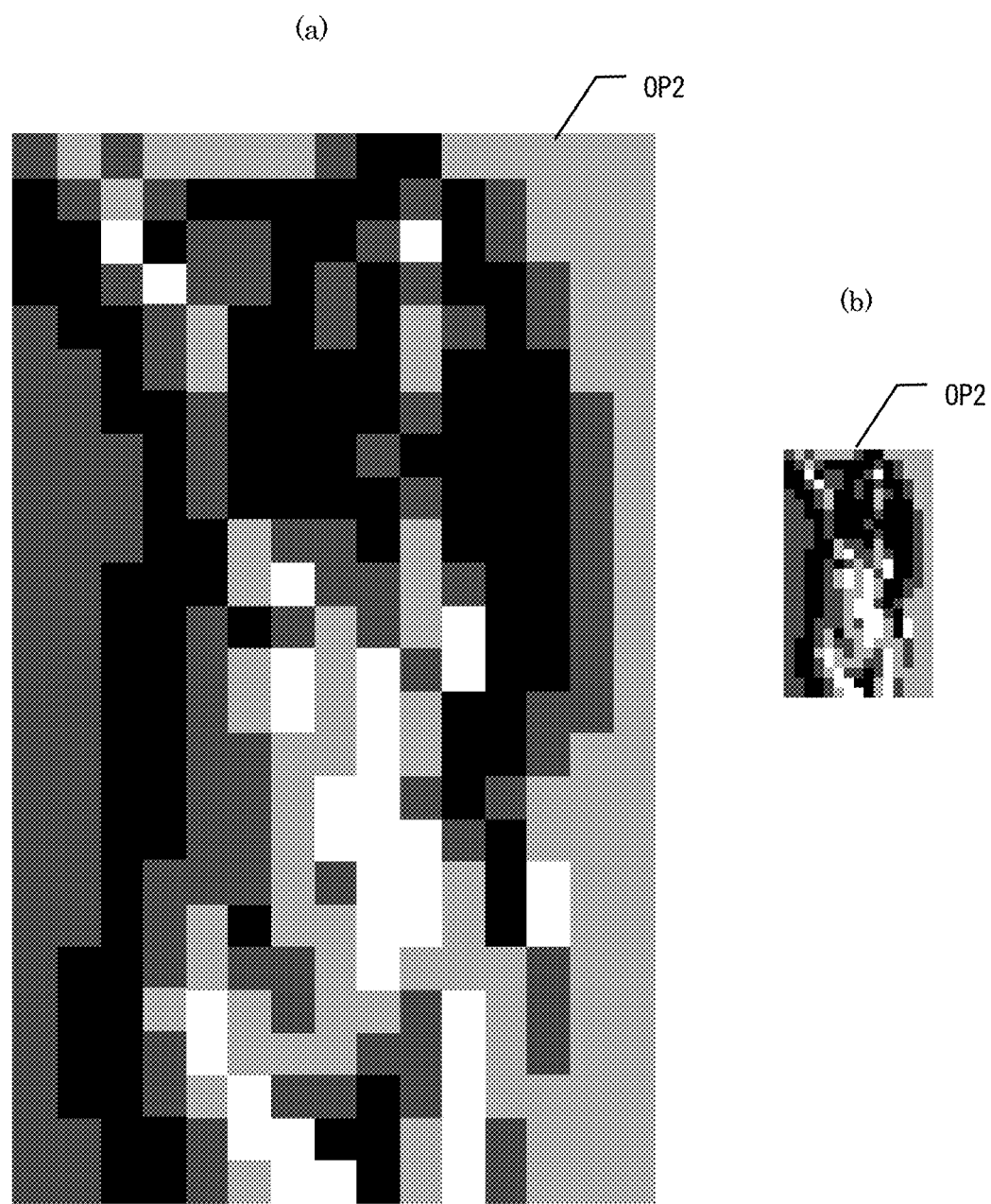

[FIG. 25]
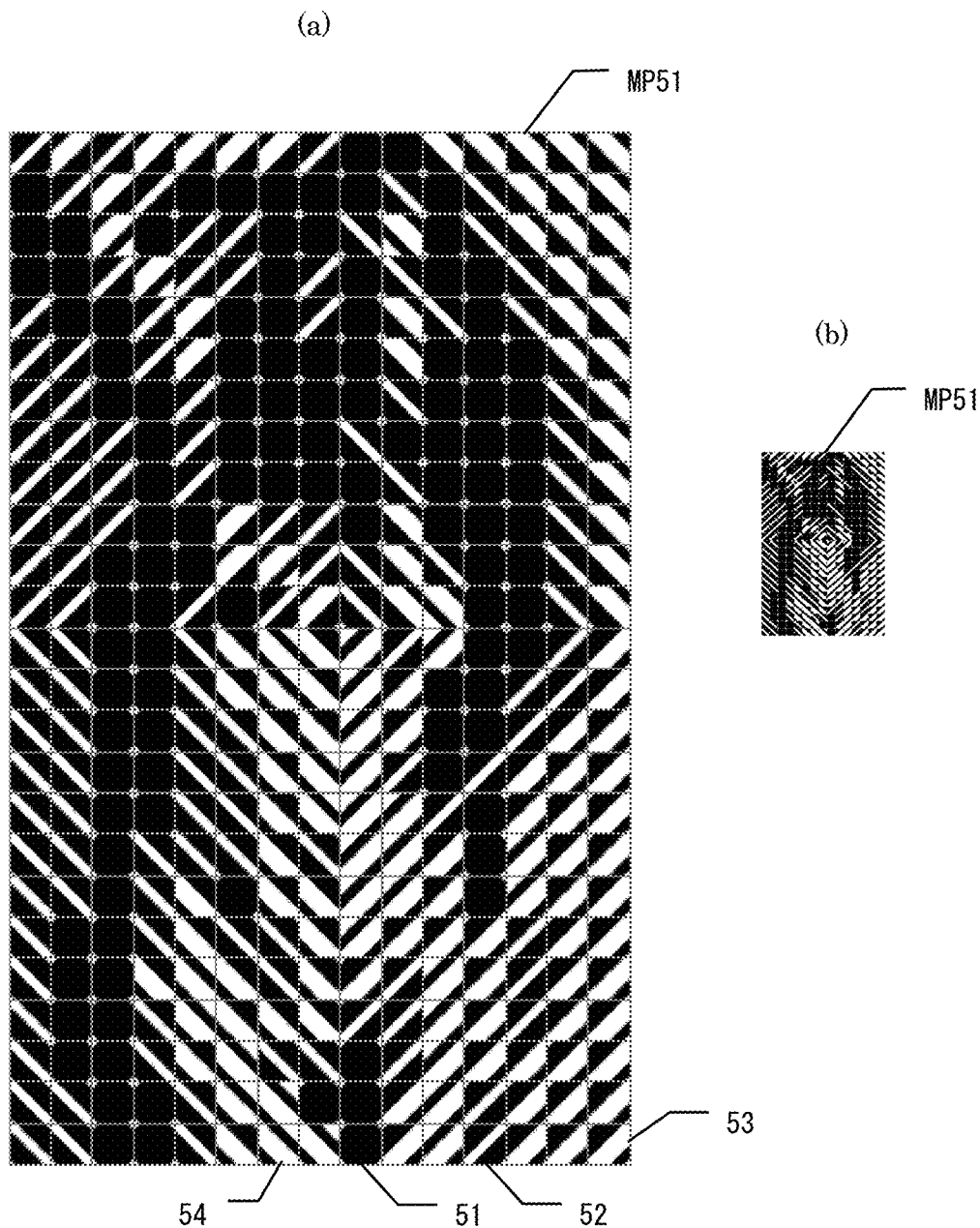

[FIG. 26]
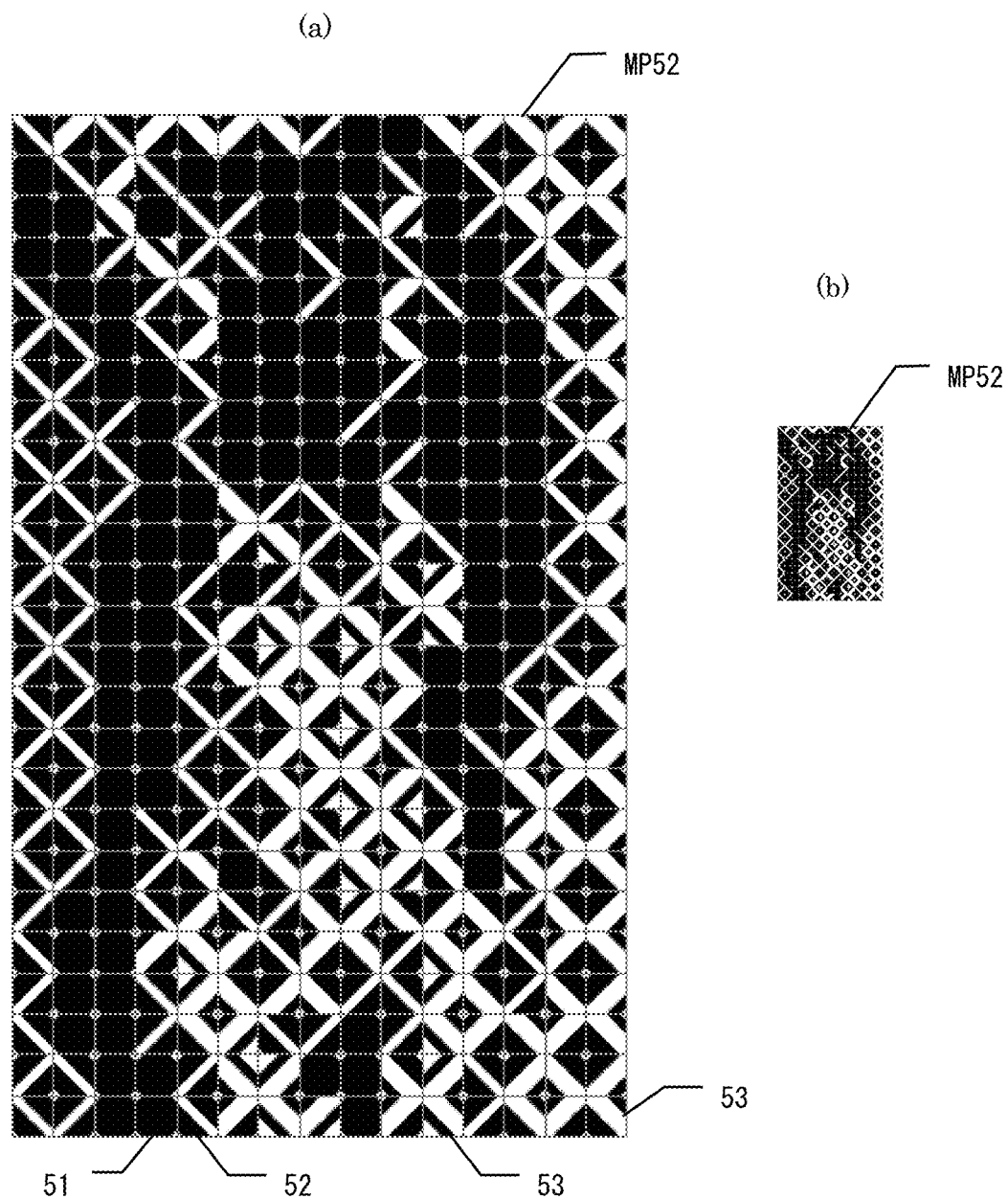

[FIG. 27]
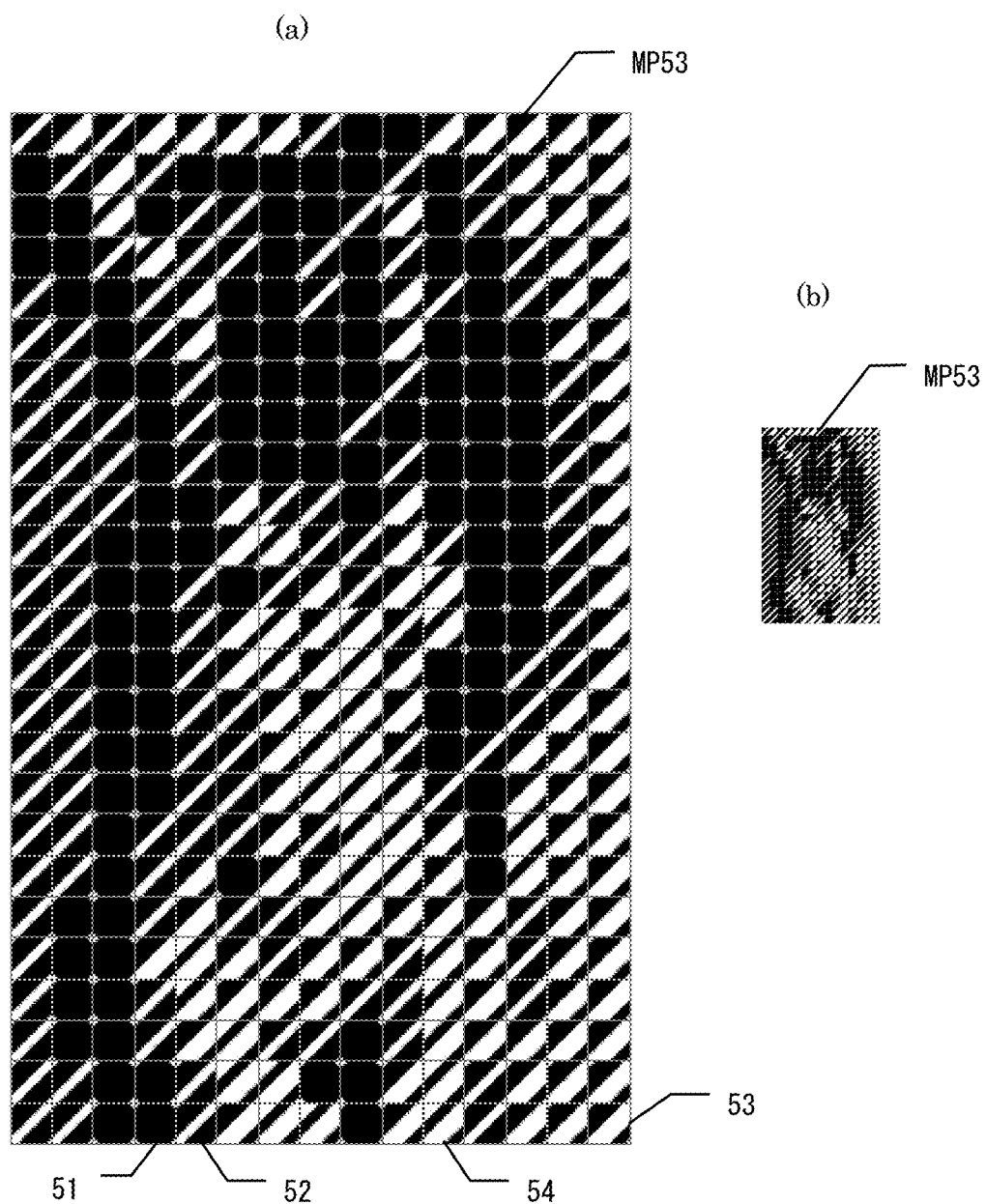

[FIG. 28]
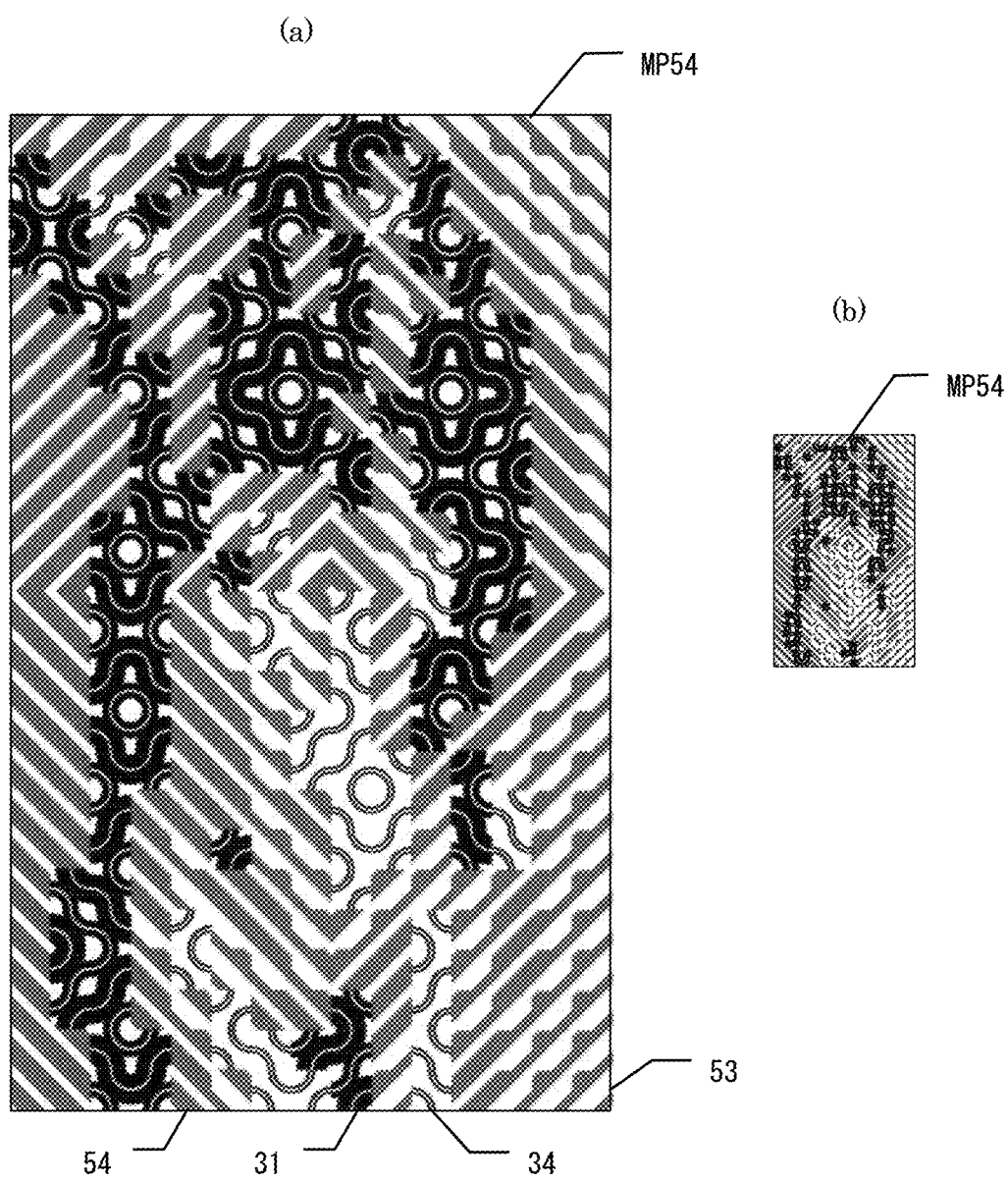

[FIG. 29]
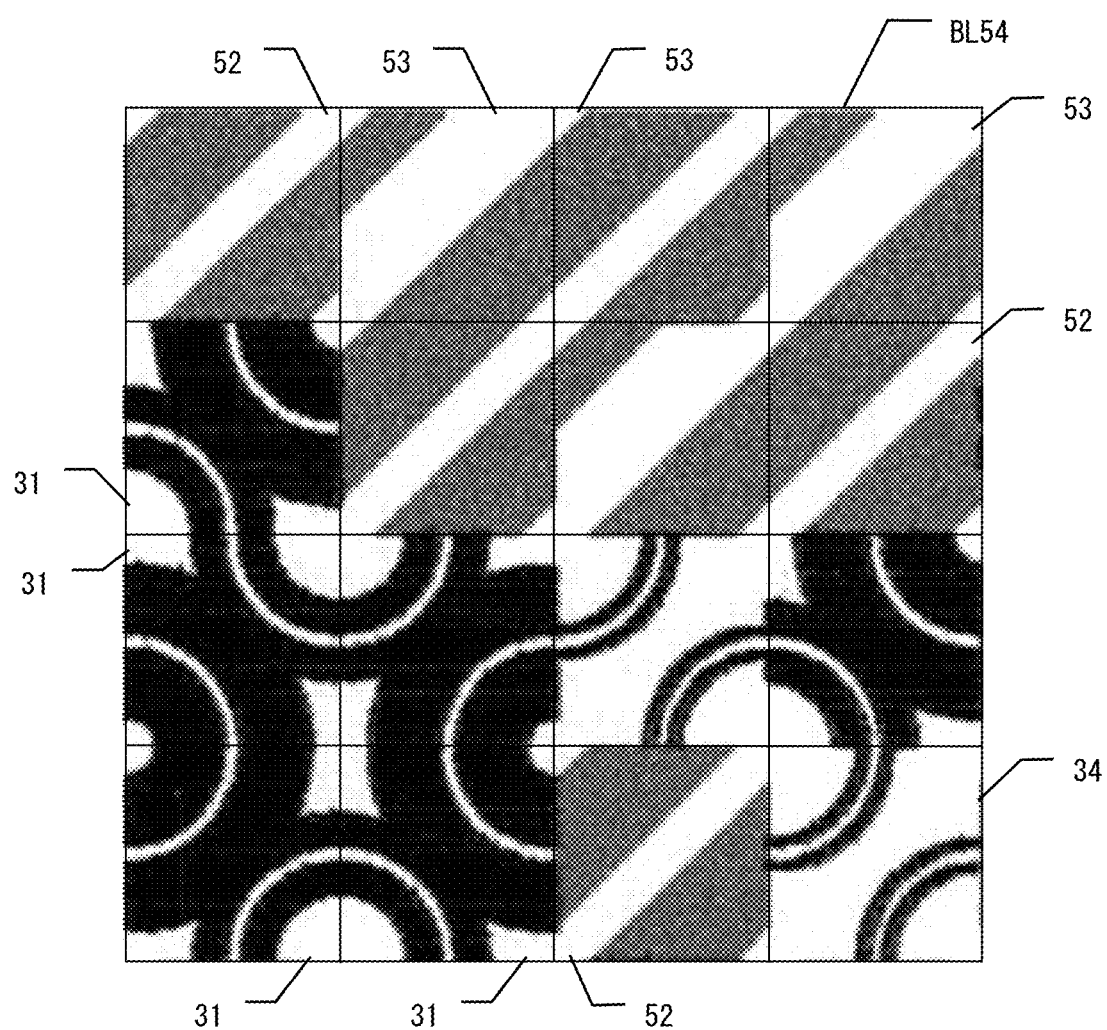

[FIG. 30]
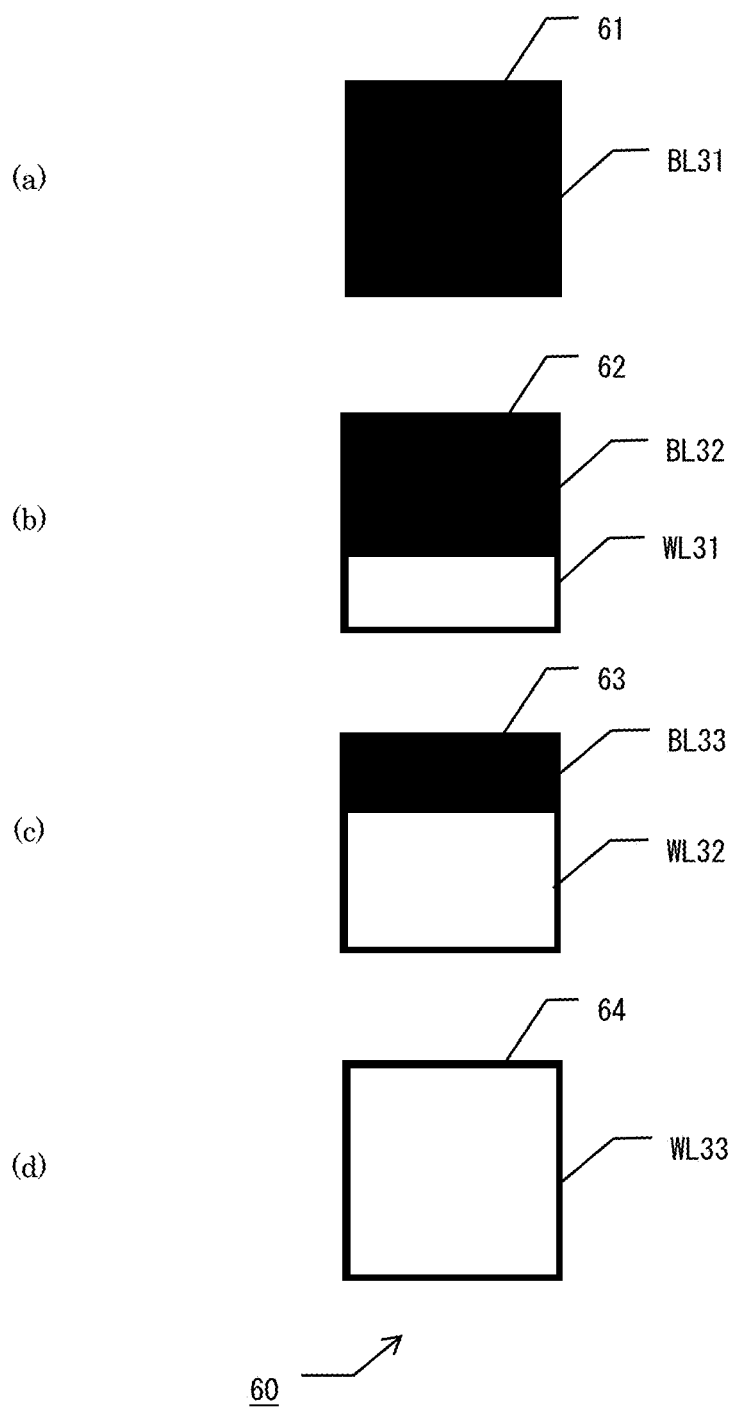

[FIG. 31]
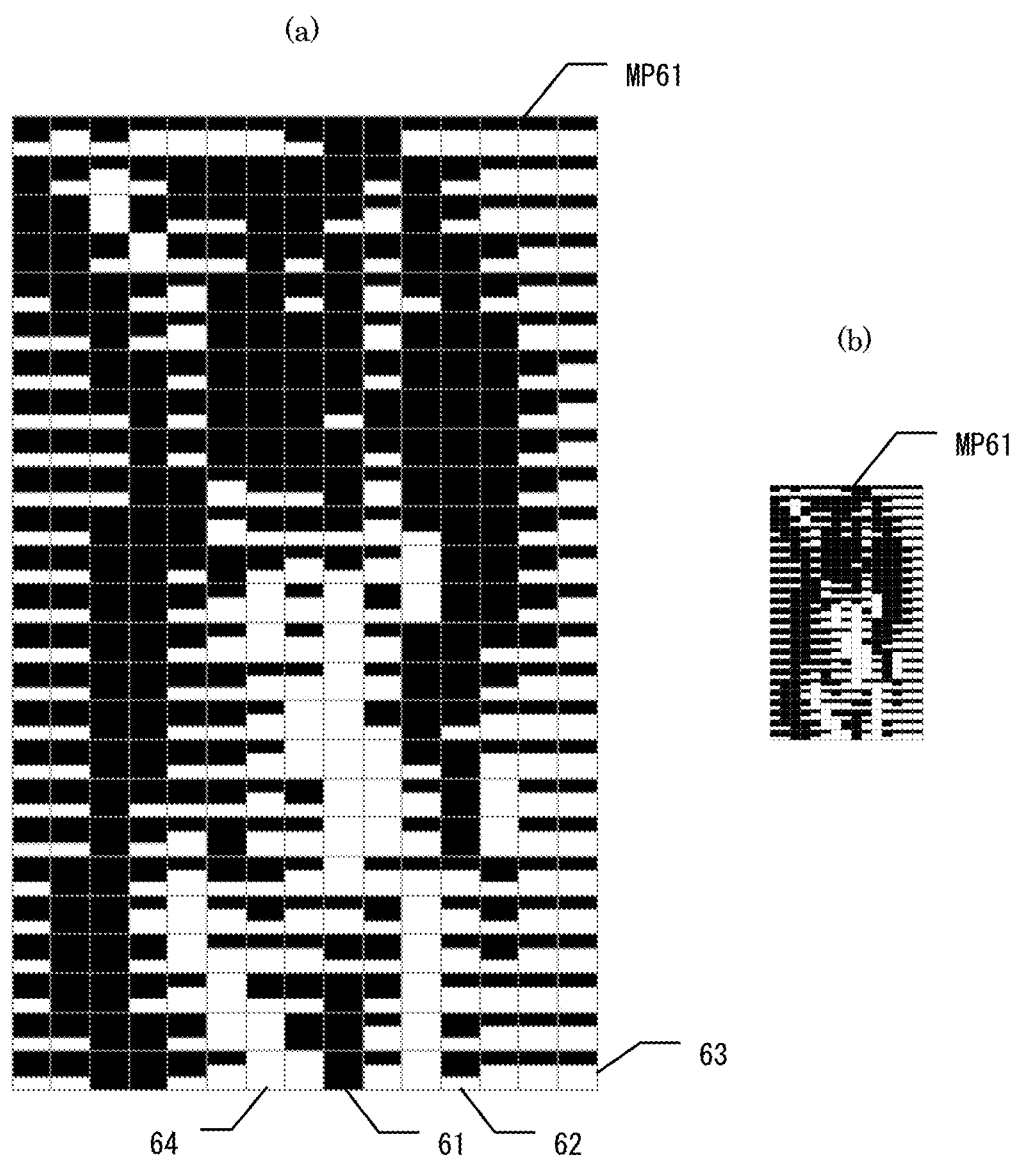

[FIG. 32]
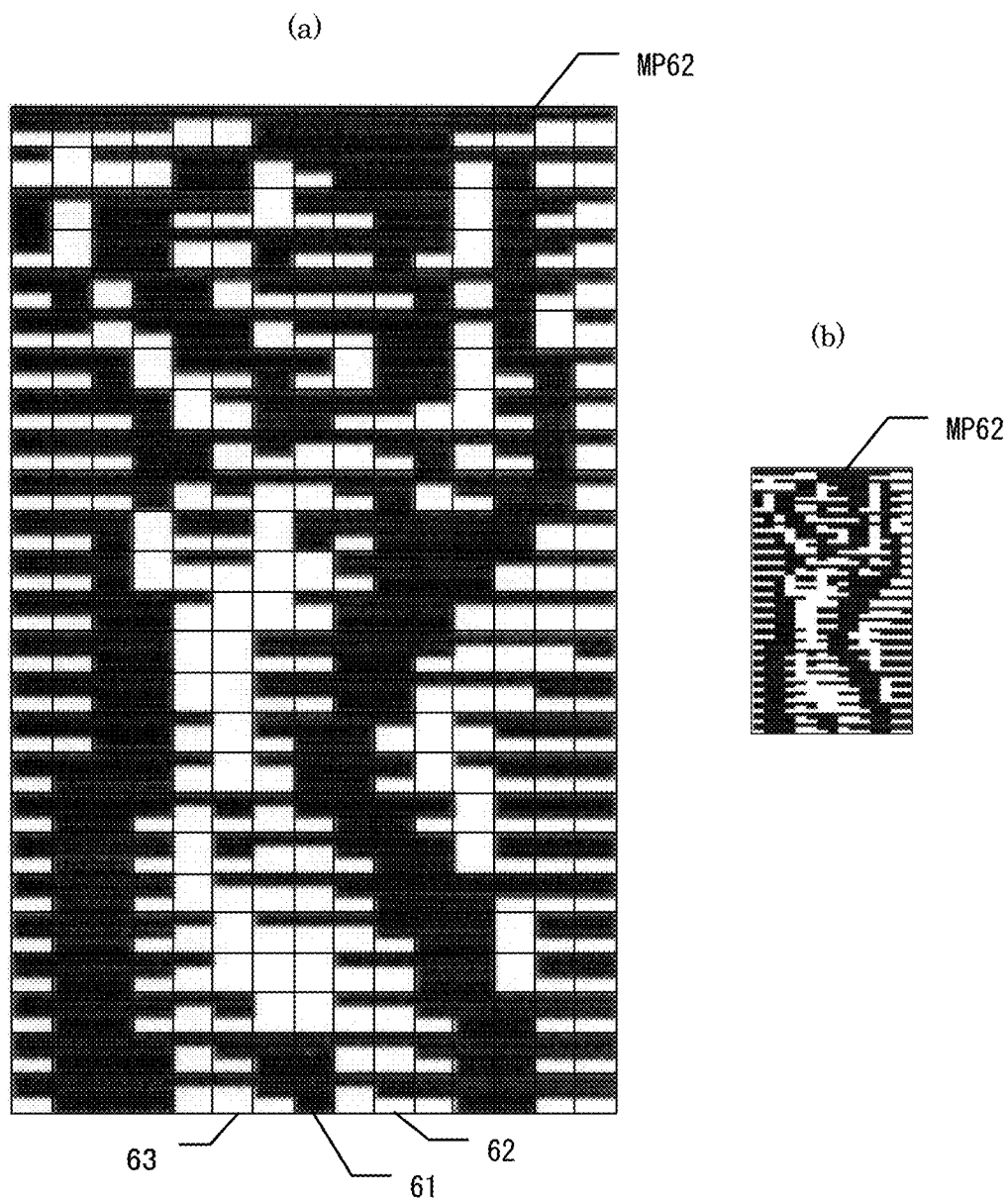

[FIG. 33]
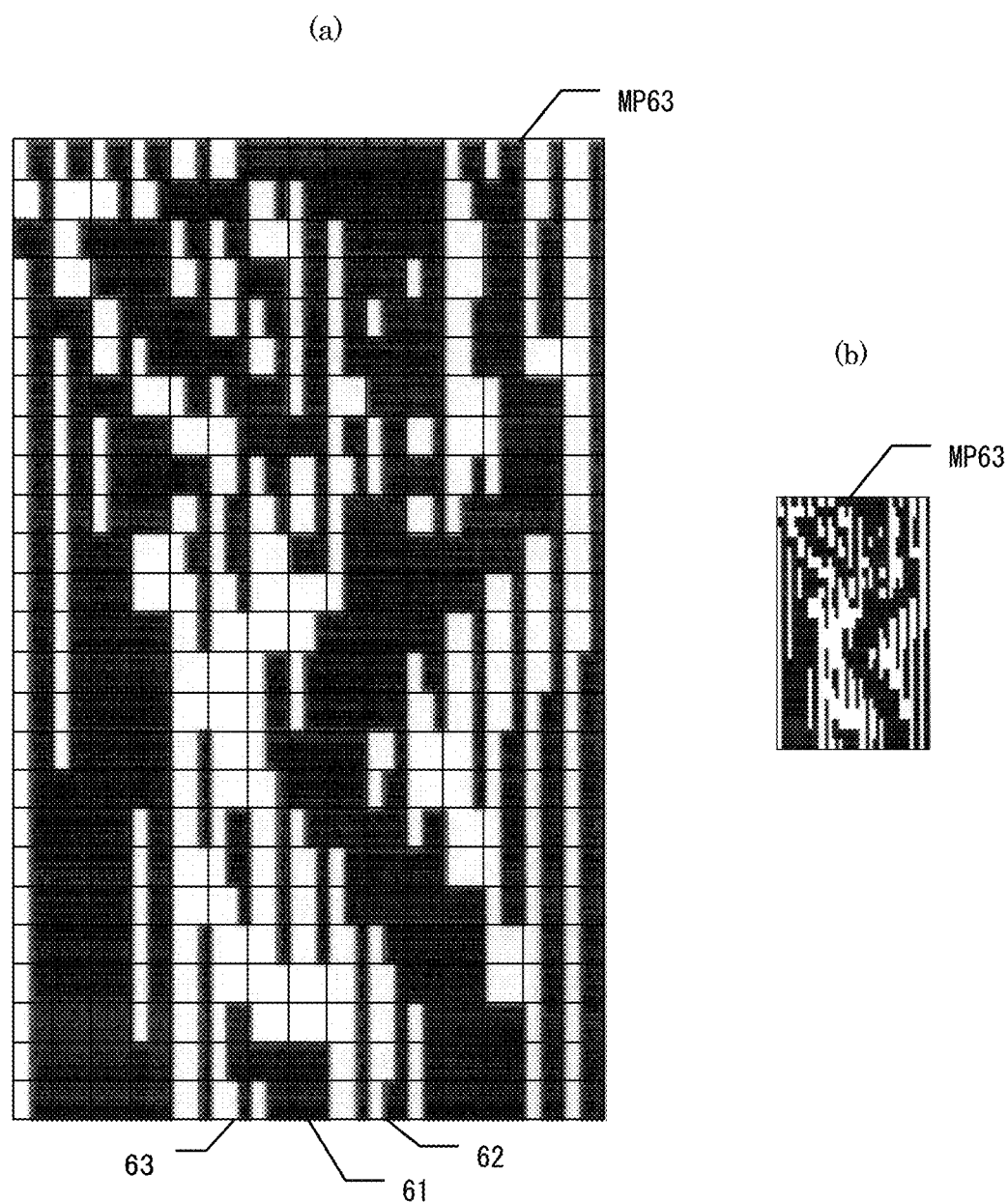

[FIG. 34]
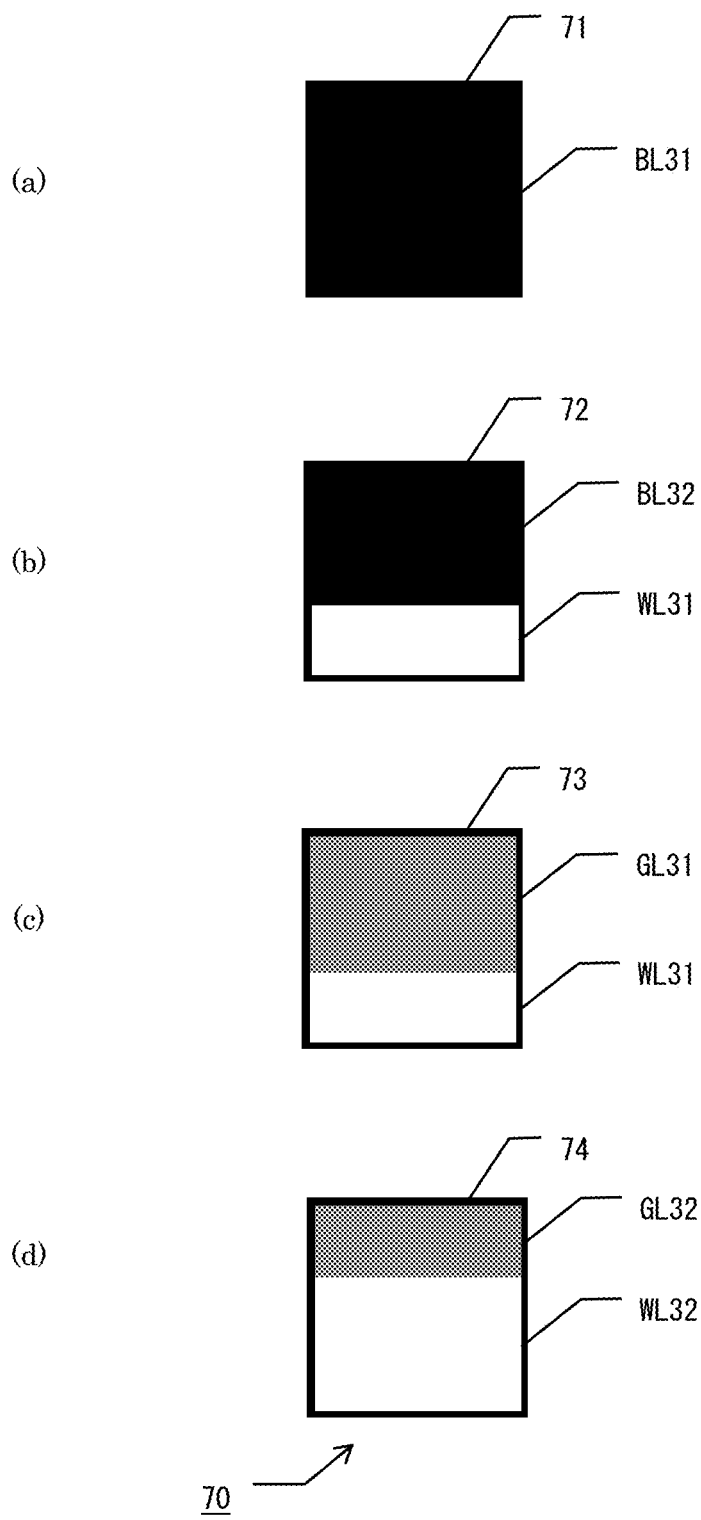

[FIG. 35]
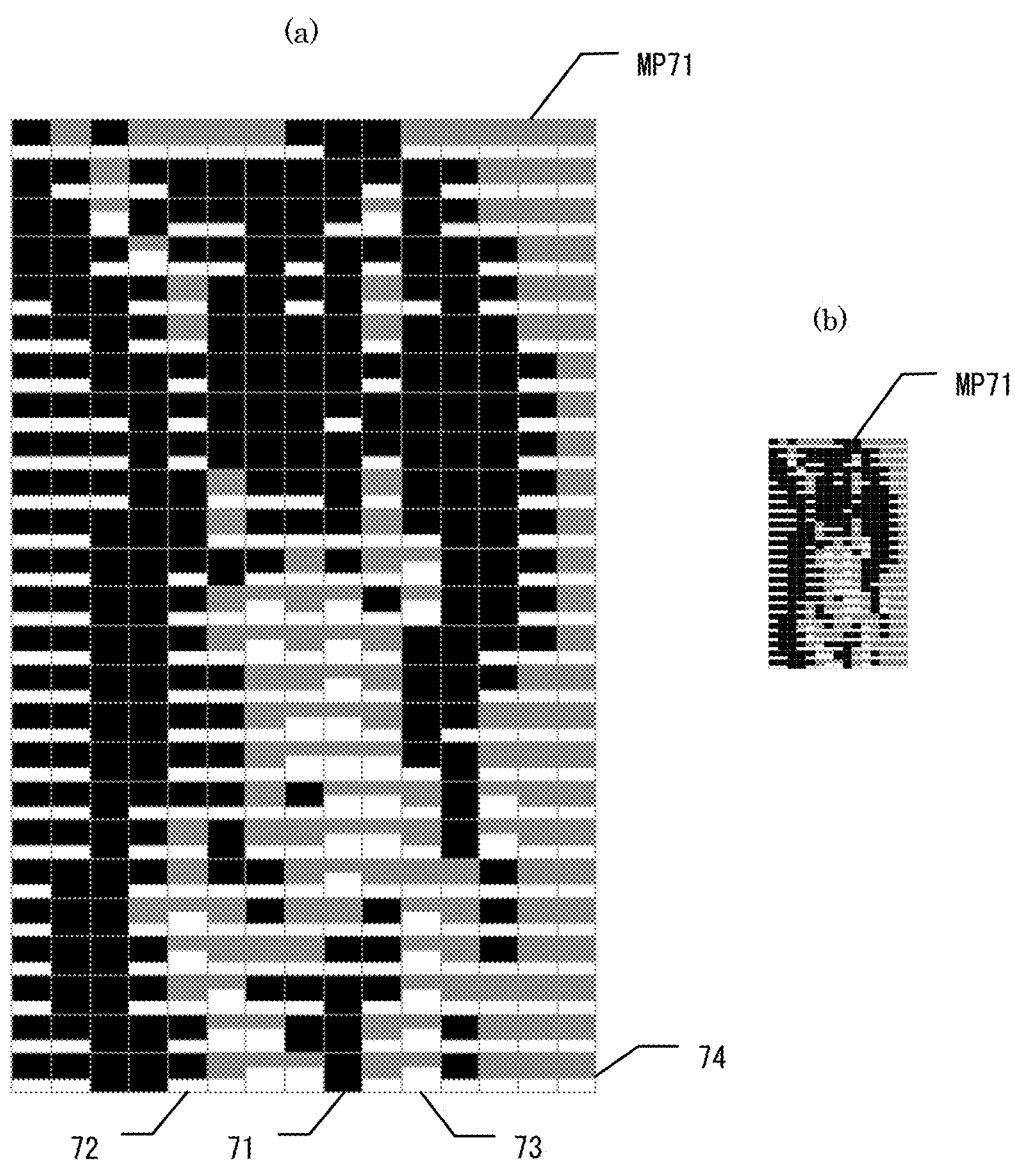

[FIG. 36]
(a) 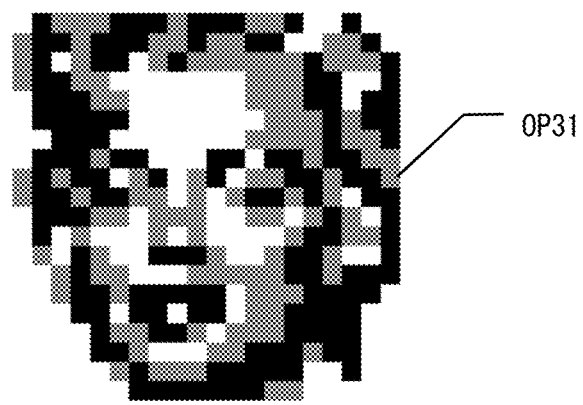
(b) 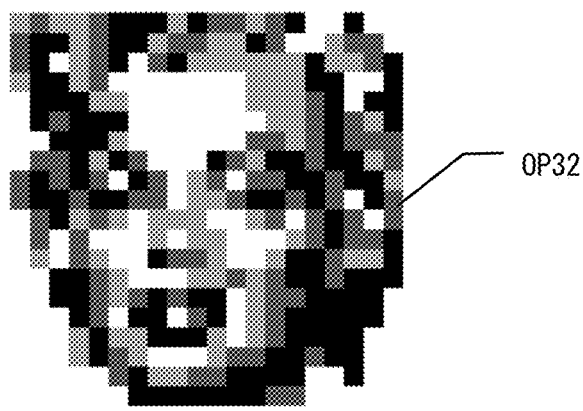
(c) 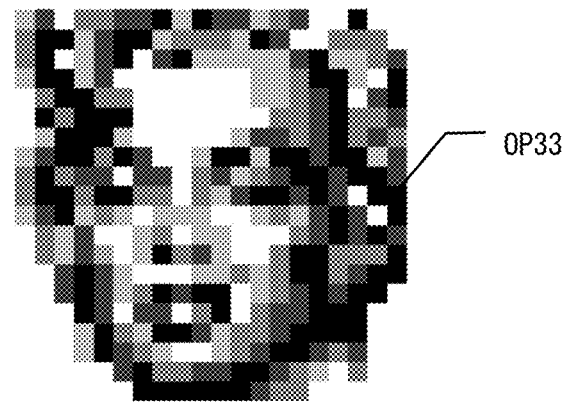

[FIG. 37]
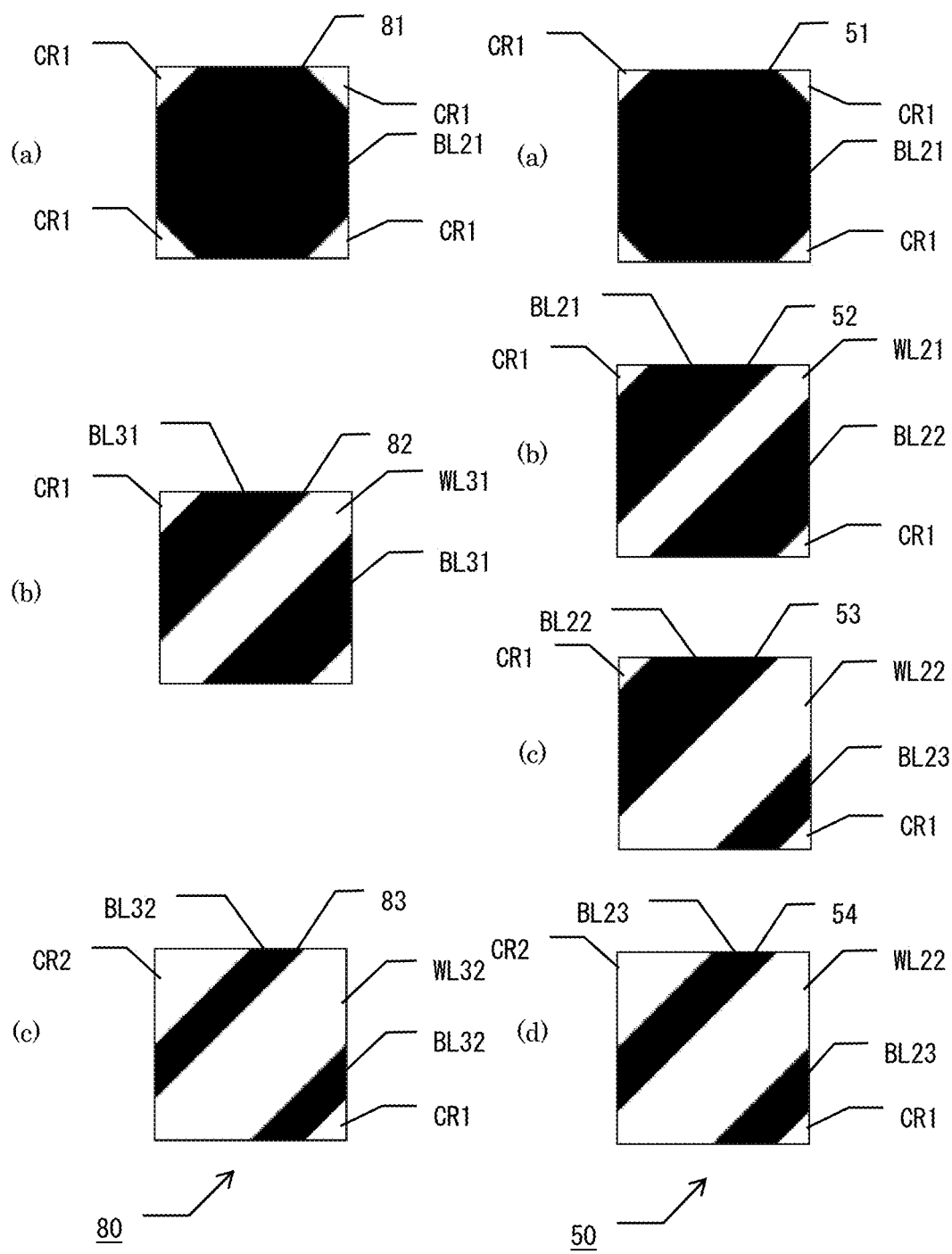

[FIG. 38]
(a)
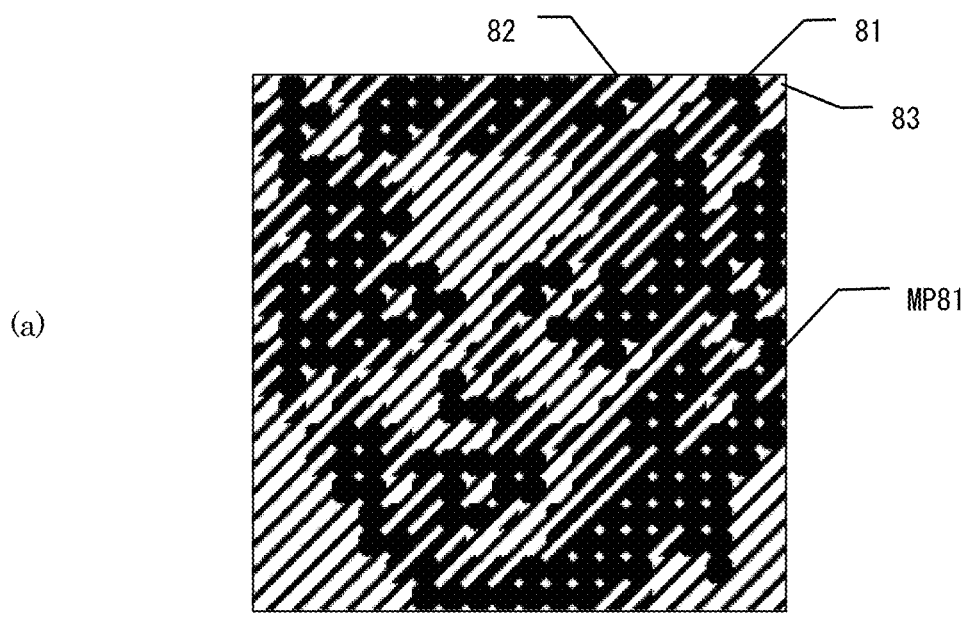
(b)
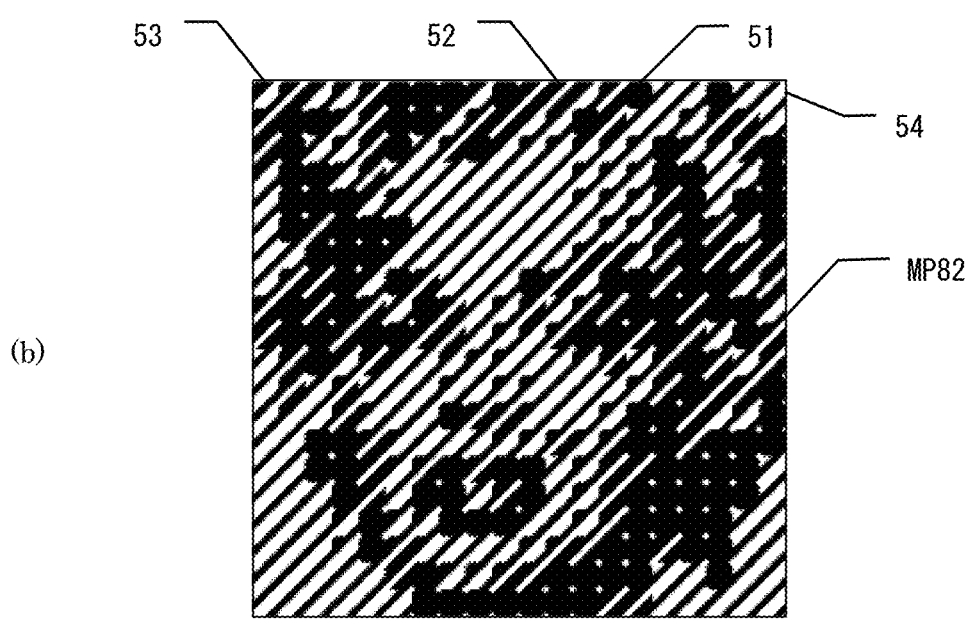

[FIG. 39]
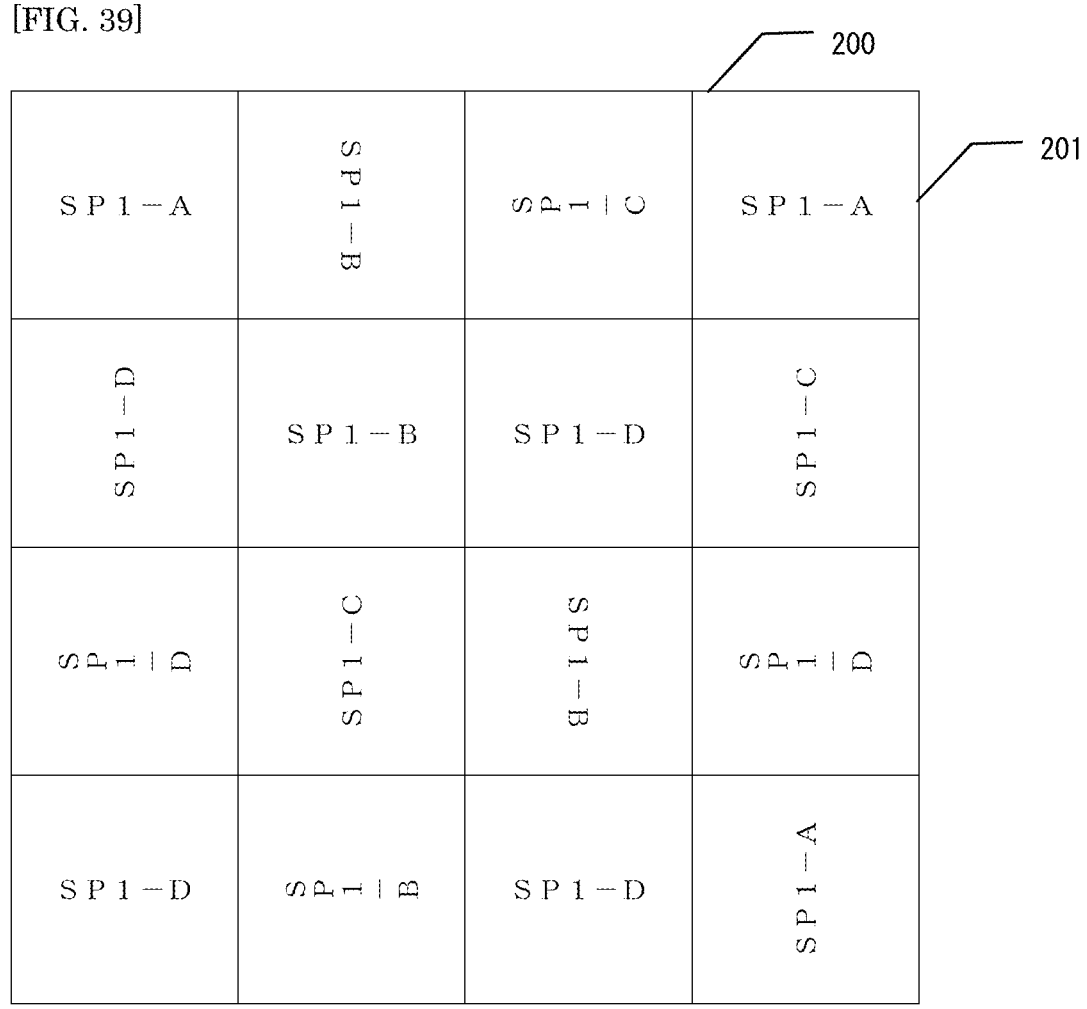

[FIG. 40]
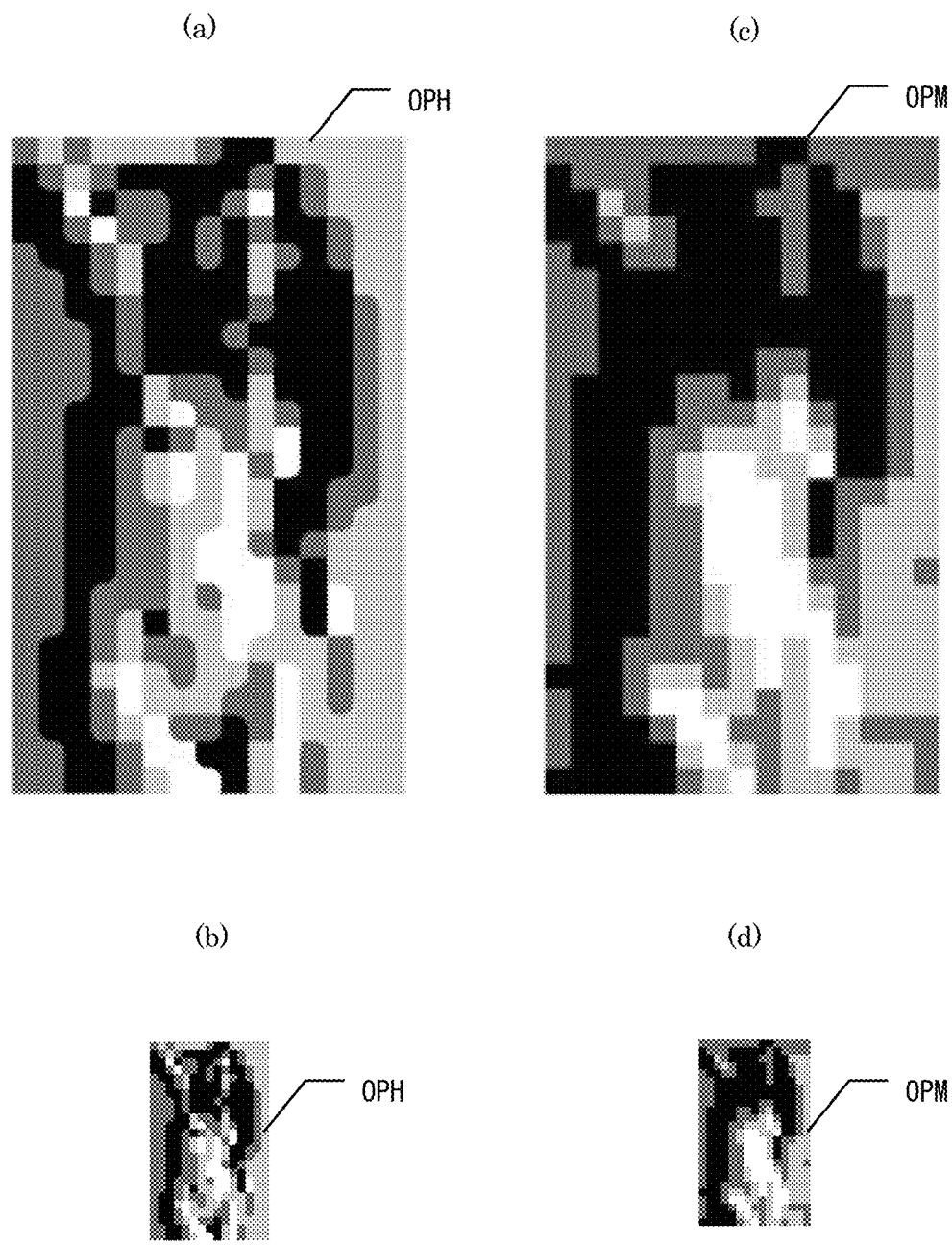

[FIG. 41]
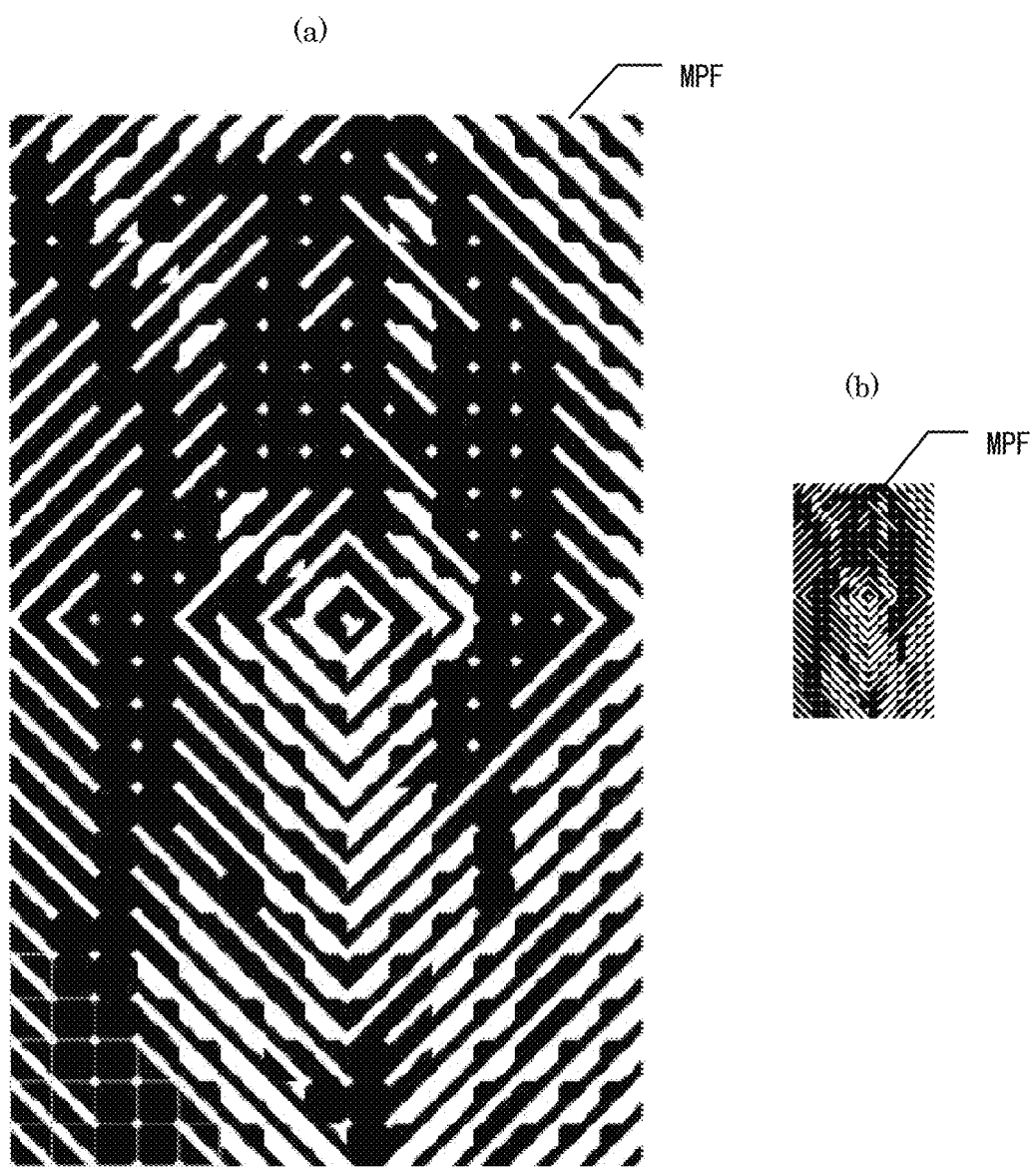

[FIG. 42]
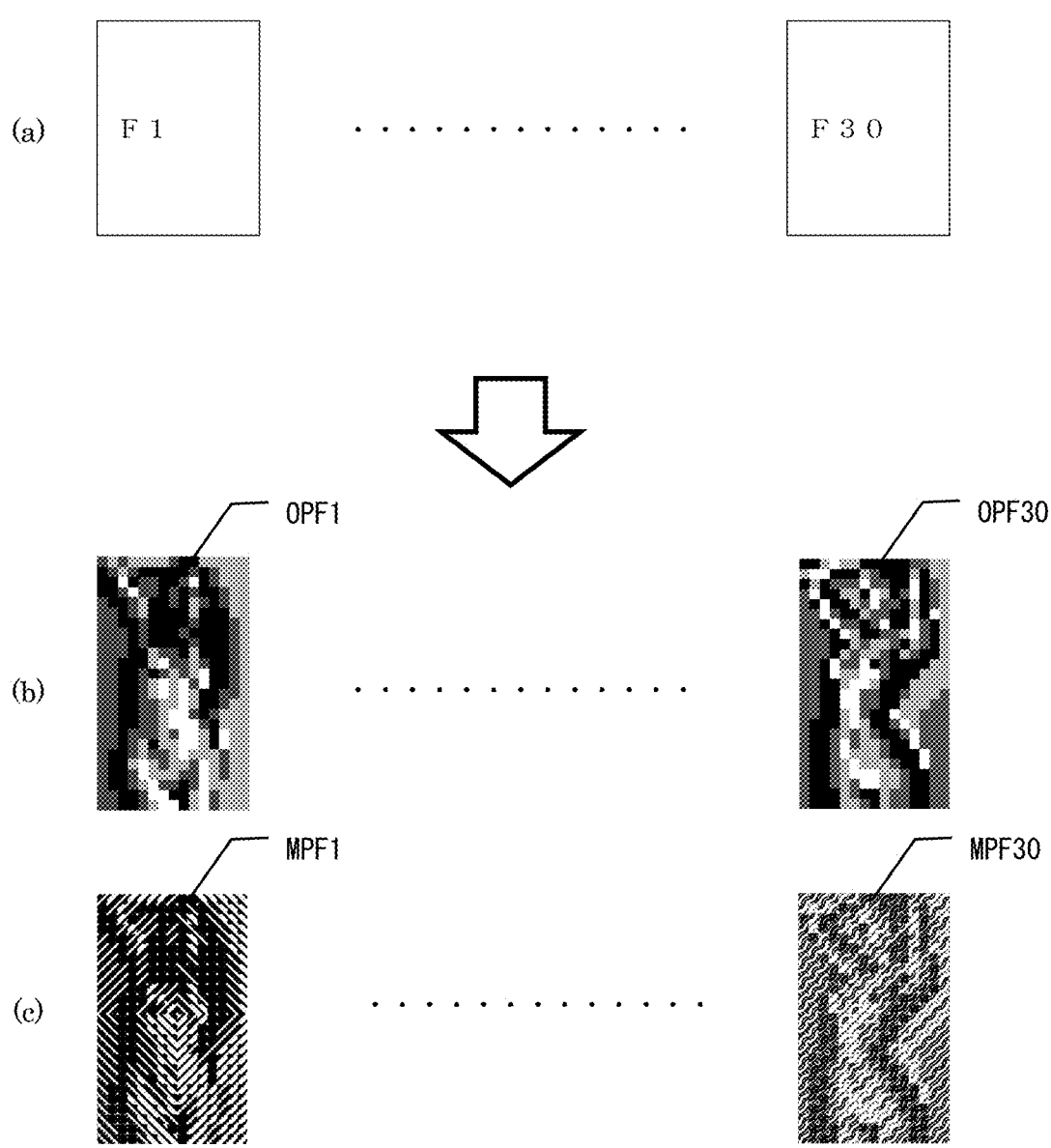

[FIG. 43]
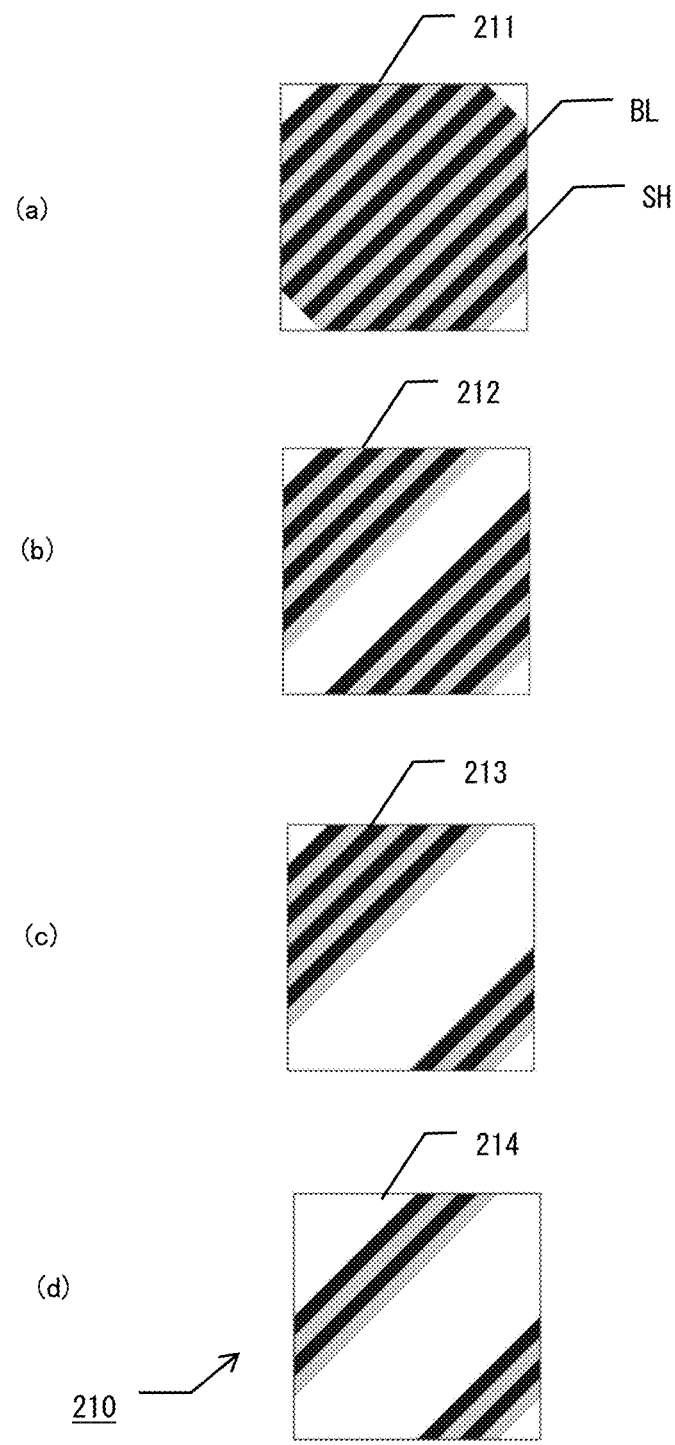

[FIG. 44]
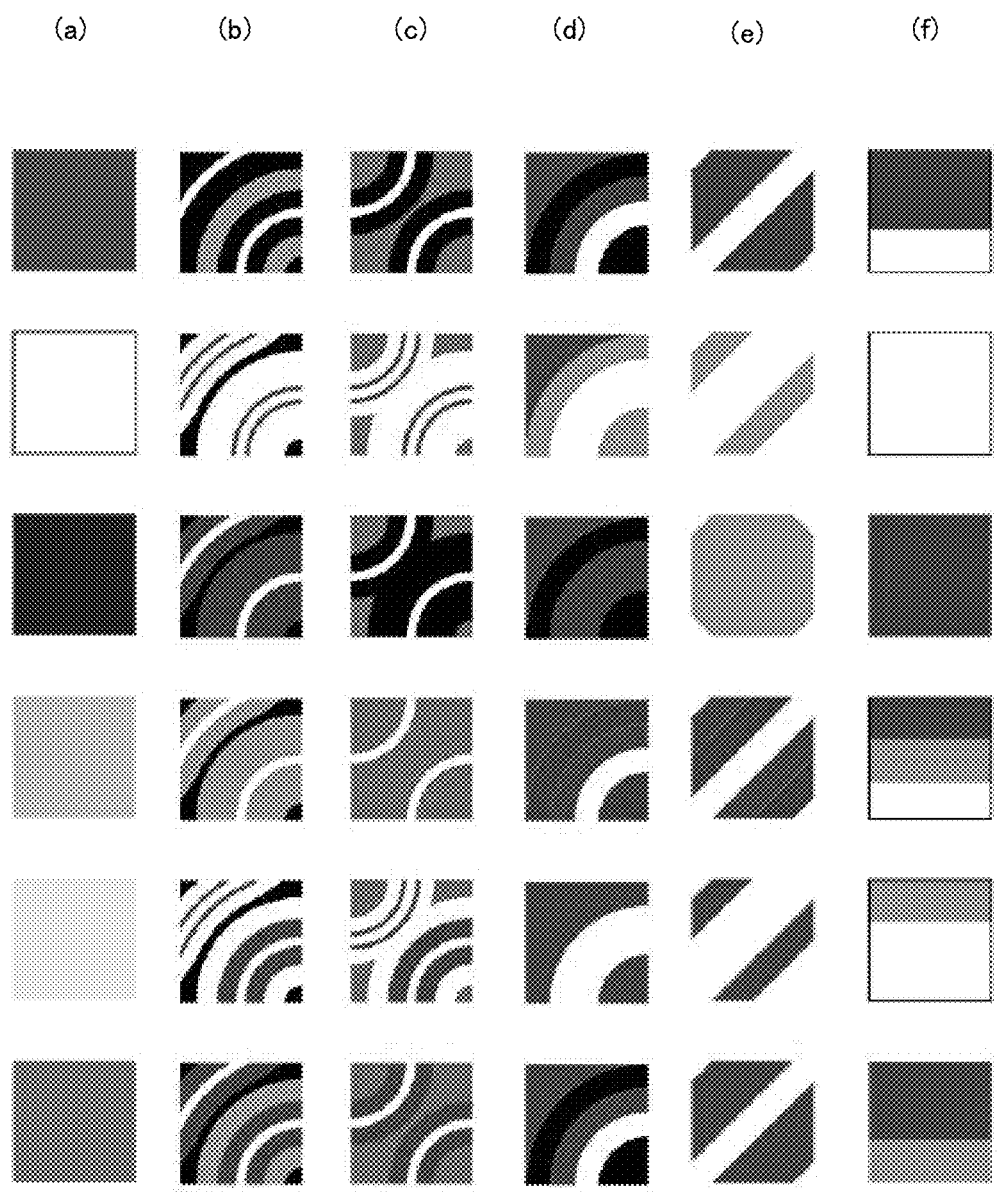

[FIG. 45]
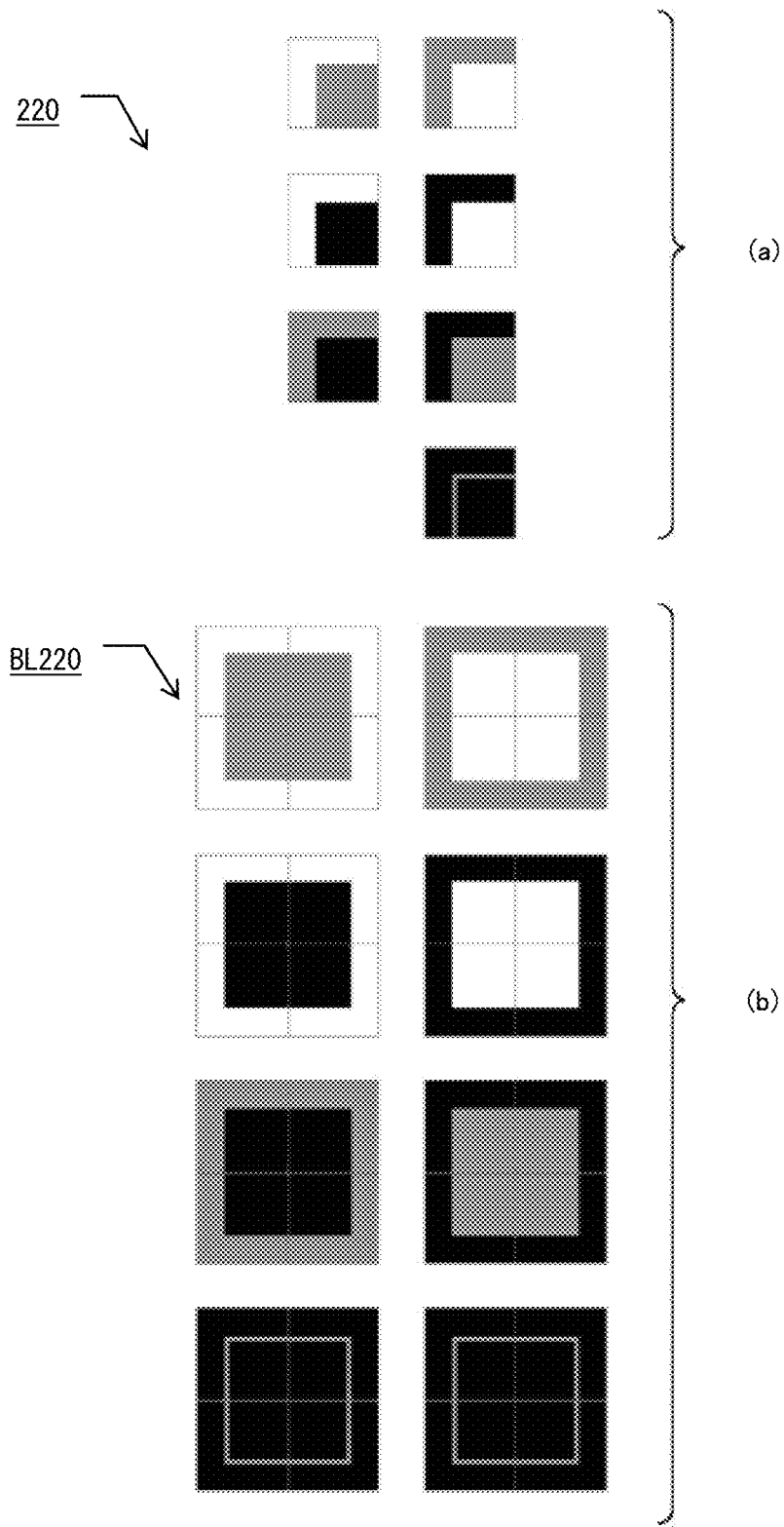

[FIG. 46]
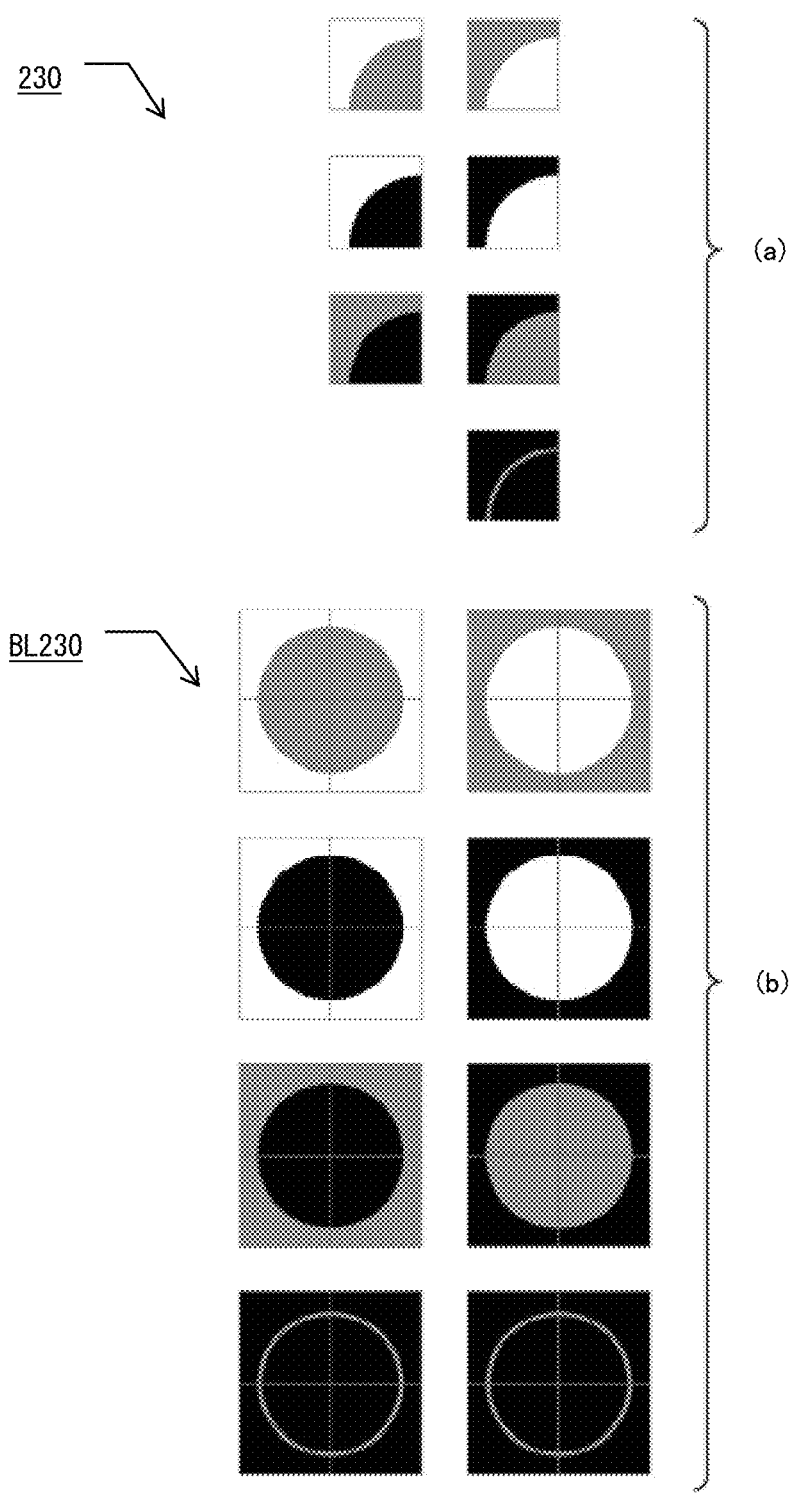

[FIG. 47]
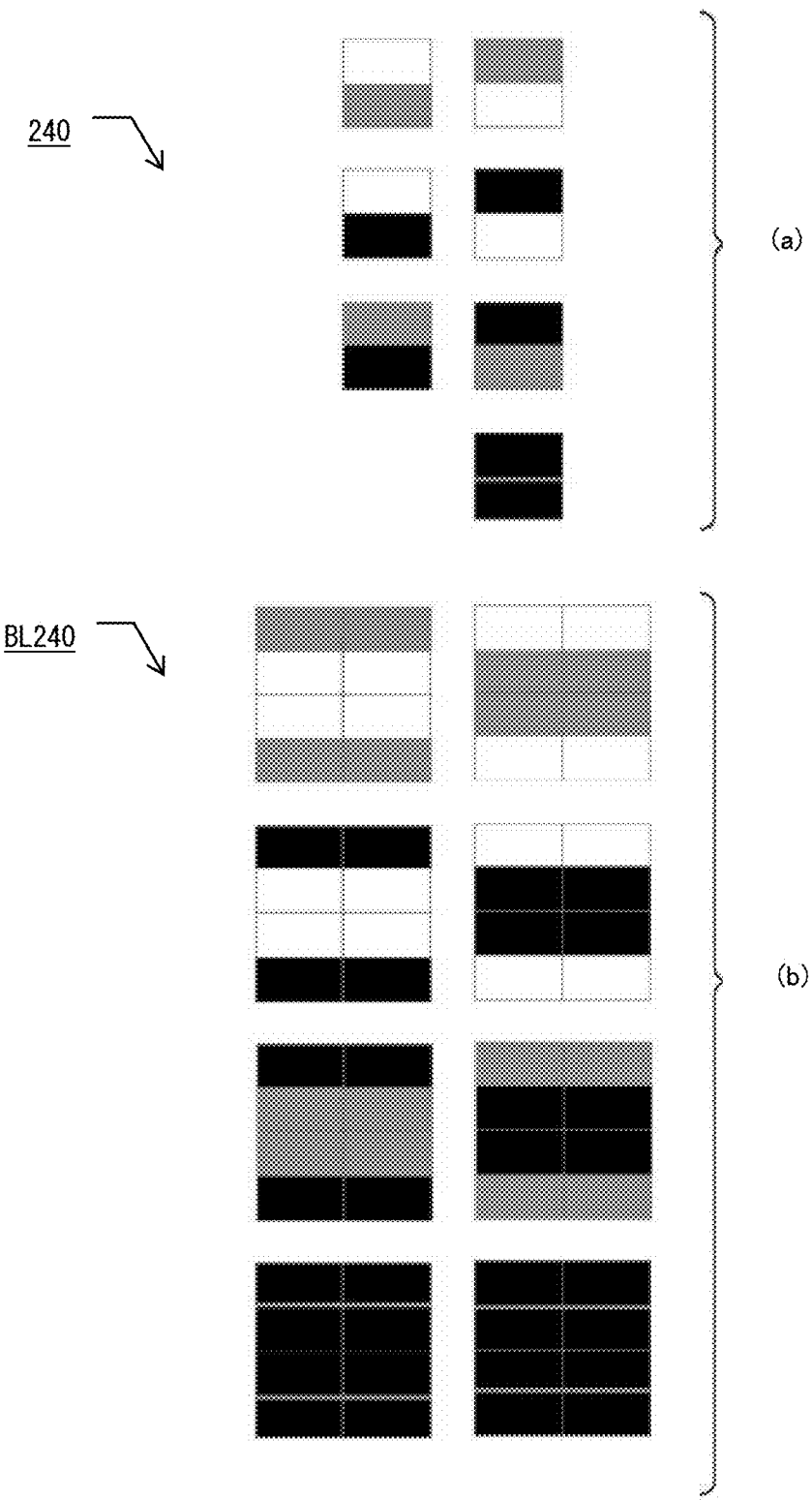

[FIG. 48]
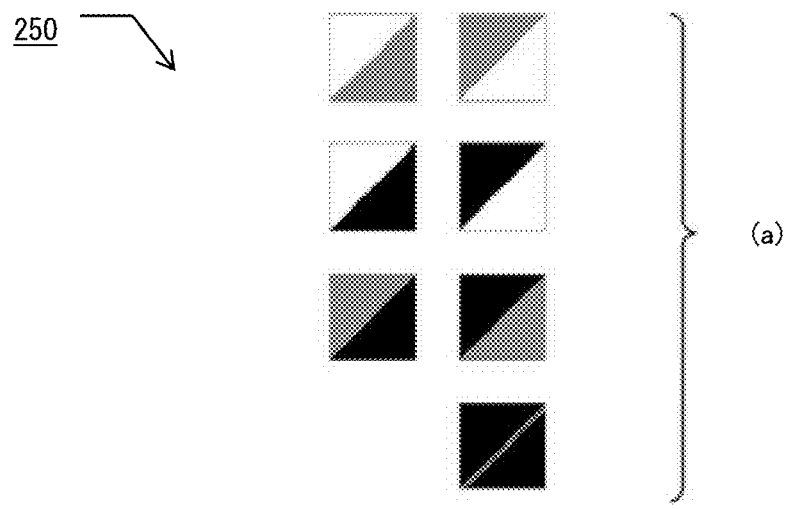
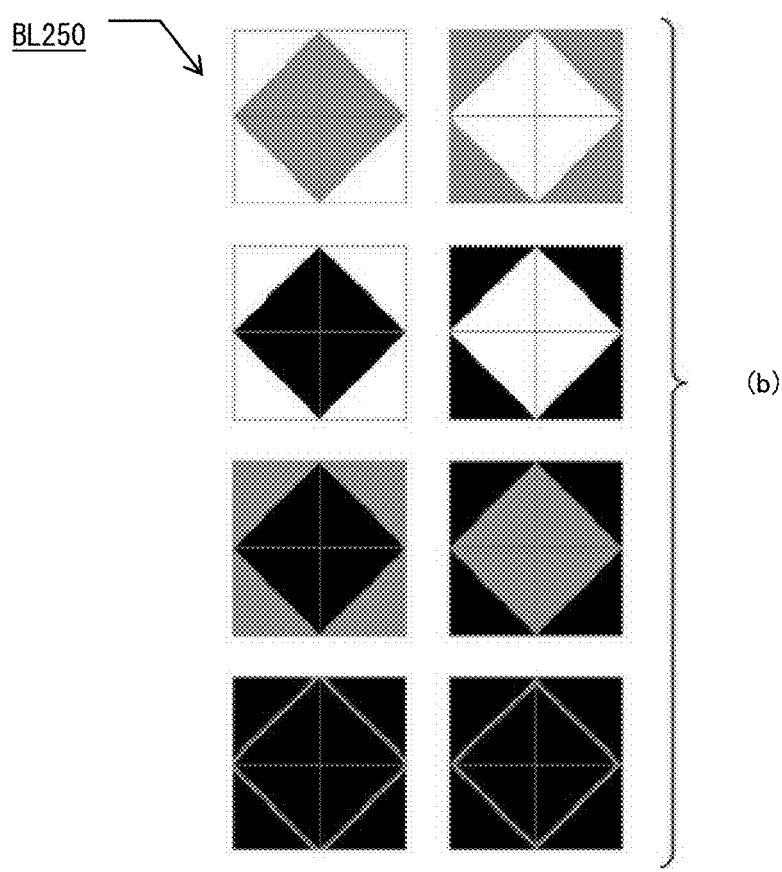

[FIG. 49]
(a) 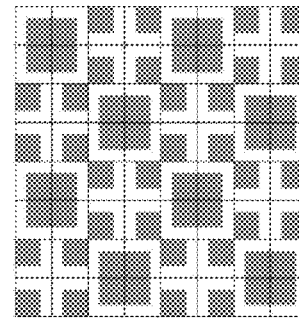
(b) 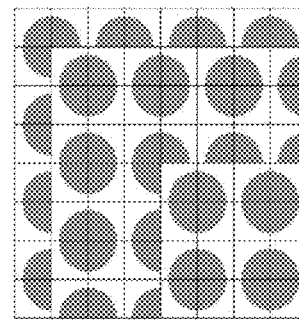
(c) 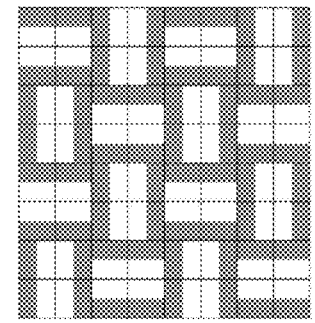
(d) 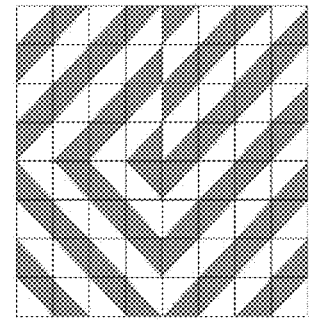

DEVICE AND METHOD FOR CREATING ULTRA-LOW RESOLUTION IMAGE

CROSS-REFERENCE TO RELATED APPLICATIONS

This application is a bypass continuation of PCT/JP2016/085108 entitled "DEVICE AND METHOD FOR MAKING ULTRA-LOW RESOLUTION IMAGE" published by WIPO as WO 2017/094641 A1 (which is incorporated by reference herein in its entirety for all purposes) which claims convention priority to Japanese patent application JP 2015-234008, filed in the Japanese Patent Office on Nov. 30, 2015 (which is incorporated by reference herein in its entirety for all purposes).

TECHNICAL FIELD

The present invention relates to an ultra-low resolution image making device and an ultra-low resolution image making method for making, as an ultra-low resolution image, an image such as a picture containing a predetermined motif on a predetermined medium surface.

BACKGROUND OF THE INVENTION

Heretofore, there is a method of decorative art called a mosaic painting or a mosaic art (sometimes simply called a "mosaic"). This mosaic picture disposes and combines pieces of different colors in close contact with each other on a predetermined part of a predetermined surface such as a wall surface or the like on which the drawing image is to be provided (hereinafter referred to as "drawing surface") to draw a desired drawing image on a desired drawing surface, in accordance with an image having a predetermined motif such as a pattern or a picture to be drawn (hereinafter referred to as a "drawing image"). For example, in case of a mosaic tile, pieces of different colors are prepared, and they are appropriately combined to be disposed in close contact state in accordance with an outline or color of the motif of the drawing image, thereby forming the drawing image of the motif on a desired drawing surface such as a wall. As an invention for making such a mosaic image, for example, an invention of "mosaic image making device" described in Patent Document 1 (JP-A No. 2001-96996) has been proposed.

However, the mosaic image provided by the invention of Patent Document 1 is to be made by a method similar to a so-called painting method called a dot picture. Therefore, like the conventional dot picture, the mosaic image making apparatus of Patent Document 1 also has a constraint that only the same drawing image can be drawn for the same motif as in the case of a conventional dot picture. Moreover, in case of the conventional dot picture, color assignment to each unit pixel is performed in an automatic manner (that is, by a drawing program for making a low resolution image like a dot drawing making software). Consequently, if the resolution is excessively reduced, there is a possibility that it becomes difficult to visually recognize the motif on the drawing image.

Accordingly, it is an object of the present invention to provide an ultra-low resolution image making apparatus and an ultra-low resolution image making method that is capable of making plural kinds of drawing images of significantly different aesthetic impressions even in case drawing images of the same motif (person, car, etc.) are made on the drawing surface, and that is capable of making the drawing image so that, even if the image is reduced to a very low resolution, a motif thereof can be reliably recognized visually.

SUMMARY OF THE INVENTION

The ultra-low resolution image making apparatus of the present invention comprises a plurality of kinds of basic pieces having a same size and a same external shape (typically, a square shape) and having three or more kinds of gradations such that the plurality of kinds of basic pieces constitute one pixel unit. The basic pieces of predetermined gradations are disposed respectively at pixels of the drawing surface corresponding to an outline or a shadow of the drawing image to fill the pixels of the drawing surface by the basic pieces, thereby making a desired drawing image. Further, in the ultra-low resolution image making device of the present invention, a geometric pattern is provided on a surface of each of the plurality of kinds of basic pieces constituting the pixel unit. The geometric patterns are configured such that they realize two properties of a gradation expressivity and a background pattern forming property. Here, "gradation expressivity" of the geometric pattern of the basic piece means that the geometric patterns on the surfaces of the basic pieces express different gradations by changing densities thereof on the surfaces of the basic pieces, respectively, in accordance with the kinds of the basic pieces. In addition, the "background pattern forming property" of the geometric pattern of the basic piece means that the geometric pattern of one of the basic pieces is integrated with the geometric pattern of another one of the basic pieces, that is adjacently arranged on the drawing surface, by adjusting an arrangement direction of the basic piece in each of the pixels on the drawing surface to one of a top, a bottom, a left, and a right, thereby forming a background pattern composed of another predetermined geometric pattern different from the geometric pattern of the basic piece.

An ultra-low resolution image making method according to the present invention is a method for making a desired drawing image on a drawing surface using the pixel unit of the above-stated ultra-low resolution image making apparatus. The ultra-low resolution image making method according to the present invention comprises: an original image forming step of forming an original image, in which a predetermined drawing image is formed, by arranging colors of gradations of a same number of kinds as the kinds of the basic pieces, respectively, on the image pixels of a drawing surface for making an original image; a background pattern image making step of making a background pattern image expressing a desired background pattern that can be formed by combining the geometric patterns of the basic pieces, respectively, on the image pixels of the drawing surface for making a background image that are in a matrix state corresponding to the drawing surface; a basic piece arranging step of arranging the basic pieces of corresponding gradations, respectively, on the image pixels of the drawing surface, by referring to the gradation of each of the image pixels of the original image; and a basic piece position adjusting step of adjusting positions of the basic pieces disposed on the image pixels of the drawing surface so as to become a same arrangement manner as elements of the corresponding background patter, by referring to the elements of each of the image pixels of the background pattern image; (typically adjusting positions by rotating the basic pieces in that surface).

The ultra-low resolution image making apparatus according to the present invention is able to make a plurality of kinds of drawing images of significantly different aesthetic impressions even in case of making drawing images of a same motif (person, car, etc.) on a drawing surface, and to make a drawing image so that a motif thereof can be reliably recognized visually even if a resolution thereof is greatly reduced.

The ultra-low resolution image producing method according to the present invention is able to make a plurality of kinds of drawing images of significantly different aesthetic impressions even in case of making drawing images of a same motif (person, car, etc.) on a drawing surface, and to make a drawing image so that a motif thereof can be reliably recognized visually even if a resolution thereof is greatly reduced.

BRIEF DESCRIPTION OF DRAWINGS

FIG. 1 is a plan view showing basic pieces (four gradation version) constituting a unit pixel used in an ultra-low resolution image making apparatus according to a first embodiment of the present invention.

FIG. 2 is a plan view showing basic pieces (four gradation version) constituting a unit pixel used in an ultra-low resolution image making apparatus according to a second embodiment of the present invention.

FIG. 3 shows an example of an original image of an ultra-low resolution image made by the ultra-low resolution image making apparatus according to the second embodiment of the present invention, wherein (a) is a plan view and (b) is a minified image thereof.

FIG. 4 shows an example of a picture (first background pattern) made by the ultra-low resolution image making apparatus according to the second embodiment of the present invention, wherein (a) is a plan view and (b) is a minified image thereof.

FIG. 5 is a plan view showing a small block pattern (16 pieces) of the first background pattern constituting a unit pixel used in the ultra-low resolution image making apparatus according to the second embodiment of the present invention.

FIG. 6 shows an example of a picture (second background pattern) made by the ultra-low resolution image making apparatus according to the second embodiment of the present invention, wherein (a) is a plan view and (b) is a minified image thereof.

FIG. 7 is a plan view showing a small block pattern of the second background pattern constituting a unit pixel used in the ultra-low resolution image making apparatus according to the second embodiment of the present invention, wherein (a) illustrates a small block pattern consisting of 16 pieces and (b) shows a small block pattern consisting of 4 pieces.

FIG. 8 shows an example of a picture (third background pattern) made by the ultra-low resolution image making apparatus according to the second embodiment of the present invention, wherein (a) is a plan view and (b) is a minified image thereof.

FIG. 9 is a plan view showing a small block pattern (16 pieces) of the third background pattern constituting a unit pixel used in then ultra-low resolution image making apparatus according to the second embodiment of the present invention.

FIG. 10 is a plan view showing basic pieces (four gradation version) constituting a unit pixel used in an ultra-low resolution image making apparatus according to a third embodiment of the present invention.

FIG. 11 shows an example of a picture (first background pattern) made by the ultra-low resolution image making apparatus according to the third embodiment of the present invention, wherein (a) is a plan view and (b) is a minified image thereof.

FIG. 12 is a plan view showing a small block pattern (16 pieces) of the first background pattern constituting a unit pixel used in the ultra-low resolution image making apparatus according to the second embodiment of the present invention.

FIG. 13 shows an example of a picture (second background pattern) made by the ultra-low resolution image making apparatus according to the third embodiment of the present invention, wherein (a) is a plan view and (b) is a minified image thereof.

FIG. 14 is a plan view showing a small block pattern (16 pieces) of the second background pattern constituting a unit pixel used in the ultra-low resolution image making apparatus according to the third embodiment of the present invention, wherein (a) illustrates a small block pattern to be a successive pattern and (b) illustrates a small block pattern to be an intermittent pattern.

FIG. 15 shows an example of a picture (third background pattern) made by the ultra-low resolution image making apparatus according to the third embodiment of the present invention, wherein (a) is a plan view and (b) is a minified image thereof.

FIG. 16 is a plan view showing small block patterns (16 pieces) of the third background pattern constituting a unit pixel used in the ultra-low resolution image making apparatus according to the third embodiment of the present invention.

FIG. 17 is a plan view showing basic pieces (four gradation version) constituting a unit pixel used in an ultra-low resolution image making apparatus according to a fourth embodiment of the present invention.

FIG. 18 shows an example of a picture (first background pattern) made by the ultra-low resolution image making apparatus according to the fourth embodiment of the present invention, wherein (a) is a plan view and (b) is a minified image thereof.

FIG. 19 shows an example of a picture (second background pattern) made by the ultra-low resolution image making apparatus according to the fourth embodiment of the present invention, wherein (a) is a plan view and (b) is a minified image thereof.

FIG. 20 is a plan view showing basic pieces (four gradation version) constituting a unit pixel used in an ultra-low resolution image making apparatus according to a fifth embodiment of the present invention.

FIG. 21 shows an example of a picture (first background pattern) made by the ultra-low resolution image making apparatus according to the fifth embodiment of the present invention, wherein (a) is a plan view and (b) is a minified image thereof.

FIG. 22 is a plan view showing a first small block pattern (16 pieces) of the first background pattern constituting a unit pixel used in the ultra-low resolution image making apparatus according to the fifth embodiment of the present invention.

FIG. 23 is a plan view showing a second small block pattern (16 pieces) of the first background pattern constituting a unit pixel used in the ultra-low resolution image making apparatus according to the fifth embodiment of the present invention.

FIG. 24 shows an example of an original image of an ultra-low resolution image made by the ultra-low resolution image making apparatus according to the fifth embodiment of the present invention, wherein (a) is a plan view and (b) is a minified image thereof.

FIG. 25 shows an example of a picture (first background pattern) made by the ultra-low resolution image making apparatus according to the fifth embodiment of the present invention, wherein (a) is a plan view and (b) is a minified image thereof.

FIG. 26 shows an example of a picture (second background pattern) made by the ultra-low resolution image making apparatus according to the fifth embodiment of the present invention, wherein (a) is a plan view and (b) is a minified image thereof.

FIG. 27 shows an example of a picture (third background pattern) made by the ultra-low resolution image making apparatus according to the fifth embodiment of the present invention, wherein (a) is a plan view and (b) is a minified image thereof.

FIG. 28 shows an example of picture made by combining the basic pieces constituting the unit pixels that are used in the ultra-low resolution image making apparatus according to the third and the fifth embodiments of the present invention (background pattern combining curves and straight lines), wherein (a) is a plan view and (b) is a minified view of (a).

FIG. 29 shows a block pattern (16 pieces) of a combination of the curves and the straight lines formed by combining the basic pieces constituting the unit pixels used in the ultra-low resolution image making apparatus according to the third and the fifth embodiments of the present invention.

FIG. 30 is a plan view showing basic pieces (four gradation version) constituting a unit pixel used in an ultra-low resolution image making apparatus according to a sixth embodiment of the present invention.

FIG. 31 shows an example of a picture (horizontal stripe background pattern) made by the basic pieces (four gradation version) constituting a unit pixel used in the ultra-low resolution image making apparatus according to the sixth embodiment of the present invention, wherein (a) is a plan view and (b) is a minified view of (a).

FIG. 31 shows another example of a picture (horizontal stripe background pattern) made by the basic pieces (four gradation version) constituting a unit pixel used in the ultra-low resolution image making apparatus according to the sixth embodiment of the present invention, wherein (a) is a plan view and (b) is a minified view of (a).

FIG. 33 shows an example of a picture (vertical stripe background pattern) made by the basic pieces (four gradation version) constituting a unit pixel used in the ultra-low resolution image making apparatus according to the sixth embodiment of the present invention, wherein (a) is a plan view and (b) is a minified view of (a).

FIG. 34 is a plan view showing basic pieces (four gradation version) constituting a unit pixel used in the ultra-low resolution image making apparatus according to an seventh embodiment of the present invention.

FIG. 35 shows an example of a picture (horizontal stripe background pattern) made by the ultra-low resolution image making apparatus according to the seventh embodiment of the present invention, wherein (a) is a plan view and (b) is a minified view of (a).

FIG. 36 is a plan view showing an example of an original image of an ultra-low resolution image made by the ultra-low resolution image making apparatus according to the seventh embodiment of the present invention, wherein (a) illustrates an original image created with three gradations, (b) illustrates an original image created with four gradations, and (c) illustrates an original image created with five gradations.

FIG. 37 is a plan view showing basic pieces (three gradation version) constituting a unit pixel used in an ultra-low resolution image making apparatus according to an eighth embodiment of the present invention, while comparing it with the basic pieces (four gradation version) constituting the unit pixel used in the ultra-low resolution image making apparatus according to the fifth embodiment.

FIG. 38 is a plan view showing an example of a picture (oblique stripe background pattern) made by the ultra-low resolution image making apparatus according to the eighth embodiment of the present invention, while comparing it with an example of a picture (oblique stripe background pattern) made by the ultra-low resolution image making apparatus according to the fifth embodiment, wherein (a) shows an example of a picture made by the eighth embodiment (three gradation version) and (b) shows an example of a picture made by the fifth embodiment (four gradation version).

FIG. 39 is an explanatory view showing a pasting work sheet used in na ultra-low resolution image making method by the ultra-low resolution image making apparatus according to the first embodiment of the present invention.

FIG. 40 shows examples of an original image (examples of an original image to be one frame of a motion picture) made by an ultra-low resolution image making apparatus according to a ninth embodiment of the present invention, while comparing an example of an original image of an ultra-low resolution made by an manual operation based on a high resolution image of a predetermined drawing motif ((a) and (b)) with an example of an original image of an ultra-low resolution automatically made by a predetermined image processing program based on a high resolution image of a predetermined drawing motif ((c) and (d)), wherein, (b) shows a minified view of (a) and (d) shows a minified view of (c).

FIG. 41 shows an example of an ultra-low resolution image made by the ultra-low resolution image making apparatus according to the ninth embodiment of the present invention (example obtained by making as an ultra-low resolution image to be one frame of a motion picture by using a pixel unit of the ultra-low resolution image making apparatus according to the fifth embodiment), wherein (a) is a plan view and (b) is a minified view of (a).

FIG. 42 is an explanatory diagram showing a moving image making example (making example of a series of frames of a moving image) in the case of making a moving image by the ultra-low resolution image making apparatus according to the ninth embodiment of the present invention.

FIG. 43 is a plan view showing basic pieces (four gradation version) constituting a unit pixel used in an ultra-low resolution image making apparatus according to a tenth embodiment of the present invention.

FIG. 44 are plan views showing colored basic pieces (six gradation version) constituting a unit pixel used in an ultra-low resolution image making apparatus according to an eleventh embodiment of the present invention, while comparing five examples of every kinds of examples (b) to examples (0 with basic gradation colors (a).

FIG. 45 are plan views showing basic pieces (a) constituting a unit pixel used in an ultra-low resolution image making apparatus according to a twelfth embodiment of the present invention and examples of small block patterns (b) constituted by the unit pixels.

FIG. 46 are plan views showing basic pieces (a) constituting a unit pixel used in an ultra-low resolution image making apparatus according to a thirteenth embodiment of the present invention and examples of small block patterns (b) constituted by the unit pixels.

FIG. 47 are plan views showing basic pieces (a) constituting a unit pixel used in an ultra-low resolution image making apparatus according to a fourteenth embodiment of the present invention and examples of small block patterns (b) constituted by the unit pixels.

FIG. 48 are plan views showing basic pieces (a) constituting a unit pixel used in an ultra-low resolution image making apparatus according to a fifteenth embodiment of the present invention and examples of small block patterns (b) constituted by the unit pixels.

FIG. 49 are plan views respectively showing examples (a) to (d) of small block patterns constituted by the unit pixels of the basic pieces of FIG. 45 to FIG. 48.

DETAILED DESCRIPTION OF THE INVENTION

Hereinafter, several embodiments for carrying out the present invention (hereinafter referred to as embodiments) will be described with reference to FIG. 1 to FIG. 6 of the accompanying drawings. In each of the embodiments, the same members, elements or parts are denoted by the same reference numerals to omit the description thereof.

First Aspect of the Invention

Hereinafter described are an ultra-low-resolution image making apparatus and an ultra-low resolution image making method according to a first aspect of an invention among the present inventions. The ultra-low-resolution image making apparatus according to first aspect of the invention is concretized into an ultra-low resolution image making device and an ultra-low resolution image making method for forming a desired drawing image through an article as a tangible object such as building materials like tiles (in particular, building materials requiring ornamental elements such as exterior materials and interior materials), toys such as jigsaw puzzles, and so on. The ultra-low resolution image making apparatus according to the first aspect of the invention includes a pixel unit consisting of a plurality of kinds of predetermined basic pieces to be three or more kinds.

[Drawing Surface and Drawing Image]

First, a drawing surface as a surface on which an ultra-low resolution image is produced by the ultra-low resolution image making apparatus of the present invention is laid out by picture cells (pixels) of a predetermined outline shape (typically, a square shape) so as to be in a matrix form (typically, a square lattice shape) having a predetermined number of rows (for example, 20 rows and 20 columns). The ultra-low resolution image making apparatus of the present invention has a plurality of kinds of basic pieces that constitutes one pixel unit. The basic pieces have a same dimension and a same external shape (typically, a square shape) as each pixel of the drawing surface, while having a plurality of kinds of gradations composed of three or more kinds. The ultra-low resolution image making apparatus makes a desired drawing image by locating the basic pieces of predetermined gradations on pixels of the drawing surface, respectively, to fill the pixels of the drawing image with the basic pieces in accordance with an outline or a shadow of the drawing image. That is, this drawing image is represented by the basic pieces of different gradations in pixels of the drawing surface. Thus, the drawing image becomes an image (i.e., an "ultra-low resolution image")) that is lower in resolution than a low resolution image like a conventional dot picture, by the gradations of the basic pieces in the pixels being visually recognized (that is, visually perceived) by a viewer.

[Compatibility of Motif Drawing and Background Pattern Making by Pixel Unit]

The ultra-low resolution image making device of the present invention has a configuration such that a predetermined geometric pattern is provided on a surface of each of the basic pieces that constitute a pixel unit (at least, on all kinds of basic pieces except a basic piece of a gradation having a lowest density). Moreover, the geometric pattern is configured to realize two properties having completely different characters, which are a "gradation expressivity" and a "background pattern forming property" (namely, it is configured to make them compatible), as will be described later. The present invention has this point as a greatest characteristic feature. Here, the "gradation expressivity" of the geometric pattern of the basic piece basically means that the geometric pattern on the surface of the basic piece represents a different gradation by changing a density thereof on the surface of the basic piece, depending on the kind of the basic piece. It will be described in detail in a latter part. By the gradation expressivity, an expression of a desired drawing image is enabled by locating the basic pieces of most suitable gradations on corresponding pixels in accordance with an outline, a shade and the like of the drawing image, when drawing a desired drawing image on a drawing surface. In addition, the "background pattern forming property" of the geometric pattern of the basic piece basically means that, when filling the drawing surface with the basic pieces, a locating orientation of the basic piece is adjusted by intentionally setting it to any one of up, down, left, and right in each pixel of the drawing surface, so that a geometric pattern of a basic piece is combined with a geometric pattern of another basic piece adjacently arranged on the drawing surface, thereby forming a background pattern composed of another predetermined geometric pattern that is different from the geometric pattern of the basic piece. It will be described in detail in a latter part.

As a result, the ultra-low resolution image created by the ultra-low resolution image making apparatus of the present invention expresses a drawing image of a drawing motif (hereinafter referred to as a "drawing motif image") in an ultra-low resolution by the gradation expressivity of the geometric patterns that the basic pieces of the pixel unit have. In addition, the ultra-low resolution image also expresses an image of a predetermined pattern to be a background (hereinafter referred to as a "background image") at around the drawing motif image by the background pattern forming property of the geometric patterns that the basic pieces of the pixel unit have. Moreover, at this time, due to the background pattern forming property possessed by the basic pieces of the pixel unit, the background pattern image is expressed not only in the surroundings of the drawing motif image but also in the drawing motif image itself.

[Difficulty of Direct Drawing on Drawing Surface]

As described above, in making an ultra-low resolution image, the ultra-low resolution image making apparatus of the present invention expresses the drawing motif image by the gradation expressivity of the basic pieces, as well as expressing the background pattern image around the drawing motif image and at the drawing motif image itself by the background pattern forming property. Consequently, it is difficult to arrange the basic piece directly on the pixel of the drawing surface as in the conventional dot picture. That is, if it is merely to express a predetermined gradation for each pixel on the drawing surface like the conventional dot picture, it is enough to place the basic pieces of gradations corresponding to the pixels of the drawing surface, respectively, in order to create a desired background pattern image on the drawing surface. However, it is necessary to clearly recognize which type of the basic piece is to be placed in which manner of arrangement over an entire surface of the drawing surface to obtain the background pattern image. However, the number of basic pieces arranged on the drawing surface is several hundreds or more (for example, even in the case of a matrix of 20 rows and 20 columns, it is 400 pieces) even in the case of an ultra-low resolution image. Thus, it is extremely difficult to imagine a manner of arrangement of the basic piece for each of the pixels on the drawing surface, since the number is too many. Moreover, since the geometric pattern of the basic piece has two properties of the gradation expressivity and the background pattern forming property, it is extremely difficult even for an expert to place the above-mentioned many basic pieces on the pixels of the drawing surface, respectively, while properly arranging them still in consideration of the arrangement manner (for forming the background pattern) in addition to the gradation thereof.

[Invention of Ultra-Low Resolution Image Making Method]

Therefore, the inventor of the present application has devised an invention relating to a method of making an ultra-low resolution image by the basic pieces of the pixel unit that does not make a predetermined drawing image directly on the drawing surface by directly arranging the basic pieces directly on the drawing surface by the ultra-low resolution image making device. That is, the method makes an original image, at first, that expresses the drawing image only by change of the gradation on the drawing surface for making the original image defining a matrix formation corresponding to the drawing surface (e.g., a sheet of such matrix formation). Moreover, the method makes a background image that expresses a desired background image that can be made by combining the geometric patterns of the basic pieces, on the drawing surface for making a background pattern defining a matrix formation corresponding to the drawing surface (e.g., a sheet of such matrix formation). Then, the method makes an ultra-low resolution image by the basic pieces while using the original image and the background image.

That is, the ultra-low resolution image making method according to this invention comprises: an original image forming step of forming an original image, in which a predetermined drawing image is formed, by arranging colors of gradations of a same number of kinds as the kinds of the basic pieces, respectively, on the image pixels of a drawing surface for making an original image; a background pattern image making step of making a background pattern image expressing a desired background pattern that can be formed by combining the geometric patterns of the basic pieces, respectively, on the image pixels of the drawing surface for making a background image that are in a matrix state corresponding to the drawing surface; a basic piece arranging step of arranging the basic pieces of corresponding gradations, respectively, on the image pixels of the drawing surface, by referring to the gradation of each of the image pixels of the original image; and a basic piece position adjusting step of adjusting positions of the basic pieces disposed on the image pixels of the drawing surface so as to become a same arrangement manner as elements of the corresponding background patter, by referring to the elements of each of the image pixels of the background pattern image; (typically adjusting positions by rotating the basic pieces in that surface).

Modified Example of Ultra-Low Resolution Image Making Method

This ultra-low resolution image making method may draw the original image directly on the drawing surface in the original image making step, while placing a corresponding basic piece at each of the pixels of the original image on that drawing image in the basic piece arranging step.

[Geometric Pattern for Compatibility Between Gradation Expressivity and Background Pattern Forming Property]

The pixel unit of the ultra-low resolution image making apparatus of the present invention adopts the following configuration of geometric pattern, for example, as a typical configuration of the geometric pattern of the basic pieces for simultaneously achieving both the gradation expressivity and the background pattern forming property.

A linear geometric pattern (hereinafter referred to as "linear pattern") as shown in FIG. 1, FIG. 2, FIG. 10, FIG. 17, FIG. 20, FIG. 30, FIG. 34, and FIG. 37.

Embodiment of Linear Pattern

The ultra-low resolution image making apparatus of the present invention may be constructed as shown in a first embodiment to an eighth embodiment, as an embodiment in which a geometric pattern is formed by a linear pattern among geometric patterns of the basic pieces of the pixel unit. That is, the ultra-low-resolution image making device of the present invention typically includes either of a pixel unit 10 shown in the first embodiment (FIG. 1), a pixel unit 20 shown in a second embodiment (FIG. 2 to FIG. 9), a pixel unit 30 shown in a third embodiment (FIG. 10 to FIG. 16), a pixel unit 40 shown in a fourth embodiment (FIG. 17 to FIG. 19), a pixel unit 50 shown in a fifth embodiment (FIG. 20 to FIG. 29), a pixel unit 60 shown in a sixth embodiment (FIG. 30 to FIG. 33), a pixel unit 70 shown in a seventh embodiment (FIG. 34 to FIG. 35), a pixel unit 80 shown in the eighth embodiment (FIG. 37 to FIG. 38).

Embodiment of Dotted Pattern

In addition, the ultra-low resolution image making apparatus of the present invention may be configured as shown in FIG. 46 as an embodiment in which a geometric pattern is formed from a dot pattern among the geometric patterns of the basic pieces of the pixel unit.

[Directionality of Background Pattern in Background Pattern Forming Property of Geometric Pattern]

Here, when the pixel unit is constituted by using the linear pattern as the geometric pattern of the basic pieces in the ultra-low resolution image making apparatus of the present invention, the geometric pattern of the plural kinds of basic pieces constituting the pixel unit realizes the two properties having completely different characters of the "gradation expressivity" and the "background pattern forming property" (that is, make them compatible), as described above. In addition, the geometric pattern has a property that is a "directionality" as a still another character and that is related to the background pattern forming property. This point is another characteristic feature of the ultra-low resolution image making apparatus of the present invention. Here, the "directionality" of the geometric pattern of the basic piece basically means that, when filling the drawing surface with the basic pieces, a locating orientation of the basic piece is adjusted by intentionally setting it to any one of up, down, left, and right in each pixel of the drawing surface, so that at least one or more lines of one basic piece among lines constituting a linear pattern thereof, is/are connected with one or more lines of a linear pattern of another basic piece, that is adjacently located thereto on the drawing surface, thereby forming a continuous line extending continuously in a specific direction over the adjacent basic piece so as to define a pattern (hereinafter referred to as "continuous pattern line"), thereby constituting an entire pattern or a partial pattern of the above-stated background pattern by the continuous pattern lines.

[Configuration of Basic Piece of Present Invention]

Hereinafter described are a configuration of the basic piece, which constitutes a premise of the characteristic feature of the present invention as described above, and a configuration of the basic piece for realizing this feature.

[Contour of Basic Piece]

In the present invention, the above-stated plurality of kinds of basic pieces are formed into a flat plate shape or a block shape having an outer shape (contour) of a polygon that can be filled in a plane. A "plane filling" refers to placing a finite kind of planar figures in a predetermined plane surface without gaps. It is also called a plane covering, a tiling, or a tessellation. As the plane filling, for example, there are cases where tiles as an outer wall material are closely packed on a wall surface. In addition, all kinds of the basic pieces have the same dimension and the same external shape. That is, the outline of the basic piece is confined into only one kind of the same contour. It is preferable that the outline of the basic piece is made into a square having the same size, so that the basic pieces can be filled in a regular plane on a predetermined drawing surface with only one kind of outline of the basic piece. A "regular plane filling" refers to a case where the outer shape of the plane after filling becomes a square in the plane filling. In the embodiments of the present invention, in all the embodiments, the basic piece has the same contour of a square of the same size (FIG. 1, FIG. 2, FIG. 10, FIG. 17, FIG. 20, FIG. 30, FIG. 34, FIG. 37, and so on).

Modified Example of Contour of Basic Piece

As described above, in the present invention, it is preferable that the outer shape of the basic piece is typically a square. Still, as a regular polygon that can be filled with only one kind of outer shape, there are an equilateral triangle and a regular hexagon. Those regular polygons may be used as long as they can be configured such that a pattern having not only a predetermined gradation but also a predetermined geometric directionality is formed on the surface of the basic piece, thereby enabling them to draw and form a desired background pattern and to draw and form a desired motif in the drawing image by placing the basic piece thereat, while rotating it in three directions (in case of regular triangle) or in six directions (in case of regular hexagon).

In addition, when using the above-stated regular polygons, the plane filling becomes a regular plane filling, and the plane after the plane filling has a square external shape (if upper, lower, left and right end surfaces are ignored). On the other hand, it is also possible to fill the plane using a parallelogram (including a rhombus and the like) or an arbitrary triangle. Thus, the aforementioned parallelogram or triangle may be used as long as they can be configured such that a pattern having not only a predetermined gradation but also a predetermined geometric directionality is formed on the surface of the basic piece, thereby enabling them to draw and form a desired background pattern and to draw and form a desired motif in the drawing image by placing the basic piece thereat, while rotating it in three directions (in case of regular triangle) or in four directions (in case of parallelogram).

[Thickness of Basic Piece]

In the present invention, the basic piece constituting the pixel unit may be formed into a flat plate shape having a predetermined plate thickness when it is embodied into an article such as a tile as a building material or a puzzle piece as a toy. Still, the basic piece may be enlarged to be a block-like one.

[Gradation Expressivity by Geometric Pattern of Basic Piece]

On the other hand, in the present invention, the basic pieces have their surfaces formed with predetermined geometric patterns, respectively. Thus, the surfaces of the basic pieces constitute predetermined pattern surfaces through the geometric patterns. In the present invention, the "pattern" is used to have a meaning that includes a stencil, a decoration and the like. The basic piece expresses different gradations that become predetermined plural kinds of three or more kinds, depending on the geometric patterns of the pattern surfaces. That is, in the present invention, the pixel unit has three or more kinds of basic pieces of different gradations as the basic pieces. The pixel unit includes at least a basic piece having a geometric pattern for expressing a gradation of a highest density (to be a gradation corresponding to a black color in case of expressing a monochrome image with binary black and white), a basic piece having a geometric pattern for expressing a gradation of a lowest density (to be a gradation corresponding to a white color in case of expressing a monochrome image by monochrome binary) (or that makes an entire surface of the patterned surface white without forming a geometric pattern thereon at all), and a basic piece having a geometric pattern for expressing a gradation of an intermediate density between the highest density and the lowest density (to be a gradation corresponding to a gray color in case of expressing an image by a gray scale). That is, if the pixel unit are described in an order of the density of the gradation, it may be constructed from a first basic piece having a first geometric pattern expressing the gradation of the highest density, a second basic piece having a second geometric pattern expressing the gradation of the intermediate density, and a third basic piece having a third geometric pattern expressing the gradation of the lowest density. Incidentally, first to third basic pieces 81 to 83 of the eighth embodiment (FIG. 37 (a)) are an example of the pixel unit having such basic pieces of three gradations, in the case of the linear pattern.

Modified Example of Representation of Highest Density (Example: Stencil Pattern of Simple Horizontal Line, Tile Pattern)

The gradation of the highest density may be expressed by filling an entire surface of the pattern surface of the basic piece with a dark color such as the black color as in the conventional binary representation. In this case, it can be said that the pattern surface of the basic piece of the highest density gradation does not have a geometric pattern in a strict sense. However, in the present invention, the basic piece of the highest density gradation is filled and arranged on the drawing surface in combination with the basic piece of another gradation. Thus, the pattern surface of the basic piece of the highest density gradation is recognized as one kind of geometric pattern in relation to the basic piece of another gradation (in particular, in relation to the basic piece of the gradation of the intermediate density). In this sense, it can be said that a geometric pattern is also formed on the pattern surface of the basic piece of the highest density gradation. Incidentally, a first basic piece 61 of the sixth embodiment (FIG. 30) and a first basic piece 71 of the seventh embodiment (FIG. 34) are examples of the basic pieces having such highest density gradation, in the case of the linear pattern.

Modified Example of Representation of Lowest Density (eg Simple Stencil Pattern, Simple Tile Pattern, Tile Pattern)

Further, as in the conventional binary expression, the gradation of the lowest density can be expressed by making the entire surface of the pattern surface of the basic piece white (that is, thereby expressing a pattern). In this case, it can be said that the pattern surface of the basic piece of the lowest density gradation does not have a geometric pattern in a strict sense. However, in the present invention, the basic piece of the lowest density gradation is filled and arranged on the drawing surface in combination with the basic piece of another gradation. Thus, the pattern surface of the basic piece of the lowest density gradation is recognized as one kind of geometric pattern in relation to the basic piece of another gradation (in particular, in relation to the basic piece of the gradation of the intermediate density). In this sense, it can be said that a geometric pattern is also formed on the pattern surface of the basic piece of the lowest density gradation. Incidentally, a fourth basic piece 64 of the sixth embodiment (FIG. 30) is an example of the basic piece having such a lowest density gradation, in the case of the linear pattern.

[Range of Number of Kinds of Basic Pieces (Number of Gradations)]

In the present invention, since the pixel unit expresses a plurality of gradations in a range of three gradations to five gradations, it is desirable to constitute the pixel unit from a plurality of predetermined kinds of basic pieces in a range of three to five kinds in which geometric patterns for expressing these different gradations are formed on the pattern surface, respectively. If the number of the gradations by the geometric patterns of the basic pieces are two gradations, it becomes a black and white binary monochrome image, so that it becomes difficult to express a desired motif as an ultra-low resolution image on the drawing surface. On the other hand, even if the number of gradations by the geometric patterns of the basic pieces is equal to or greater than six gradations, as compared with the case where the number of gradations is in the range of three to five gradations, there is hardly any difference in an expressive power of the drawing image when expressing a desired motif as an ultra-low resolution image on the drawing surface. Thus, considering a complicated configuration due to an increase in the kinds of the geometric patterns of the basic pieces in order to increase the number of gradations, in particular, there is no big advantage to make the number of the gradations six or more gradations. Still, if disregarding the complexity of the configuration by increasing the kinds of the geometric patterns of the basic pieces in order to increase the number of gradations, the number of gradations may be set to six or more gradations. However, in order to create an ultra-low resolution image (having still lower resolution than a dot picture that is a conventional low resolution image) according to the invention, it is preferable to set the number of gradations to 16 gradations or less, and the kinds of the basic pieces are preferably 16 kinds or less.

[Four Gradations as Most Preferable Number of Kinds (Number of Gradations) of Basic Pieces]

As the number of gradations that can express an ultra-low resolution image of a predetermined motif with an abundant expression power without incurring complication of the configuration due to increasing the kinds of the geometric patterns of the basic pieces, it has been confirmed that it is most preferable to use four gradations as a result of intensive research and trial and error by repeated confirmation tests made by the inventor. That is, typically, in order to express the four kinds of different gradations by the geometric patterns of the pattern surfaces of the basic pieces, the pixel unit is preferably configured to have, as basic pieces, four kinds of basic pieces of different gradations. In this case, the pixel unit is composed of: a basic piece having a geometric pattern expressing the highest density gradation; a basic piece having a geometric pattern expressing a gradation of a lowest density; a basic piece having a geometric pattern expressing a gradation of a density that is to be at a higher density side where a density between the highest density and the lowest density is set to two-step densities (hereinafter referred to as "high density side intermediate density"), and a basic piece having a geometric pattern expressing a gradation of a density that is to be at a lower density side where the density between the highest density and the lowest density is set to the two-step densities (hereinafter referred to as "low density side intermediate density"). In other words, in this case, if the pixel unit is described in an order of the densities of the gradations, the pixel units may be constituted by a first basic piece having a first geometric pattern expressing the gradation of the highest density, a second basic piece having a second geometric pattern expressing the gradation of the high density side intermediate density, a third basic piece having a third geometric pattern expressing the gradation of the low density side intermediate density, and a fourth basic piece having a fourth geometric pattern expressing the gradation of the lowest density. As examples of pixel units having such basic pieces of four gradations, in the case of the linear pattern, there are a pixel unit 10 having first to fourth basic pieces 11 to 14 of the first embodiment (FIG. 1), a pixel unit 20 having first to fourth basic pieces 21 to 24 of the second embodiment (FIG. 8), a pixel unit 30 having first to fourth basic pieces 31 to 34 of the third embodiment (FIG. 16), a pixel unit 40 having first to fourth basic pieces 41 to 44 of the fourth embodiment (FIG. 23), a pixel unit 50 having first to fourth basic pieces 51 to 54 of the fifth embodiment (FIG. 26), a pixel unit 60 having first to fourth basic pieces 61 to 64 of the sixth embodiment (FIG. 38), and a pixel unit 70 having first to fourth basic pieces 71 to 74 of the seventh embodiment (FIG. 42).

[Five Gradations as Preferred Number of Kinds (Number of Gradations) of Basic Pieces]

As the number of gradations that can express an ultra-low resolution image of a predetermined motif with abundant expressive power, it has been also confirmed that it is preferable to use five gradations as a result of intensive research and trial and error by repeated confirmation tests made by the inventor.

[N-Gradations as Number of Kinds (Number of Gradations) of Basic Pieces]

As in the case of the above-stated four gradations or five gradations, the number of gradations may be n-gradations as an arbitrary number of gradations (for example, six or more gradations as the number of gradations such as six gradations of n=6). In this case, in order to express n-kinds of different gradations depending on geometric patterns of pattern surfaces of basic pieces, a pixel unit may be configured to include, as basic pieces, n-kinds of basic pieces of different gradations. In this case, the pixel unit includes: a basic piece having a geometric pattern expressing a gradation of a highest density; a basic piece having a geometric pattern expressing a gradation of a lowest density; and a basic piece (or basic pieces) that is/are prepared to have n-minus-two (n−2) step density (or densities) as a gradation (or gradations) between the highest density gradation and the lowest density gradation, while such basic piece(s) being prepared to have a geometric pattern (or geometric patterns) for expressing a gradation (or gradations) corresponding to those density (or densities).

[Compatibility of Gradation Expressivity and Background Pattern Forming Property by Plural Line Pattern]

In the present invention, as a geometric pattern for expressing the gradations of the basic pieces of the pixel unit, the linear pattern may use a geometric pattern (hereinafter referred to as "plural line pattern") of a motif (hereinafter referred to as "plural line motif") that is composed of a plurality of lines (curved lines or straight lines).

[Compatibility of Gradation Expressivity and Background Pattern Forming Property by Plural Curved Line Pattern]

As examples of pixel units composed of basic pieces having such geometric patterns of plural line patterns, there are a pixel unit 10 having first to fourth basic pieces 11 to 14 of the first embodiment (FIG. 1), a pixel unit 20 having first to fourth basic pieces 21 to 24 of the second embodiment (FIG. 2), and a pixel unit 30 having first to fourth basic pieces 31 to 34 of the third embodiment (FIG. 10). In these examples, the geometric patterns are plural line patterns of a same motif in all of the basic pieces. In particular, in these examples, the linear pattern as the geometric patterns for the gradation representation of the basic pieces of the pixel unit is composed of geometric patterns (hereinafter referred to as "plural curved line pattern(s)") having a same motif (hereinafter referred to as a "plural curved line motif") that is composed of a plurality of curves.

[Compatibility of Gradation Expressivity and Background Pattern Forming Property by Curved Line Pattern]

There are examples of pixel units composed of basic pieces having geometric patterns that are similar to the above-mentioned plural curved line patterns (and that are classifiable into the plural curved line patterns) though they are different from the above-mentioned plural curved line pattern in a strict sense. As such example, there is a pixel unit 40 having first to fourth basic pieces 41 to 44 of the fourth embodiment (FIG. 17). In this example, all of the basic pieces have geometric pattern formed in a curved pattern or a quadrant arcuate pattern of a same motif. That is, in this example, the linear pattern as the geometric pattern for expressing the gradation of the basic piece of the pixel unit has a motif that consists of one quadrant as in the first basic piece 41 or a motif that consists of one curve and one quadrant as in the fourth basic pieces 42 to 44. The linear pattern is constructed from a geometric pattern (hereinafter referred to as a "quadrant pattern") of a common motif (hereinafter referred to as a "quadrant motif") about the quadrant of the first basic piece 41 as a center.

[Compatibility of Gradation Expressivity and Background Pattern Forming Property by Plural Straight Line Pattern]

As an example of a pixel unit composed of basic pieces having geometric patterns of the aforementioned plural line patterns, there is a pixel unit 50 having first to fourth basic pieces 51 to 54 of the fifth embodiment (FIG. 20). In particular, in this example, the linear pattern as the geometric pattern for expressing the gradation of the basic piece of the pixel unit has a motif that consists of one octagon (made by chamfering four corner parts of a square) as in the first basic piece 51 or a motif that consists of plural (two) straight lines (inclined straight line or inclined stripe line) as in the second to fourth basic piece 52 to 54. The linear pattern is constructed from a geometric pattern (hereinafter referred to as a "plural straight line pattern") of a common motif (hereinafter referred to as a "plural straight line motif") that has an image in which the inclined stripe lines of the second to fourth basic pieces 52 to 54 are overlapped within a range of the octagon (made by chamfering four corner parts of a square) of the first basic piece 51.

[Compatibility of Gradation Expressivity and Background Pattern Forming Property by Single Line Pattern]

In the present invention, as a geometric pattern for expressing the gradation of the basic piece of the pixel unit, the linear pattern may use a geometric pattern of a motif (hereinafter referred to as a "single line motif") consisting of one line (curved line or straight line) (hereinafter referred to as a "single line pattern").

[Compatibility of Gradation Expressivity by Single Line Pattern and Background Pattern Forming Property]

As examples of a pixel unit including a basic piece having a geometric pattern of a single line pattern as described above, there are a pixel unit 60 having the first to fourth basic pieces 61 to 64 of the sixth embodiment (FIG. 30), and a pixel unit 70 having first to fourth basic pieces 71 to 74 of the seventh embodiment (FIG. 34).

[Gradation Expression by Line Width of Plural Line Pattern]

According to the present invention, in the case of the pixel unit having a basic piece with a plural line pattern formed on a pattern surface thereof, a line width of any one or more lines of the plural line pattern of each basic piece may be changed by increase or decrease, thereby increasing a ratio of an area of the line in relation to the pattern surface of the basic piece. Thus, a density of the pattern surface thereof is changed or increased or decreased to change a gradation thereof, thereby making it possible to express the highest density, the lowest density, the intermediate density, and so on. That is, if the line width of one or more lines of the plural line pattern of one of the basic pieces is increased relative to the line width of a corresponding line of the plural line patterns of the other basic pieces, the density of the pattern surface of the one basic piece is relatively increased relative to the density of the pattern surfaces of the other basic pieces. Consequently, the pattern surface of the one basic piece can be expressed as a gradation of a higher density than gradations of the other basic pieces. In this case, if the line width of the line is set at a highest value, it can express a gradation of the highest density with respect to the same basic piece. Conversely, if the line width of one or more lines of the plural line pattern of one of the basic pieces is decreased relative to the line width of a corresponding line of the plural line patterns of the other basic pieces, the density of the pattern surface of the one basic piece is relatively decreased relative to the density of the pattern surfaces of the other basic pieces. Consequently, the pattern surface of the one basic piece can be expressed as a gradation of a lower density than gradations of the other basic pieces. In this case, if the line width of the line is set at a lowest value, it can express a gradation of the lowest density with respect to the same basic piece. Moreover, in this case, if the line width of the line is set at an intermediate value between the highest value and the lowest value, it can express a gradation of the intermediate density with respect to the same basic piece. Furthermore, in this case, if the line widths of the line is set as stepwise values in an intermediate range between the highest value and the lowest value, it can express a gradation of the higher density side intermediate density or the lower density side intermediate density (or the proper intermediate density) with respect to the same basic piece.

[Provision of Directionality by Line Direction of Plural Line Pattern]

Further, in the present invention, in the case of the pixel unit composed of the basic piece having the plural line pattern formed on the pattern surface, the pattern surface of the basic piece is formed so that all the lines extend in a given direction. In addition, a terminal end (that is, a terminal end of the line on any side of the basic piece) is arranged at a predetermined position on the side of the basic piece. Then, when another basic piece is rotated 90 degrees or 180 degrees (in the clockwise direction or the counter-clockwise direction) relative to one of the basic pieces so that they are joined, the terminal end of any one line of the pattern surface of the one basic piece is aligned with the terminal end of any one line of the pattern surface of the other basic piece. Consequently, the lines of these basic pieces define one line to be continuous between the two joined basic pieces, thereby giving the above-stated "directionality" to the basic pieces. Typically, in the case of the pixel unit comprising the basic piece having the plural line pattern formed on the pattern surface, a pattern surface of a basic piece having a square outer shape may be formed such that it has all of the lines thereof to extend in a given direction, thereby giving the above-mentioned "directionality" to the basic piece. In the present invention, if describing the case where the external shape of the basic piece is a square, the drawing surface may be partitioned into a matrix (that is, partitioned by vertical and horizontal pixels so as to form a tetragonal lattice) so that the drawing surfaces is filled with the basic pieces by placing the basic piece on each of the pixels of the drawing surface. In this case, if the basic piece is placed while setting its direction to any one of up, down, left, and right, any one or more lines of the plural line pattern of the basic piece extend continuously over the adjacent basic pieces, thereby forming a continuous line that extends over the adjacent basic pieces, due to the above-stated "directionality". Thus, the continuous line forms a design of a predetermined pattern over a plurality of adjacent basic pieces. That is, the "directionality" is imparted to the pattern between the adjacent plural basic pieces. In other words, in the present invention, a specific design or pattern is continuously formed or arranged in a fixed direction on the drawing surface due to the directionality of the geometric pattern of the basic piece, so that a continuous pattern or a continuous pattern (hereinafter simply referred to as "continuous pattern") appears in a fixed direction on the drawing surface.

[Gradation Representation by Line Width of Single Line Pattern]

According to the present invention, in the case of the pixel unit having a basic piece with a single line pattern formed on a pattern surface thereof, a line width of any one or more lines of the plural line pattern of each basic piece may be changed by increase or decrease, thereby increasing a ratio of an area of the line in relation to the pattern surface of the basic piece. Thus, a density of the pattern surface thereof is changed or increased or decreased to change a gradation thereof, thereby making it possible to express the highest density, the lowest density, the intermediate density, and so on.

[Provision of Directionality by Line Direction of Single Line Pattern]

Further, in the present invention, in the case of the pixel unit composed of the basic piece having the single line pattern formed on the pattern surface, if two basic pieces are joined, the lines of these joined basic pieces extend as one line continuously between the two joined basic pieces. Thus, the above-stated "directionality" is given to the basic pieces.

Example 1 of Plural Curved Line Pattern

In the present invention, for example, a geometric pattern may be used as the plural curved line pattern such that four curved lines are arranged parallel to each other on the pattern surface of the basic piece having a square outline (that is, the geometric pattern being constituted by the four parallel curved lines). In this case, the four curved line pattern is formed on the pattern surface of all kinds of the basic pieces, while changing only the line width thereof. Moreover, a circular arc may be used as the curved line in such example. In this case, the geometric pattern made by a group of line segments of a predetermined motif consisting of a plurality of lines becomes a geometric pattern (hereinafter referred to as a "four parallel curved line pattern") of the same motif in which four circular arcs are arranged parallel to each other (that is, the four circular arcs are arranged as parallel curved lines) on the pattern surfaces of all kinds of basic pieces. Furthermore, in this case, the plural curved line pattern may have a configuration, for example, such that four curved lines are arranged parallel to each other on the pattern surface of the basic piece having a square outer shape and such that two of the curved lines are arranged parallel to each other nearer an inside of the basic piece (e.g., at a lower right corner side), while the other two curved lines being arranged parallel to each other nearer an outside (e.g., an upper left corner side) of the basic piece. The plural curved line pattern in this case may be configured such that the four curved lines extend in a curved direction with respective curvatures, while having respective fixed line widths (that is, without changing the line width in the middle of the curve). Further, in this case, a line width of two inner curved lines may be set at a same line width, while a line width of outer two curved lines being set at another same line width. In addition, if the plural curved line pattern in this case is embodied as the above-mentioned one with four gradations, the basic piece of the gradation of the highest density gradation and the basic piece of the gradation of the lowest density may be configured such that the line widths of the two inner curved lines and the width of the two outer curved lines are set to be a same line width, respectively. The basic piece of the high density side intermediate density and the basic piece of the low density side intermediate density maybe configured such that the line width of the two inner curved lines are set larger than the line width of the two outer curved lines (that is, the line width of the two outer curved lines being set at a smaller line width than the line width of the two inner curved lines).

Illustrative Example 1 of Four Parallel Curved Line Patterns

As the four parallel curved line pattern, there is a geometric pattern composed of a first black line BL1, a second black line BL2, a third black line BL3, a fourth black line BL4, a fifth black line BL5, and a sixth black line BL6, as the curved lines with six kinds of line widths in the first to fourth basic pieces 11 to 14 of the first embodiment (FIG. 1).

Illustrative Example 2 of Four Parallel Curved Line Pattern

In addition, as the four parallel curved line pattern, there is a geometric pattern composed of a first black line BL1, a third black line BL3, and a sixth black line BL6 as the curved lines with three kinds of line widths in the first to fourth basic pieces 21 to 24 of the second embodiment (FIG. 2). In this case, the line width of the first black line BL1, the line width of the third black line BL3, and the line width of the sixth black line BL6 are set the same as the line width of the first black line BL1, the line width of the third black line BL3, and the line width of the sixth black line BL6 of the first to fourth basic pieces 11 to 14 of the first embodiment (FIG. 1). In this example, in the first basic piece 21, two first black lines BL1 are provided in parallel to each other as a curved line with a largest line width at the lower right corner side, while two third black lines BL3 being provided in parallel to each other as a curved line with a third largest line width at the upper left corner side. Moreover, in the second basic piece 22, two third black lines BL3 are provided in parallel to each other as a curved line with the third largest line width at the lower right corner side, while two third black lines BL3 are provided in parallel to each other as a curved line with the third largest line width at the upper left corner side. Furthermore, in the third basic piece 23, two third black lines BL3 are provided in parallel to each other as a curved line with the third largest line width at the lower right corner side, while two sixth black lines BL6 are provided in parallel to each other as a curved line with a sixth largest line width at the upper left corner side. In addition, in the fourth basic piece 24, two sixth black lines BL6 are provided in parallel to each other as a curved line with the sixth largest line width at the lower right corner side, while two sixth black lines BL6 are provided in parallel to each other as a curved line with the sixth largest line width at the upper left corner side. In the first to fourth basic pieces 21 to 24, the two black lines (two BL3 and two BL6) at the upper left corner side extend from the upper sides to the left side of the first to fourth basic pieces 21 to 24. On the other hand, in the first to fourth basic pieces 21 to 24, the two black lines (two BL1, two BL3, and two BL6) at the lower right corner side extend from the right side to the lower side of the basic pieces 21 to 24.

Illustrative Example 2 of Plural Curved Line Pattern

Further, in the present invention, the plural curved line pattern may use, for example, a geometric pattern that has four curved lines arranged on a pattern surface of a basic piece having a square outline, while making two of the curved lines arranged at the inner side of the basic piece (e.g., at the lower right corner side) of the basic piece and making the other two curved lines arranged at the outer side (e.g., the upper left corner side) of the basic piece so as to be opposite to the curved lines at the inner side and to be parallel to each other.

Illustrative Example of Two-Pair of Two Parallel Curved Line Pattern

As such a two pair of two parallel curved line pattern, there is a geometric pattern composed of curved lines BL1, BL3, and BL6 with three kinds of line widths in the first to fourth basic pieces 31 to 34 of the third embodiment (FIG. 10).

[Constancy of Line Width of White Line of Plural Curved Line Pattern]

In the case of the geometric pattern of the first to fourth basic pieces 11 to 14 of the first embodiment (FIG. 1) as the four parallel curved line pattern, in the case of the geometric pattern of the first to fourth basic pieces 21 to 24 of the second embodiment (FIG. 2) also as the four parallel curved line pattern, and in the case of the geometric pattern of the first to fourth basic pieces 31 to 34 of the third embodiment (FIG. 10) as two pair of two parallel curved line pattern, the above-described plural curved line pattern is configured such that, in any case, a curved line (hereinafter referred to as an "inner white curved line") consisting of one white line (white line formed by an outline) is formed between two inner curved lines, while a curved line (hereinafter referred to as an "outer white curved line") consisting of one white line (white line formed by outline) being formed between two outer curved lines. Here, as described above, when the line widths of the four curved lines are respectively fixed line widths, the line width of the inner white curved line and the line width of the outer white curved line also have constant line widths. In the first to fourth basic pieces 11 to 14 of the first embodiment (FIG. 1), in the first to fourth basic pieces 21 to 24 of the second embodiment (FIG. 2), and in the first to fourth basic pieces 31 to 34 of the third embodiment (FIG. 10), in any case, white lines WL having the same line width are formed between the two black lines of all the basic pieces.

That is, as regards the first embodiment (FIG. 1), in the first basic piece 11, one white line WL1 is formed between two first black lines BL1 arranged at the lower right corner side, and one white line WL1 is formed between the two third black lines BL3 arranged at the upper left corner side. In the second basic piece 12, one white line WL1 is formed between the two second black lines BL2 arranged at the lower right corner side, and one white line WL1 is formed between the two fourth black lines BL4 arranged at the upper left corner side. In the third basic piece 13, one white line WL1 is formed between the two third black lines BL3 arranged at the lower right corner side, and one white line WL 1 is formed between the two fifth black lines BL5 arranged at the upper left corner side. In the fourth basic piece 14, one white line WL1 is formed between the two fifth black lines BL5 arranged at the lower right corner side, and one white line WL1 is formed between the two sixth black lines BL6 arranged at the upper left corner side.

Moreover, as regards the second embodiment (FIG. 2), in the first basic piece 21, one white line WL1 is formed between two first black lines BL1 arranged at the lower right corner side, and one white line WL1 is formed between the two third black lines BL3 arranged at the upper left corner side. In the second basic piece 22, one white line WL1 is formed between the two third black lines BL3 arranged at the lower right corner side, and one white line WL1 is formed between the two third black lines BL3 arranged at the upper left corner side. In the third basic piece 23, one white line WL1 is formed between the two third black lines BL3 arranged at the lower right corner side, and one white line WL1 is formed between the two sixth black lines BL6 arranged at the upper left corner side. In the fourth basic piece 24, one white line WL1 is formed between the two sixth black lines BL6 arranged at the lower right corner side, and one white line WL1 is formed between the two sixth black lines BL6 arranged at the upper left corner side.

Furthermore, as regards the third embodiment (FIG. 10), in the first basic piece 31, one white line WL1 is formed between two first black lines BL1 arranged at the lower right corner side, and one white line WL1 is formed between the two third black lines BL3 arranged at the upper left corner side. In the second basic piece 32, one white line WL1 is formed between the two third black lines BL3 arranged at the lower right corner side, and one white line WL1 is formed between the two third black lines BL3 arranged at the upper left corner side. In the third basic piece 33, one white line WL1 is formed between the two third black lines BL3 arranged at the lower right corner side, and one white line WL1 is formed between the two sixth black lines BL6 arranged at the upper left corner side. In the fourth basic piece 34, one white line WL1 is formed between the two sixth black lines BL6 arranged at the lower right corner side, and one white line WL1 is formed between the two sixth black lines BL6 arranged at the upper left corner side.

[Continuity of White Line of Plural Curved Line Pattern]

In the first embodiment (FIG. 1), the positions of opposite ends of the white line WL1 serving as the inner white curved line are respectively located at same positions (position at a same distance from a corner position) of two adjacent edges (i.e., two adjacent sides of a square that define an outer shape of the basic piece and that form the lower right corner) of all the kinds of the basic pieces 11 to 14 such that each of the opposite ends becomes a terminal end at a middle position of each of the edges. Further, the positions of opposite ends of the white line WL1 serving as the outer white curved line are respectively located at same positions (position at a same distance from a corner position) of another two adjacent edges (i.e., two adjacent sides of the square that define the outer shape of the basic piece and that form the upper left right corner) of all the kinds of the basic pieces 11 to 14 such that each of the opposite ends becomes a terminal end at an middle position of each of the edges. Thereby, in the case where the pixels of the drawing surface are filled with the basic pieces 11 to 14, when one of the basic pieces 11 to 14 is placed with its edge closely contacted with the edge of another one of the basic pieces 11 to 14, the other of the basic pieces 11 to 14 is rotatable in relation to the one of the basic pieces 11 to 14 by 90 degrees or 180 degrees in the clockwise direction or the counterclockwise direction. With such feature, the terminal end of the white line WL1 of the one of the basic pieces 11 to 14 and the terminal end of the white line WL1 of the other of the basic pieces 11 to 14 are completely connected (in the same line width and at the same position). Thus, the two white lines WL1 constitute a completely continuous curved line (with equal line width). As a result, the basic pieces 11 to 14 realize the above-described directionality and the background pattern forming property (through the directionality).

In the second embodiment (FIG. 2), the positions of opposite ends of the white line WL1 serving as the inner white curved line are respectively located at same positions (position at a same distance from a corner position) of two adjacent edges (i.e., two adjacent sides of a square that define an outer shape of the basic piece and that form the lower right corner) of all the kinds of the basic pieces 21 to 24 such that each of the opposite ends becomes a terminal end at a middle position of each of the edges, too. Further, the positions of opposite ends of the white line WL1 serving as the outer white curved line are respectively located at same positions (position at a same distance from a corner position) of another two adjacent edges (i.e., two adjacent sides of the square that define the outer shape of the basic piece and that form the upper left right corner) of all the kinds of the basic pieces 21 to 24 such that each of the opposite ends becomes a terminal end at an middle position of each of the edges. Thereby, in the case where the pixels of the drawing surface are filled with the basic pieces 21 to 24, when one of the basic pieces 21 to 24 is placed with its edge closely contacted with the edge of another one of the basic pieces 21 to 24, the other of the basic pieces 21 to 24 is rotatable in relation to the one of the basic pieces 21 to 24 by 90 degrees or 180 degrees in the clockwise direction or the counterclockwise direction. With such feature, the terminal end of the white line WL1 of the one of the basic pieces 21 to 24 and the terminal end of the white line WL1 of the other of the basic pieces 21 to 24 are completely connected (in the same line width and at the same position). Thus, the two white lines WL1 constitute a completely continuous curved line (with equal line width) (see FIG. 5, FIG. 7, FIG. 9, for example). As a result, the basic pieces 21 to 24 realize the above-described directionality and the background pattern forming property (through the directionality).

In the third embodiment (FIG. 10), the positions of opposite ends of the white line WL1 serving as the inner white curved line are respectively located at same positions (position at a same distance from a corner position) of two adjacent edges (i.e., two adjacent sides of a square that define an outer shape of the basic piece and that form the lower right corner) of all the kinds of the basic pieces 31 to 34 such that each of the opposite ends becomes a terminal end at a middle position of each of the edges, too. Further, the positions of opposite ends of the white line WL1 serving as the outer white curved line are respectively located at same positions (position at a same distance from a corner position) of another two adjacent edges (i.e., two adjacent sides of the square that define the outer shape of the basic piece and that form the upper left right corner) of all the kinds of the basic pieces 31 to 34 such that each of the opposite ends becomes a terminal end at an middle position of each of the edges. Thereby, in the case where the pixels of the drawing surface are filled with the basic pieces 31 to 34, when one of the basic pieces 31 to 34 is placed with its edge closely contacted with the edge of another one of the basic pieces 31 to 34, the other of the basic pieces 31 to 34 is rotatable in relation to the one of the basic pieces 31 to 34 by 90 degrees or 180 degrees in the clockwise direction or the counterclockwise direction. With such feature, the terminal end of the white line WL1 of the one of the basic pieces 31 to 34 and the terminal end of the white line WL1 of the other of the basic pieces 31 to 34 are completely connected (in the same line width and at the same position). Thus, the two white lines WL1 constitute a completely continuous curved line (with equal line width) (see FIG. 12, FIG. 14, FIG. 16, for example). As a result, the basic pieces 31 to 34 realize the above-described directionality and the background pattern forming property (through the directionality).

Example 3 of Curved Line Pattern (Quadrant Pattern)

Further, in the present invention, as the curved line pattern similar to the plural curved line pattern, there is a geometric pattern that is composed of a first black line B12 and a second black line BL14 serving as the curved lines with large and small line widths or two kinds of line widths of the first to fourth basic pieces 41 to 44 of the fourth embodiment (FIG. 17), and that is composed of a first quadrant BL11, a second quadrant BL13, and a third quadrant BL15 serving as the quadrants with large and middle and small diameters or three kinds of diameters.

The line width increases step by step in an order of the line width of the white line WL11, the line width of the white line WL12, and the line width of the white line WL13.

[Continuity of Blank Part and White Line of Quadrant Pattern]

In the fourth embodiment (FIG. 17), blank parts of the same size and the same shape are formed at the same corner positions of the basic pieces 41 to 44. Moreover, opposite ends of the white lines WL11, WL12, WL13 define terminal ends at the corresponding positions of the edges of the basic pieces 41 to 44, though the line widths thereof are different. Accordingly, if another of the basic pieces 41 to 44 is placed relative to one of the basic pieces 41 to 44 by rotating 90 degrees or 180 degrees in the clockwise direction or the counterclockwise direction, an edge of the blank part and the terminal end of the white line WL11, WL12, WL 13 of the one of the basic pieces 41 to 44 are connected with an edge of the blank part and the terminal end of the white line WL11, WL12, WL13 of the other of the basic pieces 41 to 44. Thus, the basic pieces 41 to 44 realize the above-described directionality and the background pattern forming property (through the directionality) (see FIG. 18 and FIG. 19, for example).

Example of Plural Straight Line Pattern

In the present invention, for example, a geometric pattern may be used as the plural straight line pattern such that two straight lines are disposed in parallel to each other on the pattern surface of the basic piece having a square outline (that is, the geometric pattern being constituted by the two parallel curved lines). In this case, the two straight line pattern is formed on the pattern surface of all kinds of the basic pieces, while changing only the line width thereof. Moreover, the straight line in this case may use a slanted line that is inclined at a predetermined angle (e.g., a slanted line inclined at 45 degrees) relative to a vertical axis of a horizontal axis of the basic piece. In this case, the geometric pattern made by a group of line segments of a predetermined motif consisting of a plurality of lines becomes a geometric pattern (hereinafter referred to as a "two parallel straight line pattern") of the same motif in which two slanted lines are arranged parallel to each other on the pattern surfaces of all kinds of basic pieces.

Furthermore, in this case, the plural straight line pattern may have a configuration, for example, such that two slanted lines are arranged parallel to each other on the pattern surface of the basic piece having a square outer shape and such that one of the slanted lines is arranged nearer an inside of the basic piece (e.g., at a lower right corner side), while the other of the slanted lines being arranged nearer an outside (e.g., an upper left corner side) of the basic piece. The plural straight line pattern in this case may be configured such that the two slanted lines extend in a straight direction at respective inclination angles, while having respective fixed line widths (that is, without changing the line width in the middle of the straight line). In this case, the increase and decrease of the gradation may be realized by setting the line width such that the line width of the slanted line of the basic piece of the highest density is made largest, while the line width of the slanted line of the basic piece of the lowest density being made a smallest line width and while the line width of the slanted line of the basic piece of the intermediate density being made a middle line width.

Alternatively, the plural straight line pattern in this case may be configured such that, in case it is concretized as the four gradations, the geometric pattern may not be constituted by the two slanted lines in the basic piece of the gradation of the highest density. The geometric pattern may be constructed from a single slanted line having a largest line width and a line width that fills almost an entire surface of the basic piece or from a predetermined shape of line portion having a predetermined shape that can be deemed to be the same as the slanted line and a predetermined shape that fills almost an entire surface of the basic piece, without being. Moreover, in this case, a geometric pattern may be constructed on the basic piece of the high density side intermediate density by disposing two slanted lines (i.e., two inclined lines of the same line width) having the second largest line width. Furthermore, in this case, the basic piece of the low density side intermediate density may be configured by changing the line width of one inner slanted line from the line width of one outer slanted line so that they have different line widths. For example, a geometric pattern of the basic piece in this case may be configured such that a single slanted line at the outer side or the inner side is defined as the slanted line having the second largest line width (slanted line having the same line width as the line width of the slanted line of the high density side intermediate density), while a single slanted line at the inner side or the outer side being defined as a slanted line with a third largest line width. With respect to the basic piece of the gradation of the lowest density, a geometric pattern is constructed by arranging two slanted lines of the third largest line width (i.e., two slanted lines of the same line width).

Illustrative Example of Two Parallel Straight Line Pattern

As the two parallel straight line pattern that expresses such four gradations, there is a geometric pattern composed of a first black line BL21, a second black line BL22, and a third black line BL23, as the slanted lines (slanted lines inclined at an angle of 45 degrees from the upper right to the lower left of the basic pieces 51 to 54) with three kinds of line widths in the first to fourth basic pieces 51 to 54 of the fifth embodiment (FIG. 20). In detail, in the first basic piece 51, the first black line BL21 is formed as a linear portion composed of an octagon (made by equally chamfering four corners of a square). Right-angled triangle-shaped margin portions CR1 of the same shape and the same size are formed at four corner portions of a surface thereof. The first black line BL21 is not a straight line (and not a slanted line) in a strict sense. Still, (if ignoring the margin portion at the upper right corner portion and the margin portion at the lower left corner portion), it can be regarded as equal to an extremely thick slanted line extending from the upper right corner portion to the lower left corner portion of the first basic piece 51. Thus, in this sense, it defines a predetermined linear shape (i.e., a linear portion). Then, the first black line BL21 constitutes a slanted line having the largest line width (i.e., an inclined linear portion).

In addition, the second basic piece 52 has, on the surface thereof, two second black lines BL22 with the second largest line width arranged in parallel to each other so as to extend from the upper right corner side toward the lower left corner side thereof. The two second black lines BL22 of the second basic piece 52 may be obtained by blanking a middle part of the first black line BL21 of the first basic piece 51 in a width direction (diagonal direction directed from the upper left corner portion to the lower right corner portion of the first basic piece 51) by a first constant line width. The second basic piece 52 has these two second black lines BL22 in parallel with each other to constitute two parallel straight line pattern. That is, in the second basic piece 52, a single white line WL21 with a first constant line width is formed between the two second black lines BL22 to extend from the upper right corner portion to the lower left corner portion of the second basic piece 52 with a fixed line width. In detail, in the first basic piece 51, the first black line BL21 is formed as a linear portion composed of an octagon (made by equally chamfering four corners of a square). Right-angled triangle-shaped margin portions CR1 of the same shape and the same size are formed at four corner portions of a surface thereof. The second black line BL22 constitutes a slanted line with an intermediate line width (smaller than ½ of the line width of the first black line BL21). Moreover, a right-angled triangular margin portions CR1 having the same shape and the same size as the margin portions CR1 of the first basic piece are formed respectively at the upper left corner portion and the lower right corner portion on the surface of the second basic piece 52.

In addition, the third basic piece 53 has, on the surface thereof, two black lines composed of a second black lines BL22 and a black line BL23 with different line widths arranged in parallel to each other, respectively, so as to extend from the upper right corner side toward the lower left corner side thereof. The one second black line BL22 of the third basic piece 53 has the same configuration as the second black line BL22 at the upper left corner side of the second basic piece 52. On the other hand, the one third black line BL23 of the third basic piece 53 may be obtained only by erasing an upper half portion of the second black line BL22 at the lower right corner side of the second basic piece 52 by a constant line width (same line width as the first constant line width of the white line WL21). The third basic piece 53 forms a two parallel straight line pattern by disposing these two black lines composed of the second black line BL22 and the third black line BL23 in parallel with each other. That is, in the third basic piece 53, one white line WL22 having a second constant line width is formed between the second black line BL22 and the third black line BL23 to extend from the upper right corner portion to the lower left corner portion of the third basic piece 53. The third black line BL23 constitutes a slanted line with a smallest line width (that is ½ of the line width of the second black line BL22). Right-angled triangular margin portions CR1 having the same shape and the same size as the margin portions CR1 of the first basic piece are formed at the upper left corner portion and the lower right corner portion on the surface of the third basic piece 53, respectively.

In addition, the fourth basic piece 53 has, on the surface thereof, two black lines BL23 with the same line widths arranged in parallel to each other, respectively, so as to extend from the upper right corner side toward the lower left corner side thereof. The third black line BL 23 at the lower side of the fourth basic piece 54 has the same configuration as the third black line BL23 at the lower side of the third basic piece 53. On the other hand, the one third black line BL 23 at the upper side of the fourth basic piece 54 may be obtained only by erasing an upper half portion of the second black line BL22 at the upper left corner side of the second basic piece 52 by a constant line width (same line width as the first constant line width of the white line WL21). The fourth basic piece 54 forms a two parallel straight line pattern by disposing these two third black lines BL23 in parallel with each other. That is, in the fourth basic piece 54, one white line WL22 having a second constant line width is formed between the two third black lines BL23 to extend from the upper right corner portion to the lower left corner portion of the fourth basic piece 54, as in the second basic piece 52. The upper third black line BL23 constitutes a slanted line with a smallest line width (that is ½ of the line width of the second black line BL22). A right-angled triangular margin portion CR1 having the same shape and the same size as the margin portion CR1 of the first basic piece is formed at the lower right corner portion on the surface of the fourth basic piece 54. Moreover, a right-angled triangular margin portions CR1 is formed at the upper left corner portion on the surface of the third basic piece 53 such that is has a height larger than a height of the margin portions CR1 of the first basic piece by a dimension of ½ of the second black line BL22.

Example of Single Line Pattern

In the present invention, for example, a geometric pattern may be used as the single line pattern such that one straight line is disposed in a horizontal direction (or in a vertical direction) on the pattern surface of the basic piece having a square outline. In this case, a single line pattern is formed on the pattern surface of all kinds of basic pieces, with only the line width being different. Moreover, the straight line in this case may use a slanted line that is inclined at a predetermined angle (e.g., a slanted line inclined at 45 degrees) relative to a vertical axis of a horizontal axis of the basic piece.

Illustrative Example 1 of Single Line Pattern

As such a single line pattern, there is a geometric pattern composed of a first black line BL31, a second black line BL32, and a third black line BL33 of the first to fourth basic pieces 61 to 64 of the sixth embodiment (FIG. 30).

Illustrative Example 2 of Single Line Pattern

Moreover, as such a single line pattern, there is a geometric pattern composed of a first black line BL31 and a second black line BL32 in addition to a first gray line GL31 and a second gray line GL32 of the first to fourth basic pieces 71 to 74 of the seventh embodiment (FIG. 34).

Illustrative Example of Drawing Image with 4 Gradations According to Embodiment of Linear Pattern Among the ultra-low resolution image making devices of the first to eighth embodiments that adopt the linear pattern as the geometric pattern as described above, the ultra-low resolution image making apparatuses of the first to seventh embodiments respectively use the pixel unit 10, 20, 30 and 40 composed of four kinds of the basic pieces 11 to 14, 21 to 24, 31 to 34, 41 to 44, 51 to 54, 61 to 64, and 71 to 74 having a proper linear pattern in order to express a predetermined motif to be a drawing object (hereinafter referred to as a "drawing motif") as a low resolution image with four gradations. In order to create the low resolution image with the four gradations, the ultra-low resolution image making apparatus places the basic piece to fill each of the pixels of the drawing surface with the basic piece that expresses a corresponding gradation, in accordance with the contour or shade or the like of the drawing image, thereby drawing the drawing image as shown below.

(1A) In the second embodiment, a drawing motif (a nude female facing a right side) as shown in FIG. 4, FIG. 6, and FIG. 8 is drawn by using the pixel unit consisting of the basic pieces 21 to 24 of FIG. 2. Although not shown, the pixel unit 10 consisting of the basic pieces 11 to 14 of FIG. 1 also has the geometric pattern that is similar to that of the pixel unit 20 consisting of the basic pieces 21 to 24 of FIG. 8 (while only the line width of each line of the linear pattern is different). Thus, the same drawing motif can be drawn even if the pixel unit 10 composed of the basic pieces 11 to 14 in FIG. 1 is used. In each of these drawing images, the drawing motif is drawn at a central portion of the drawing surface by the gradation expressivity and the background pattern forming property possessed by the geometric pattern of the basic pieces 21 to 24 (or 11 to 14). Moreover, a predetermined background pattern (each having a different pattern) is formed over the entire drawing surface. Furthermore, in each of these drawing images, due to the directionality provided by the geometric pattern of the basic pieces 21 to 24 (or 11 to 14), the background pattern is formed over an entire area of the drawing surface or over a partial area of the drawing surface such that it becomes a continuous pattern continuously extending in a specific direction or an intermittent pattern intermittently arranged in a specific direction.

(1B) In the third embodiment, a drawing motif (a nude female facing a right side) as shown in FIG. 11, FIG. 13, and FIG. 15 is drawn by using the pixel unit 30 consisting of the basic pieces 31 to 34 of FIG. 10. In each of these drawing images, the drawing motif is drawn at a central portion of the drawing surface by the gradation expressivity and the background pattern forming property possessed by the geometric pattern of the basic pieces 31 to 34. Moreover, a predetermined background pattern (each having a different pattern) is formed over the entire drawing surface. Furthermore, in each of these drawing images, due to the directionality provided by the geometric pattern of the basic pieces 31 to 34, the background pattern is formed over an entire area of the drawing surface or over a partial area of the drawing surface such that it becomes a continuous pattern continuously extending in a specific direction or an intermittent pattern intermittently arranged in a specific direction.

(1C) In the fourth embodiment, a drawing motif (a nude female facing a right side) as shown in FIG. 18 and a drawing motif (a nude female facing front) as shown in FIG. 19 are drawn by using the pixel unit 40 consisting of the basic pieces 41 to 44 of FIG. 17. In each of these drawing images, the drawing motif is drawn at a central portion of the drawing surface by the gradation expressivity and the background pattern forming property possessed by the geometric pattern of the basic pieces 41 to 44. Moreover, a predetermined background pattern (each having a different pattern) is formed over the entire drawing surface. Furthermore, in each of these drawing images, due to the directionality provided by the geometric pattern of the basic pieces 41 to 44, the background pattern is formed over an entire area of the drawing surface or over a partial area of the drawing surface such that it becomes a continuous pattern continuously extending in a specific direction or an intermittent pattern intermittently arranged in a specific direction.

(1D) In the fifth embodiment, a drawing motif (male face) as shown in FIG. 21, a drawing motif (nude female facing front) as shown in FIG. 25, FIG. 26, and FIG. 27, and a drawing motif (female face) as shown in FIG. 38(*b*) are drawn by using the pixel unit 50 consisting of the basic pieces 51 to 54 of FIG. 20. In each of these drawing images, the drawing motif is drawn at a central portion of the drawing surface by the gradation expressivity and the background pattern forming property possessed by the geometric pattern of the basic pieces 51 to 54. Moreover, a predetermined background pattern (each having a different pattern) is formed over the entire drawing surface. Furthermore, in each of these drawing images, due to the directionality provided by the geometric pattern of the basic pieces 51 to 54, the background pattern is formed over an entire area of the drawing surface or over a partial area of the drawing surface such that it becomes a continuous pattern continuously extending in a specific direction or an intermittent pattern intermittently arranged in a specific direction.

(1E) In addition, in the fifth embodiment, a drawing motif (nude female facing front) as shown in FIG. 28 is drawn by using the pixel unit 30 consisting of the basic pieces 31 to 34 of FIG. 10 and the pixel unit 50 consisting of the basic pieces 51 to 54 of FIG. 20 in combination. In this drawing image, the drawing motif is drawn at a central portion of the drawing surface by the gradation expressivity and the background pattern forming property possessed by the geometric patterns of the basic pieces 31 to 34 and the basic pieces 51 to 54.

Moreover, a predetermined background pattern is formed over the entire drawing surface. Furthermore, in this drawing image, due to the respective directionalities provided by the geometric patterns of the basic pieces 31 to 34 and the basic pieces 51 to 54, the background pattern is formed over an entire area of the drawing surface or over a partial area of the drawing surface such that it becomes a continuous pattern continuously extending in a specific direction or an intermittent pattern intermittently arranged in a specific direction.

(1F) In the sixth embodiment, a drawing motif (a nude female facing front) as shown in FIG. 31 and a drawing motif (a nude female facing a right side) as shown in FIG. 32 and FIG. 33 are drawn by using the pixel unit 60 consisting of the basic pieces 61 to 64 of FIG. 30. In each of these drawing images, the drawing motif is drawn at a central portion of the drawing surface by the gradation expressivity and the background pattern forming property possessed by the geometric pattern of the basic pieces 61 to 64. Moreover, a predetermined background pattern (each having a different pattern) is formed over the entire drawing surface. Furthermore, in each of these drawing images, due to the directionality provided by the geometric pattern of the basic pieces 61 to 64, the background pattern is formed over an entire area of the drawing surface or over a partial area of the drawing surface such that it becomes a continuous pattern continuously extending in a specific direction or an intermittent pattern intermittently arranged in a specific direction.

(1G) In the seventh embodiment, a drawing motif (a nude female facing front) as shown in FIG. 35 is drawn by using the pixel unit 70 consisting of the basic pieces 71 to 74 of FIG. 34. In this drawing image, the drawing motif is drawn at a central portion of the drawing surface by the gradation expressivity and the background pattern forming property possessed by the geometric pattern of the basic pieces 71 to 74. Moreover, a predetermined background pattern is formed over the entire drawing surface. Furthermore, in this drawing image, due to the respective directionality provided by the geometric pattern of the basic pieces 71 to 74, the background pattern is formed over an entire area of the drawing surface or over a partial area of the drawing surface such that it becomes a continuous pattern continuously extending in a specific direction or an intermittent pattern intermittently arranged in a specific direction.

[Three Kinds of Image Expressivity]

As described above, in the ultra-low-resolution image making apparatus of the present invention, the basic piece of the pixel unit by itself has a predetermined geometric pattern on the surface thereof. Thus, the pixel unit may be grasped as having a pattern formability by its own geometric pattern in addition to the gradation expressivity and the background pattern forming property. That is, as will be described later, when the basic pieces are placed on the drawing surface to create an ultra-low resolution image of a predetermined motif, the basic piece has such a lowest dimension as a viewer can recognize by his/her vision (visually recognize) each one of the basic pieces.

Accordingly, when the viewer views the ultra-low resolution image of the present invention from a short distance, as shown in FIG. 4 (a) and the like, he or she is given an impression that the background pattern is most strongly expressed in the drawing image. Thus, the viewer mainly visually recognize the background pattern, so that it is difficult to recognize the drawing motif expressed in the background pattern. Also, at this time, since the viewer views the ultra-low resolution image from a short distance, he or she can recognize the pattern of the individual basic piece itself as shown in FIG. 4 (a) and the like.

On the other hand, when the ultra-low resolution image of the present invention is viewed from a long distance, each pattern of the background pattern gives such an impression as is lost in the entire image, as shown in FIG. 4 (b) and so on, so that the drawing motif is visually recognized with the strongest impression. Also, at this time, since the viewer views the ultra-low resolution image from a long distance, as shown in FIG. 4 (a) and the like, it is very difficult to recognize the pattern of the individual basic piece itself.

Moreover, when the ultra-low resolution image of the present invention is viewed from an intermediate distance between the short distance and the long distance, each pattern of the background pattern is also visually recognized, while the drawing motif is also visually recognized. As a result, the viewer recognizes the background pattern when recognizing the ultra-low resolution image of the present invention, while simultaneously recognizing the drawing motif in the background pattern. In addition, he or she also simultaneously recognizes a portion of the background pattern even at an inside of the drawing motif. Thus, he or she receives such an impression as these three kinds of images merge into one drawing image as a unique image expression, thereby recognizing it as a highly expressive image expression. At this intermediate distance, it depends on a degree of the intermediate distance whether or not the pattern of the individual basic piece itself is recognized.

In this sense, the apparatus for producing an ultra-low resolution image according to the present invention is able to provide a first type of image expression that makes a viewer visually recognize the design of the background pattern (and, in addition thereto, designs of individual pixels), a second type of image expression that makes the viewer mainly view the image of the drawing motif, and a third type of image expression that makes the viewer to recognize the design of the background pattern and the image of the drawing motif at the same time (in addition thereto, makes him/her recognize the design of the background pattern even at the inside of the drawing motif), by using the basic pieces (of the four kinds) of the single pixel unit.

[Design Drawing/Instruction (Design Sheet)]

In the present invention, for example, a design sheet 200 shown in FIG. 39 may be used as an information providing means that specifies the kinds of the basic pieces and the arrangement directions of the basic pieces (identification of the upper, lower, left and right) for each pixel on the drawing surface. In the design sheet 200, the kind of the basic piece is provided by printing or the like on each pixel 201 of the design sheet 200 by numerals such as "SP1, SP2, SP3, SP4" (for example, the first basic piece 11 is expressed as "SP2", the second basic piece 11 is expressed as "SP2", the third basic piece 13 is expressed as "SP3", and the fourth basic piece 14 is expressed as "SP4"). The arrangement direction of the basic piece is provided by printing or the like on each pixel by use of alphanumeric, characters or the like such as "A (upper), B (right), C (left), D (lower)". The information about the kind and the information about the arrangement direction may be provided separately. Still, as shown in FIG. 60, it is preferable to combine them such that each of the pixels is provided with an information indicating the kind and the arrangement direction of the basic piece at once, such as "SP 1—A (the first basic piece 11 should be arranged in the upward direction)". Such a design sheet may be configured in another way as long as it is capable of specifying the kind and arrangement direction of the basic piece for each pixel on the drawing surface.

Invention of Second Aspect

Hereinafter, among the present inventions, an ultra-low-resolution image making apparatus and an low-resolution image making method according to a second aspect of the present invention will be described. The ultra-low-resolution image making apparatus according to the second aspect of the invention is concretized into an ultra-low-resolution image making apparatus and an low-resolution image making method that forms a drawing image to be drawn on a monitor screen of a display device or the like by use of a computer device, such as a still image or a moving image by computer graphics (CG). The ultra-low resolution image making apparatus according to the second aspect of the invention is constructed from a pixel unit having the same basic pieces as the ultra-low resolution image making apparatus according to the first aspect of the invention. Still, it is different from the first aspect of the invention in that the basic pieces are not a tangible object but an intangible entity (virtual basic pieces realized by a computer software).

Illustrative Example of Second Aspect of Invention

The ultra-low-resolution image making apparatus according to the second aspect of the invention may be concretized into one for a moving image, for example, as shown in FIG. 40 to FIG. 42. In detail, as shown in FIG. 41, a drawing image MPF is created and prepared by the ultra-low resolution image making apparatus for each frame of the moving image. Alternatively, as shown in FIG. 40, original images OPH and OPM of the drawing image MPF, which is to be created by the above-described ultra-low resolution image making device, are manually created or automatically created by an image processing software. The original image OPH shown in FIG. 40 (a) and FIG. 40 (b) is the one manually created. The original OPM shown in FIG. 40 (c) and FIG. 40 (d) is the one created automatically by an image processing software. In this example, original images OPF1, . . . , OPF30 are prepared as shown in FIG. 42 (*b*) corresponding to frames F1, . . . , F30 of the moving image as shown in FIG. 42 (*a*). Alternatively, drawing images MPF1, . . . , MPF30 composed of predetermined drawing images are prepared as shown in FIG. 42 (*c*). Then, a moving image is made by using these original images OPF1, . . . , OPF30 or drawing images MPF1, . . . , MPF30 as frames, so that the original image or the drawing image dynamically changes.

Modified Example of Second Aspect of Invention

In the ultra-low-resolution image making apparatus according to the second aspect of the invention, for example, in case of making drawing images by CG or the like, a process is executed by a predetermined software program such that the basic piece at a predetermined part always rotates at a predetermined speed. Thereby, the basic piece at the predetermined part in the still image is continuously rotated, while creating a predetermined drawing image as a still image by the basic piece. Thus, it is possible to provide a drawing image in which an impression is given such that the still image dynamically moves on the display (i.e., a still image can be provided as a drawing image having a character of moving image). In this case, even if the basic piece at some of the pixels of the drawing image is rotated, the drawing object of the same motif is always visually recognized. That is, since the density itself of the basic piece rotating at the pixel is not changed, the drawing image of the same motif is always visually recognized. In this case, it is also possible to increase/decrease or change the rotation speed of the basic piece depending on the part. By doing so, the motion picture becomes more interesting.

Modified Example of Pixel Unit and Basic Piece

The pixel unit and the basic pieces used in the ultra-low resolution image making apparatus of the present invention may be configured as shown in FIG. 43 to FIG. 49. Even with such configuration, it is possible to realize the gradation expressivity, background pattern forming property and directionality in the same way, while performing a desired ultra-low resolution image drawing. In detail, in the example of FIG. 43, a pixel unit 210 is composed of basic pieces 211, 212, 213, and 214. The basic pieces 211, 212, 213, and 214 represent four gradations by increasing or decreasing the number and arrangement of oblique black lines BL having a fixed width. The basic pieces 211, 212, 213, and 214 may be applied to, for example, a tile and the like. In this case, the black line BL may be formed into a protruding shape. Thus, a portion of a shadow SH is formed between the black lines BL or at a side of the black line by the light, thereby enabling an expression of gradations by using shading.

In the example of FIG. 44, the black line portion or the white line portion of the basic piece is colorized in the pixel unit 10 or the like (or a pixel unit having a similar structure) according to each of the above embodiments. For example, as shown in FIG. 44 (*a*), the basic pieces of each pixel unit of (b) to (f) of FIG. 44 may be configured such that they express six colors, respectively, corresponding to six basic colors, by changing the colors in colorization of the black line portion and the while line portion.

In the example of FIG. 45, as shown in FIG. 45 (*a*), a pixel unit 220 is composed of a total of four basic pieces whose shapes and colors are changed. The color of each component of the basic piece is changed so as to increase variations of the background pattern forming property in addition to the gradation expressivity, as shown in FIG. 45 (*b*). The basic piece is formed by combining a square corresponding to the square of the basic piece of the aforementioned embodiments with an inverted L shape and a small square shape. In FIG. 45, four pieces in a right column represent four gradations, wherein, from a top to a bottom thereof, a lowest density, an intermediate density at a low density side, an intermediate density at a high density side, and a highest density are obtained. Moreover, the lowest density, the intermediate density at the low density side, and the intermediate density at the high density side may also be expressed as shown in the three basic pieces in the left column of FIG. 45.

In the example of FIG. 46, as shown in FIG. 46 (*a*), a pixel unit 220 is composed of a total of four basic pieces whose shapes and colors are changed. The color of each component of the basic piece is changed so as to increase variations of the background pattern forming property in addition to the gradation expressivity, as shown in FIG. 46 (*b*). The basic piece is formed by combining a square corresponding to the square of the basic piece of the aforementioned embodiments with a quadrant and a deformed circular arc (excluding the quadrant circle from the square). In FIG. 46, four pieces in a right column represent four gradations, wherein, from a top to a bottom thereof, a lowest density, an intermediate density at a low density side, an intermediate density at a high density side, and a highest density are obtained. Moreover, the lowest density, the intermediate density at the low density side, and the intermediate density at the high density side may also be expressed as shown in the three basic pieces in the left column of FIG. 46.

In the example of FIG. 46, as shown in FIG. 47 (*a*), a pixel unit 240 is composed of a total of four basic pieces whose shapes and colors are changed. The color of each component of the basic piece is changed so as to increase variations of the background pattern forming property in addition to the gradation expressivity, as shown in FIG. 47 (*b*). The basic piece is formed by dividing a square corresponding to the square of the basic piece of the aforementioned embodiments into two parts vertically. In FIG. 47, four pieces in a right column represent four gradations, wherein, from a top to a bottom thereof, a lowest density, an intermediate density at a low density side, an intermediate density at a high density side, and a highest density are obtained. Moreover, the lowest density, the intermediate density at the low density side, and the intermediate density at the high density side may also be expressed as shown in the three basic pieces in the left column of FIG. 47.

In the example of FIG. 48, as shown in FIG. 48 (*a*), a pixel unit 250 is composed of a total of four basic pieces whose shapes and colors are changed. The color of each component of the basic piece is changed so as to increase variations of the background pattern forming property in addition to the gradation expressivity, as shown in FIG. 48 (*b*). The basic piece is formed of two isosceles triangles made by dividing a square corresponding to the square of the basic piece of the aforementioned embodiments by a diagonal line thereof. Moreover, the lowest density, the intermediate density at the low density side, and the intermediate density at the high density side may also be expressed as shown in the three basic pieces in the left column of FIG. 48. Moreover, the lowest density, the intermediate density at the low density side, and the intermediate density at the high density side may also be expressed as shown in the three basic pieces in the left column of FIG. 48.

If using the pixel units 220, 230, 240, and 250 of FIGS. 45 to 48, for example, small block patterns can be formed as shown in FIG. 49.

The present invention may be applied not only to exterior materials such as tiles used as building materials or interior materials, but also to toys such as jigsaw puzzles and coloring books. Moreover, the present invention may be applied to still pictures and moving pictures by computer graphics.

The invention claimed is:

1. An ultra-low resolution image making apparatus comprising:
   a plurality of kinds of basic pieces having a same size and a same external shape and having three or more kinds of gradations such that the plurality of kinds of basic pieces constitute one pixel unit;
   wherein the basic pieces of predetermined gradations are adapted to be disposed respectively at pixels of the drawing surface corresponding to an outline or a shadow of the drawing image to fill the pixels of the drawing surface by the basic pieces, thereby making a desired drawing image;
   wherein each of the plurality of kinds of basic pieces constituting the pixel unit has a geometric pattern provided on a surface thereof, and the geometric patterns are configured so as to realize two properties of a gradation expressivity and a background pattern forming property;
   wherein, via the gradation expressivity of the geometric pattern of the basic piece, the geometric patterns on the surfaces of the basic pieces express different gradations by changing densities thereof on the surfaces of the basic pieces, respectively, in accordance with the kinds of the basic pieces; and
   wherein the geometric patterns are configured such that, via the background pattern forming property of the geometric pattern of the basic piece, the geometric pattern of one of the basic pieces is integrated with the geometric pattern of another one of the basic pieces, that is adjacently arranged on the drawing surface, by adjusting an arrangement direction of the basic piece in each of the pixels on the drawing surface to one of a top, a bottom, a left, and a right, thereby forming a background pattern composed of another predetermined geometric pattern different from the geometric pattern of the basic piece.

2. An ultra-low resolution image making apparatus according to claim 1:
   wherein the geometric patterns of the plurality of kinds of basic pieces constituting the pixel unit are configured to express a directionality in addition to the gradation expressivity and the background pattern forming property; and
   wherein via the directionality, a locating orientation of the basic piece is adjustable by setting it either in one direction of up, down, left, and right in each of the pixels of the drawing surface so that at least one or more lines of one of the basic pieces, among lines constituting a linear pattern thereof, is/are connected with one or more lines of a linear pattern of another one of the basic pieces, that is adjacently located thereto on the drawing surface, thereby forming a continuous pattern line in a pattern-like manner so as to extend continuously in a specific direction over the adjacent basic piece, thereby forming a continuous line extending continuously in a specific direction over the adjacent one of the basic pieces so as to define a continuous pattern line, thereby constituting an entire pattern or a partial pattern of the background pattern by the continuous pattern lines.

3. An ultra-low resolution image making method for making a drawing image on a drawing surface using the pixel unit of the ultra-low resolution image making apparatus according to claim 1, comprising:
   an original image forming step of forming an original image, in which a predetermined drawing image is formed, by arranging colors of gradations of a same number of kinds as the kinds of the basic pieces, respectively, on the image pixels of a drawing surface for making an original image;
   a background pattern image making step of making a background pattern image expressing a background pattern formable by combining the geometric patterns of the basic pieces, respectively, on the image pixels of the drawing surface for making a background image that are in a matrix state corresponding to the drawing surface; and
   a basic piece position adjusting step of adjusting positions of the basic pieces disposed on the image pixels of the drawing surface so as to become a same arrangement manner as elements of the corresponding background patter, by referring to the elements of each of the image pixels of the background pattern image.

* * * * *